(12) United States Patent  
Hirose et al.

(10) Patent No.: US 11,171,433 B2  
(45) Date of Patent: *Nov. 9, 2021

(54) CARTRIDGE

(71) Applicant: NINTENDO CO., LTD., Kyoto (JP)

(72) Inventors: Shinji Hirose, Kyoto (JP); Yuta Fujita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/799,082

(22) Filed: Oct. 31, 2017

(65) Prior Publication Data

US 2018/0109018 A1 Apr. 19, 2018

Related U.S. Application Data

(63) Continuation of application No. 15/398,903, filed on Jan. 5, 2017, now Pat. No. 9,853,379.

(30) Foreign Application Priority Data

Oct. 19, 2016 (JP) .................................. 2016-205577

(51) Int. Cl.
*H01R 12/71* (2011.01)
*H01R 13/26* (2006.01)
(Continued)

(52) U.S. Cl.
CPC ........... *H01R 12/712* (2013.01); *A63F 13/95* (2014.09); *H01R 13/26* (2013.01); *H01R 13/652* (2013.01)

(58) Field of Classification Search
CPC ........... G06K 19/07743; G06K 7/0047; G06K 19/077; G06K 19/07732; G06K 7/0021;
(Continued)

(56) References Cited

U.S. PATENT DOCUMENTS 6,109,939 A 8/2000 Kondo
6,267,678 B1 7/2001 Kubo
(Continued)

FOREIGN PATENT DOCUMENTS

JP 2006-92775 A 4/2006
JP 2007-72922 A 3/2007
(Continued)

OTHER PUBLICATIONS

Sep. 8, 2017 Search Report issued in corresponding European Application No. 17 150 029.1.
(Continued)

*Primary Examiner* — Edwin A. Leon
*Assistant Examiner* — Matthew T Dzierzynski
(74) *Attorney, Agent, or Firm* — Nixon & Vanderhye P.C.

(57) ABSTRACT

A terminal placement region of the cartridge is divided into an upper region and a lower region, and the cartridge includes a plurality of terminals placed in the upper region, a plurality of terminals placed in the lower region, and a plurality of long terminals across the upper region and the lower region. The long terminals are a ground terminal, a chip-enable terminal, a power supply terminal, or a reset terminal. A strobe terminal and a clock terminal are arranged one above the other. Two data input/output terminals are arranged one above the other, and four sets of data input/output terminals arranged one above the other are present. A long terminal is near the strobe terminal and the clock terminal arranged one above the other, and a long terminal is near the two data input/output terminals arranged one above the other.

24 Claims, 20 Drawing Sheets

(51) Int. Cl.
*H01R 13/652* (2006.01)
*A63F 13/95* (2014.01)

(58) Field of Classification Search
CPC ............... G06K 13/08; G06K 13/0856; G06K 13/0887; G06K 13/0893; G06K 19/041; G06K 19/07; G06K 19/07739; G06K 19/07741; G06K 7/0043; H05K 1/117; H05K 5/026; H05K 1/0254; H05K 1/0268; H05K 1/189; H05K 2201/09063; H05K 2201/09127; H05K 2201/09409; H05K 2201/10598; H05K 2201/10689; H05K 2201/2018; H05K 3/0052; H05K 3/284; H05K 5/0269
See application file for complete search history.

(56) References Cited

U.S. PATENT DOCUMENTS

| | | | |
|---|---|---|---|
| 6,320,252 | B1 | 11/2001 | Potters |
| 6,333,854 | B1 | 12/2001 | Sasaoka |
| 6,381,143 | B1 | 4/2002 | Nakamura |
| 6,383,079 | B1 | 5/2002 | Takeda |
| 6,410,355 | B1 | 6/2002 | Wallace |
| 6,457,647 | B1 | 10/2002 | Kurihashi |
| 6,634,561 | B1 | 10/2003 | Wallace |
| 6,641,413 | B2 | 11/2003 | Kuroda |
| 6,646,885 | B1 | 11/2003 | Yu |
| 9,853,379 | B1 * | 12/2017 | Hirose ................ H01R 12/712 |
| 2003/0040353 | A1 | 2/2003 | Takamoto |
| 2006/0063433 | A1 | 3/2006 | Aoki |
| 2006/0100021 | A1 | 5/2006 | Yoshino |
| 2007/0001279 | A1 | 1/2007 | Nishizawa et al. |
| 2008/0123305 | A1 | 5/2008 | Amidi |
| 2008/0132091 | A1 | 6/2008 | Choi |
| 2014/0221096 | A1 | 8/2014 | Yamane |

FOREIGN PATENT DOCUMENTS

| | | |
|---|---|---|
| JP | 2014-150938 | 8/2014 |
| WO | 2008/0075594 A1 | 6/2008 |

OTHER PUBLICATIONS

Sep. 25, 2017 Office Action issued in corresponding European Application No. 17 150 029.1.
Office Action dated Sep. 4, 2020 issued in Japanese Application No. 2016-205577 (4 pages).

* cited by examiner

FIG. 5

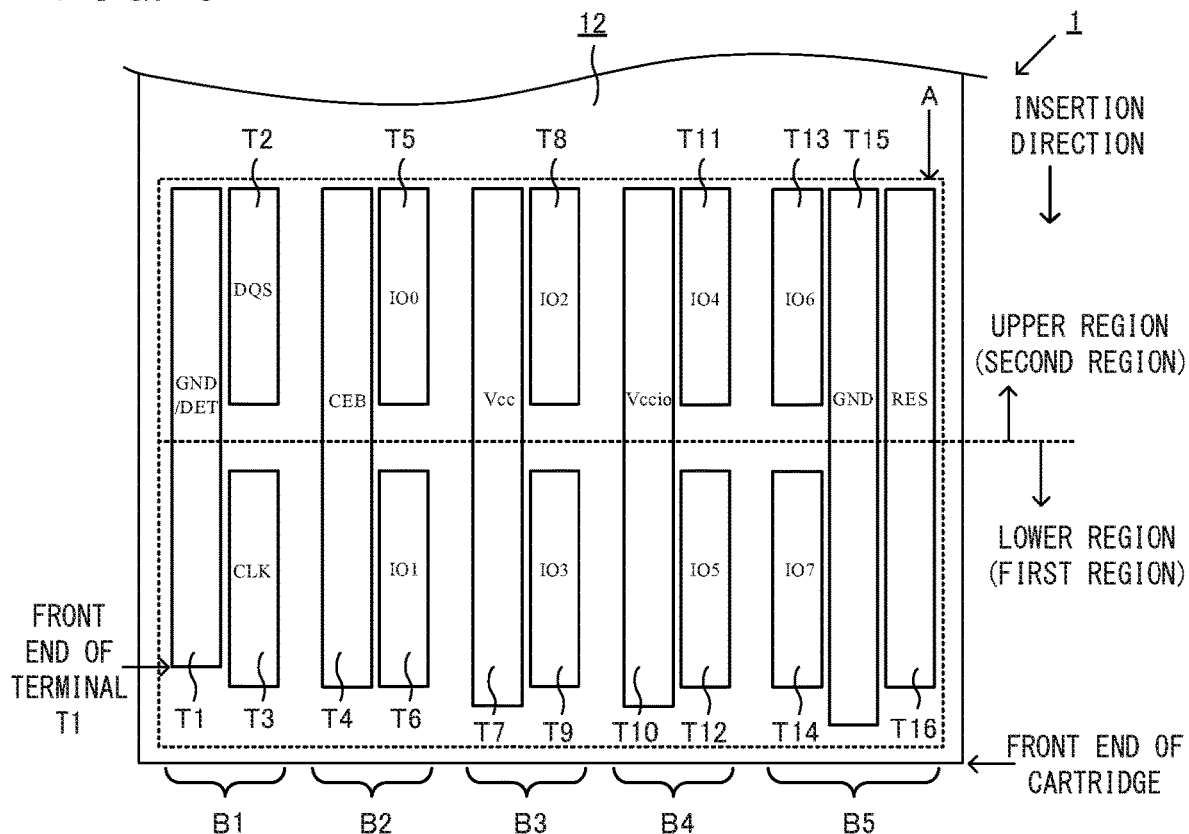

FIG. 6

| NUMBER | IDENTIFIER | USE/DESCRIPTION |
|---|---|---|
| T1 | GND/DET | GROUND/CARD DETECTION TERMINAL |
| T2 | DQS | STROBE SIGNAL TERMINAL |
| T3 | CLK | CLOCK SIGNAL TERMINAL |
| T4 | CEB | CHIP-ENABLE TERMINAL |
| T5 | IO0 | DATA INPUT/OUTPUT (I/O) TERMINAL 0 |
| T6 | IO1 | DATA INPUT/OUTPUT (I/O) TERMINAL 1 |
| T7 | Vcc | POWER SUPPLY TERMINAL FOR MEMORY CONTROL SECTION |
| T8 | IO2 | DATA INPUT/OUTPUT (I/O) TERMINAL 2 |
| T9 | IO3 | DATA INPUT/OUTPUT (I/O) TERMINAL 3 |
| T10 | Vccio | POWER SUPPLY TERMINAL FOR I/O |
| T11 | IO4 | DATA INPUT/OUTPUT (I/O) TERMINAL 4 |
| T12 | IO5 | DATA INPUT/OUTPUT (I/O) TERMINAL 5 |
| T13 | IO6 | DATA INPUT/OUTPUT (I/O) TERMINAL 6 |
| T14 | IO7 | DATA INPUT/OUTPUT (I/O) TERMINAL 7 |
| T15 | GND | GROUND TERMINAL |
| T16 | RES | RESET TERMINAL |

SEPARATORS 11a

CARTRIDGE

CROSS REFERENCE TO RELATED APPLICATION

This application is a continuation of U.S. application Ser. No. 15/398,903, filed Jan. 5, 2017, and claims priority to Japanese Patent Application No. 2016-205577, filed on Oct. 19, 2016. The entire contents of each of which are hereby incorporated by reference.

FIELD

The technology disclosed here relates to a cartridge capable of being connected to an information processing apparatus.

BACKGROUND AND SUMMARY

Conventionally, there is a cartridge attachable to and detachable from an information processing apparatus such as a game apparatus. For example, such a cartridge stores a program to be executed by a game apparatus. In a case where the cartridge is attached to the game apparatus, the game apparatus reads the program stored in a storage device in the cartridge.

However, there is room for improvement in forming a cartridge to be small.

Therefore, it is an object of an exemplary embodiment to provide a new cartridge attachable to and detachable from an information processing apparatus such as a game apparatus.

To achieve the above object, the exemplary embodiment employs the following configurations.

An example of the exemplary embodiment is a cartridge having a front end and a rear end and capable of connecting to a game apparatus by inserting the cartridge, the front end first, into a cartridge insertion slot of the game apparatus. The cartridge includes a terminal placement region that includes a first region and a second region and that include a plurality of terminals configured to electrically connect to terminals of the game apparatus in the cartridge insertion slot. A direction in which the cartridge is inserted into or removed from the cartridge insertion slot is a first direction, and a direction perpendicular to the first direction is a second direction, the second region and the first region are adjacent to each other in the first direction. The first region is closer in the terminal placement region to the front end of the cartridge than the second region is. The plurality of terminals include at least a first data input/output terminal, a second data input/output terminal, a strobe terminal, a clock terminal, a power supply terminal, and a ground terminal. The clock terminal and the first data input/output terminal are in the first region. The strobe terminal and the second data input/output terminal are in the second region. A plurality of long terminals are each located with a first portion in the first region and a second portion in the second region. The strobe terminal and the clock terminal are sequentially arranged in the first direction. The second data input/output terminal and the first data input/output terminal are sequentially arranged in the first direction. The plurality of long terminals include the power supply terminal and the ground terminal. One of the plurality of long terminals is adjacent to the second data input/output terminal and the first data input/output terminal on at least one side of the one of the long terminals in the second direction. One of the plurality of long terminals is adjacent to the strobe terminal and the clock terminal on at least one side of the one of the long terminals in the second direction.

Based on the above, two data input/output terminals are placed so as to be arranged in a first direction, and a strobe terminal and a clock terminal are also placed so as to be arranged in the first direction. Thus, it is possible to shorten a length in a second direction. Further, a long terminal as a power supply terminal or a ground terminal is provided adjacent to first and second data input/output terminals in the second direction. The power supply terminal or the ground terminal of which the voltage infrequently changes is provided adjacent to the first and second data input/output terminals. Thus, the first and second data input/output terminals are less likely to be influenced by noise. The power supply terminal or the ground terminal is also provided adjacent to the strobe terminal and the clock terminal and therefore is less likely to be influenced by noise. Thus, it is possible to perform stable data communication. Further, a cartridge is inserted into or removed from a cartridge insertion slot from a front end of the cartridge, the clock terminal (an input terminal) is placed in a first region on the front end side of the cartridge, and the strobe terminal (an output terminal) is placed in a second region closer to the rear end of the cartridge. Thus, for example, when a cartridge is removed from a game apparatus, an output terminal on the cartridge side (a strobe terminal on the cartridge side) does not come into contact with an output terminal on the game apparatus (a clock terminal on the game apparatus side). Thus, it is possible to pull out the cartridge from the game apparatus more securely.

In addition, in another configuration, at least part of the first data input/output terminal may be aligned in the first direction with at least part of the second data input/output terminal.

According to the above configuration, for example, in a case where the second data input/output terminal is moved in the first direction, the second data input/output terminal overlaps the first data input/output terminal, and the first data input/output terminal and the second data input/output terminal are not substantially shifted in the second direction. Thus, it is possible to shorten the length in the second direction of the cartridge.

In addition, in another configuration, the first data input/output terminal may be configured to connect to a first terminal of the game apparatus when the cartridge is inserted into the cartridge insertion slot, and the second data input/output terminal may be configured to connect to the second terminal of the game apparatus when the cartridge is inserted into the cartridge insertion slot. The first data input/output terminal is placed such that inserting the cartridge into the cartridge insertion slot causes the second terminal of the game apparatus to contact the first data input/output terminal.

According to the above configuration, in the process of inserting the cartridge through a cartridge insertion slot of the game apparatus, a second terminal of the game apparatus comes into contact with the first data input/output terminal provided in the first region of the cartridge. If the cartridge is inserted further, the second terminal of the game apparatus comes into contact with the second data input/output terminal. That is, the first data input/output terminal and the second data input/output terminal are not substantially shifted in the second direction. Thus, it is possible to shorten the length in the second direction of the cartridge.

In addition, in another configuration, the first data input/output terminal and the second data input/output terminal may have the same position in the second direction.

According to the above configuration, the positions in the second direction of the first data input/output terminal and the second data input/output terminal coincide with each other. Thus, it is possible to reduce the length in the second direction of the cartridge.

In addition, in another configuration, the plurality of long terminals may include a chip-enable terminal. One of the ground terminal, the power supply terminal, and the chip-enable terminal may be adjacent to the first data input/output terminal and the second data input/output terminal on at least one side in the second direction.

According to the above configuration, a chip-enable terminal is placed as a long terminal. The chip-enable terminal is a terminal of which the voltage infrequently changes. While data communication is performed via a data input/output terminal, the voltage is almost constant. A long terminal is placed adjacent to two data input/output terminals arranged in the first direction. Thus, the two data input/output terminals are less likely to be influenced by noise from the adjacent long terminal. Further, with the long terminal present adjacent to the two data input/output terminals, it is possible to reduce the influence of the two data input/output terminals on the surroundings.

In addition, in another configuration, one of the long terminals may be adjacent to at least a part of the first data input/output terminal on at least one side in the second direction, and may be adjacent to at least a part of the second data input/output terminal on the at least one side in the second direction.

According to the above configuration, at least parts of two data input/output terminals are placed adjacent, in the second direction, to a single long terminal of which the voltage infrequently changes. Thus, the two data input/output terminals are less likely to be influenced by noise from the adjacent long terminal. Further, with the adjacent long terminal, it is possible to reduce the influence of the two data input/output terminals on the surroundings.

In addition, in another configuration, at least part of the first data input/output terminal is aligned in the second direction with the long terminal adjacent to the first data input/output terminal, and at least part of the second data input/output terminal is aligned in the second direction with the long terminal adjacent to the second data input/output terminal.

According to the above configuration, at least parts of two data input/output terminals are placed adjacent, in the second direction, to a single long terminal of which the voltage infrequently changes. Thus, the two data input/output terminals are less likely to be influenced by noise from the adjacent long terminal. Further, with the adjacent long terminal, it is possible to reduce the influence of the two data input/output terminals on the surroundings.

In addition, in another configuration, one of the ground terminal, the power supply terminal, and the chip-enable terminal may be adjacent to the first data input/output terminal and the second data input/output terminal on one side in the second direction. A first space may be adjacent to the first data input/output terminal and the second data input/output terminal and may be (a) between a terminal adjacent to the first data input/output terminal and the second data input/output terminal and (b) between the first data input/output terminal and the second data input/output terminal, a second space is (a) between the first data input/output terminal and the long terminal adjacent on the one side and (b) between the second data input/output terminal and the long terminal adjacent on the one side. The first space is wider than the second space.

According to the above configuration, a long terminal is provided adjacent to one of the first and second data input/output terminals, and a gap is provided adjacent to the other. Thus, for example, it is possible to place in the gap a conducting wire, a separator, or the like for the first data input/output terminal.

In addition, in another configuration, the ground terminal may be adjacent to the clock terminal and the strobe terminal on at least one side in the second direction.

According to the above configuration, the ground terminal is placed adjacent to the clock terminal and the strobe terminal. Thus, the clock terminal and the strobe terminal are less likely to be influenced by noise from the adjacent ground terminal. Further, with the adjacent ground terminal, it is possible to reduce the influence of the clock terminal and the strobe terminal on the surroundings.

In addition, in another configuration, a ground terminal may be adjacent to at least a part of the clock terminal in the second direction and may be adjacent to at least a part of the strobe terminal in the second direction.

According to the above configuration, at least parts of the clock terminal and the strobe terminal are placed adjacent, in the second direction, to a single ground terminal of which the voltage infrequently changes. Thus, the clock terminal and the strobe terminal are less likely to be influenced by noise from the adjacent ground terminal. Further, with the adjacent ground terminal, it is possible to reduce the influence of the clock terminal and the strobe terminal on the surroundings.

In addition, in another configuration, at least part of the ground terminal adjacent to the clock terminal and the strobe terminal may be aligned in the second direction to the clock terminal and the strobe terminal.

According to the above configuration, at least parts of the clock terminal and the strobe terminal are placed adjacent, in the second direction, to a single ground terminal of which the voltage infrequently changes. Thus, the clock terminal and the strobe terminal are less likely to be influenced by noise from the adjacent ground terminal. Further, with the adjacent ground terminal, it is possible to reduce the influence of the clock terminal and the strobe terminal on the surroundings.

In addition, in another configuration, the plurality of long terminals may include a reset terminal. The reset terminal may be at one end of the terminal placement region in the second direction.

According to the above configuration, a reset terminal is placed at one end in a terminal placement region. Thus, it is possible to make the reset terminal less likely to be influenced by another terminal. Thus, for example, it is possible to prevent circuits in the cartridge from being reset without expectation, or prevent the reset of the circuits in the cartridge from being canceled without expectation.

In addition, in another configuration, a ground terminal may be adjacent to the reset terminal on the other end side of the terminal placement region.

According to the above configuration, the reset terminal is placed at one end of the terminal placement region, and the ground terminal is provided adjacent to the reset terminal in the direction of the other end. Thus, it is possible to make the reset terminal less likely to be influenced by the surroundings. Thus, for example, it is possible to prevent circuits in the cartridge from being reset without expectation, or prevent the reset of the circuits in the cartridge from being canceled without expectation.

In addition, in another configuration, the plurality of terminals may include a third data input/output terminal in the first region and a fourth data input/output terminal in the second region. The third data input/output terminal and the fourth data input/output terminal may be arranged sequentially in the first direction. The power supply terminal may be adjacent to the second data input/output terminal and the first data input/output terminal on one side in the second direction and may be adjacent to the third data input/output terminal and the fourth data input/output terminal on the other side in the second direction.

According to the above configuration, the power supply terminal is placed so as to be sandwiched between a plurality of data input/output terminals. Thus, each data input/output terminal is less likely to be influenced by noise from the power supply terminal. Further, with the power supply terminal adjacent to the data input/output terminal, it is possible to reduce the influence of the data input/output terminal on the surroundings.

In addition, in another configuration, a plurality of data input/output terminals including the first data input/output terminal and the second data input/output terminal and the power supply terminal may be arranged alternately in the second direction in the terminal placement region.

According to the above configuration, in at least a part of the terminal placement region, a data input/output terminal and the power supply terminal are placed so as to be arranged alternately in the second direction. Thus, the data input/output terminal is less likely to be influenced by noise from the power supply terminal. Further, with the power supply terminal, it is possible to reduce the influence of the data input/output terminal on the surroundings.

In addition, in another configuration, the plurality of long terminals may include a chip-enable terminal. The power supply terminal and the chip-enable terminal may be first-type terminals, and the plurality of data input/output terminals may be second-type terminals, the first-type terminals and the second-type terminals may be arranged alternately in the second direction in the terminal placement region.

According to the above configuration, in at least a part of the terminal placement region, a terminal (the chip-enable terminal or the power supply terminal) of which the voltage infrequently changes and a terminal (the data input/output terminal) of which the voltage frequently changes are placed so as to be arranged alternately in the second direction. Thus, the data input/output terminal is less likely to be influenced by noise from a terminal around the data input/output terminal. Further, with the terminal of which the voltage infrequently changes, it is possible to reduce the influence of the data input/output terminal on the surroundings.

In addition, in another configuration, the second-type terminals may include the clock terminal or the strobe terminal. The first-type terminals and the second-type terminals may be arranged alternately in the second direction in the terminal placement region.

According to the above configuration, in at least a part of the terminal placement region, a terminal (the chip-enable terminal or the power supply terminal) of which the voltage infrequently changes and a terminal (the data input/output terminal, the clock terminal, or the strobe terminal) of which the voltage frequently changes can be placed so as to be arranged alternately in the second direction. Thus, the data input/output terminal, the clock terminal, and the strobe terminal are less likely to be influenced by noise from terminals around the data input/output terminal, the clock terminal, and the strobe terminal. Further, it is possible to reduce the influence of the data input/output terminal, the clock terminal, and the strobe terminal on the surroundings.

In addition, in another configuration, the first-type terminals may include the ground terminal. The first-type terminals and the second-type terminals may be arranged alternately in the second direction in the terminal placement region.

According to the above configuration, in at least a part of the terminal placement region, a terminal (the chip-enable terminal, the power supply terminal, or the ground terminal) of which the voltage infrequently changes and a terminal (the data input/output terminal, the clock terminal, or the strobe terminal) of which the voltage frequently changes can be placed so as to be arranged alternately in the second direction. Thus, the data input/output terminal, the clock terminal, and the strobe terminal are less likely to be influenced by noise from terminals around the data input/output terminal, the clock terminal, and the strobe terminal. Further, it is possible to reduce the influence of the data input/output terminal, the clock terminal, and the strobe terminal on the surroundings.

In addition, in another configuration, the plurality of terminals may include a reset terminal. The reset terminal may be at one end of the terminal placement region. The ground terminal may be at the other end of the terminal placement region. The first-type terminals and the second-type terminals are placed alternately from the other end to the one end. A data input/output terminal may be adjacent to the second-type terminals further on the one end side, and the reset terminal may be adjacent to the data input/output terminal further on the one end side.

According to the above configuration, a data input/output terminal (a second-type terminal) is provided adjacent, further in the direction of one end of the terminal placement region, to a second-type terminal placed alternately from the other end to the one end of the terminal placement region. Further, the reset terminal is provided further in the direction of the one end.

In addition, in another configuration, the power supply terminal may include a first power supply terminal and a second power supply terminal.

According to the above configuration, two power supply terminals can be included. For example, it is possible to separate a power supply for a memory control circuit and a power supply for the data input/output terminal.

In addition, in another configuration, the first power supply terminal may be configured to connect to a power supply of approximately 3.1 V, and the second power supply terminal may be configured to connect to a power supply of approximately 1.8 V.

In addition, in another configuration, the first power supply terminal may be configured to supply power to drive a control circuit of a memory, and the second power supply terminal may be configured to supply power to the plurality of data input/output terminals.

According to the above configuration, it is possible to separate the power supply for the memory control circuit and the power supply for the data input/output terminal.

In addition, in another configuration, the long terminals and sets of two terminals in the second region and the first region and arranged in the first direction may be placed alternately in the second direction in the terminal placement region.

According to the above configuration, a single long terminal and two terminals are placed alternately in the second direction. Thus, it is possible to shorten the length in the second direction of the cartridge.

In addition, in another configuration, a plurality of terminal groups each including one of the sets of the two terminals and one of the long terminals may be arranged in the second direction in a part of the terminal placement region. A distance in the second direction between the long terminal and each of the two terminals in each of the terminal groups may be shorter than a distance in the second direction between two of the terminal groups adjacent to each other.

According to the above configuration, it is possible to provide a plurality of terminal groups in the terminal placement region and shorten the distance in the second direction between terminals in a single terminal group. Thus, it is possible to shorten the length in the second direction of the cartridge. Further, for example, it is possible to reduce the influence of two terminals adjacent to a long terminal on the surroundings.

In addition, in another configuration, the cartridge may further include a conducting wire between the terminal groups. The conducting wire may be connected to the terminals in the first region.

According to the above configuration, it is possible to provide, in the gap between terminal groups, wiring for a terminal placed in the first region (i.e., a terminal provided on the side to be inserted first into the cartridge insertion slot). Thus, it is possible to achieve wiring at a lower cost than providing wiring within a substrate.

In addition, in another configuration, the cartridge may further include a plurality of gaps between the terminal groups in the terminal placement region, and two conducting wires may be in at least one of the gaps between the plurality of terminal groups. Each of the two conducting wires may be connected to a corresponding one of two terminals in the first region.

According to the above configuration, wiring for two terminals placed in the first region is provided in the gap between terminal groups. Thus, it is possible to reduce the number of gaps between terminal groups and make the width of the cartridge small.

In addition, in another configuration, at least a part of the conducting wire may extend in a third direction different from the first direction and the second direction from a side surface, in the second direction, of one of the terminals.

According to the above configuration, for example, a conducting wire can be formed so as to extend obliquely from the side surface of a terminal. Thus, it is possible to make a change in the impedance smaller than a case where a conducting wire is bent at a right angle in the middle. Thus, it is possible to reduce the generation of noise.

In addition, in another configuration, a front end of a ground terminal may be located closest to the front end of the cartridge compared to front ends of other terminals, and the ground terminal may be one of the terminals in the first region and the plurality of terminals.

According to the above configuration, for example, when the cartridge is viewed such that the first region is on the lower side, and the second region is on the upper side (i.e., when the cartridge is viewed such that the front end of the cartridge is on the lower side, and the rear end of the cartridge is on the upper side), the lower end of the ground terminal (the front end of the ground terminal) is located at the lowest position. Thus, when the cartridge is inserted into the cartridge insertion slot of the game apparatus, it is possible to configure the ground terminal to come into contact with a ground terminal of the game apparatus first.

In addition, in another configuration, the plurality of long terminals may include a detection terminal configured to allow the game apparatus to detect the cartridge. A front end of the detection terminal is located furthest from the front end of the cartridge compared to front ends of the terminals in the first region and front ends of the plurality of long terminals.

According to the above configuration, for example, when the cartridge is viewed such that the first region is on the lower side, and the second region is on the upper side (i.e., when the cartridge is viewed such that the front end of the cartridge is on the lower side, and the rear end of the cartridge is on the upper side), the lower end of a detection terminal (the front end of the detection terminal) is located at the highest position among terminals placed in the region on the lower side and a plurality of long terminals. That is, the position of the lower end of the detection terminal is located above the position of the lower end of the terminals placed in the region on the lower side and the positions of the lower ends of the plurality of long terminals. Thus, when the cartridge is inserted into the cartridge insertion slot of the game apparatus, it is possible to bring the detection terminal into contact with a detection terminal of the game apparatus last. Thus, it is possible to cause the game apparatus to detect the cartridge after all the terminals on the cartridge side come into contact with the terminals of the game apparatus.

In addition, in another configuration, the detection terminal may double as a ground terminal.

According to the above configuration, the detection terminal can double as a ground terminal. Thus, it is possible to reduce the number of terminals.

In addition, in another configuration, a front end of the power supply terminal may be located a first distance from the front end of the cartridge; and a front end of the clock terminal and a front end of the first data input/output terminal are further from the front end of the cartridge than the first distance.

According to the above configuration, for example, when the cartridge is viewed such that the first region is on the lower side, and the second region is on the upper side (i.e., when the cartridge is viewed such that the front end of the cartridge is on the lower side, and the rear end of the cartridge is on the upper side), the lower end of the power supply terminal (the front end of the power supply terminal) is located below the lower end of the clock terminal (the front end of the clock terminal) and the lower end of the data input/output terminal (the front end of the first data input/output terminal) placed in the region on the lower side. Thus, when the cartridge is inserted into the cartridge insertion slot of the game apparatus, it is possible to bring the power supply terminal into contact with the terminal on the game apparatus side before the clock terminal and the data input/output terminal. Thus, for example, in a case where power is supplied from the game apparatus to the memory control circuit in the cartridge, it is possible to supply power to the memory control circuit before the clock terminal and the data input/output terminal come into contact with the terminals on the game apparatus side.

In addition, in another configuration, the plurality of long terminals may include a chip-enable terminal. The front end of the power supply terminal may be located closer to the front end of the cartridge than (a) a front end of the first data input/output terminal, (b) a front end of the chip-enable terminal, and (c) a front end of the clock terminal.

According to the above configuration, for example, when the cartridge is viewed such that the first region is on the lower side, and the second region is on the upper side (i.e., when the cartridge is viewed such that the front end of the cartridge is on the lower side, and the rear end of the cartridge is on the upper side), the lower end of the power supply terminal is located below the lower end of the data input/output terminal placed in the region on the lower side, the lower end of the chip-enable terminal, and the lower end of the clock terminal. Thus, when the cartridge is inserted into the cartridge insertion slot of the game apparatus, it is possible to bring the power supply terminal into contact with the terminal on the game apparatus side before the clock terminal, the chip-enable terminal, and the data input/output terminal. Thus, for example, in a case where power is supplied from the game apparatus to the memory control circuit in the cartridge, it is possible to supply power to the memory control circuit before the clock terminal, the chip-enable terminal, and the data input/output terminal come into contact with the terminals on the game apparatus side.

In addition, in another configuration, the terminals in the first region and the plurality of long terminals may be configured to come into contact with the terminals of the game apparatus in different orders when the cartridge is inserted into the cartridge insertion slot of the game apparatus.

According to the above configuration, when the cartridge is inserted into or removed from the cartridge insertion slot of the game apparatus, it is possible to bring terminals into contact with terminals on the game apparatus side in different orders.

In addition, in another configuration, a ground terminal may extend further in the first direction than all of the other terminals in the first region and the plurality of terminals so that the ground terminal will contact a terminal of the game cartridge insertion slot before all of the other terminals in the first region and the plurality of terminals.

According to the above configuration, when the cartridge is inserted into the cartridge insertion slot of the game apparatus, it is possible to bring the ground terminal into contact with the ground terminal of the game apparatus first.

In addition, in another configuration, the plurality of long terminals may include a detection terminal configured to allow the game apparatus to detect the cartridge. The detection terminal may extend the least in the first direction of all of the terminals in the first region and the plurality of long terminals so that the detection terminal contacts a terminal of the game apparatus last among all of the terminals in the first region and the plurality of long terminals when the cartridge is inserted into the cartridge insertion slot of the game apparatus.

According to the above configuration, when the cartridge is inserted into the cartridge insertion slot of the game apparatus, the detection terminal on the cartridge side comes into contact with the detection terminal of the game apparatus last. Thus, it is possible to cause the game apparatus to detect the cartridge after all the terminals on the cartridge side come into contact with the terminals of the game apparatus. It is possible to start data communication between the game apparatus and the cartridge after all the terminals are certainly connected together.

In addition, in another configuration, the detection terminal of the cartridge may double as a ground terminal.

According to the above configuration, the detection terminal can double as a ground terminal. Thus, it is possible to reduce the number of terminals.

In addition, in another configuration, the power supply terminal may extend further in the first direction than the clock terminal and the data input/output terminal so that the power supply terminal comes into contact with a terminal of the game apparatus before the clock terminal and the first data input/output terminal when the cartridge is inserted into the cartridge insertion slot of the game apparatus.

According to the above configuration, the power supply terminal comes into contact with the terminal on the game apparatus side before the clock terminal and the data input/output terminal placed in the first region. Thus, for example, in a case where power is supplied from the game apparatus to the memory control circuit in the cartridge, it is possible to supply power to the memory control circuit before the clock terminal and the data input/output terminal placed in the first region come into contact with the terminals on the game apparatus side.

In addition, in another configuration, the plurality of long terminals may include a chip-enable terminal. The cartridge may be configured so that the first data input/output terminal, the chip-enable terminal, and the clock terminal do not extend as far in the first direction as the power supply terminal so that the data input/output terminal in the first region, the chip-enable terminal, and the clock terminal come into contact with a terminal of the game apparatus after the power supply terminal when the cartridge is inserted into the cartridge insertion slot of the game apparatus.

According to the above configuration, the clock terminal, the data input/output terminal, and the chip-enable terminal come into contact with the terminals on the game apparatus side after the power supply terminal. Thus, for example, in a case where power is supplied from the game apparatus to the memory control circuit in the cartridge, it is possible to supply power to the memory control circuit before the clock terminal, the data input/output terminal, and the chip-enable terminal come into contact with the terminals on the game apparatus side.

In addition, in another configuration, the plurality of long terminals may include a detection terminal with which the game apparatus detects the cartridge and which is configured to short-circuit two terminals in the cartridge insertion slot of the game apparatus that are at least partially aligned in the first direction.

According to the above configuration, two terminals arranged in the first direction and provided in the game apparatus are short-circuited, whereby the game apparatus can detect the cartridge.

In addition, in another configuration, two terminals in the cartridge insertion slot of the game apparatus that are at least partially aligned in the first direction may be a terminal on the cartridge insertion slot side and a detection terminal on a far side. The detection terminal of the cartridge may be configured to come into contact with the detection terminal of the game apparatus last among all of the terminals in the first region and the plurality of long terminals when the cartridge is inserted into the cartridge insertion slot of the game apparatus.

According to the above configuration, the detection terminal on the cartridge side comes into contact with the detection terminal on the game apparatus last. Thus, it is possible to start data communication between the game apparatus and the cartridge after all the terminals are certainly connected together.

In addition, in another configuration, the detection terminal of the cartridge may double as a ground terminal.

According to the above configuration, the detection terminal can double as a ground terminal. Thus, it is possible to reduce the number of terminals.

In addition, in another configuration, the cartridge may further include at least one separator located between the plurality of terminals.

According to the above configuration, it is possible to provide separators between terminals.

In addition, in another configuration, the at least one separator may cover a conducting wire connected to at least one of the plurality of terminals.

In addition, in another configuration, the at least one separator may conceal the conducting wire.

According to the above configuration, it is possible to protect conducting wires using the separators.

In addition, in another configuration, the conducting wire may be connected to the terminals in the first region and extend from the front end to the rear end of the cartridge.

According to the above configuration, it is possible to achieve wiring at a low cost and protect the wiring using the separators.

In addition, in another configuration, the separator may be one of a plurality of separators, and at least one of the plurality of separators may cover two conducting wires.

According to the above configuration, it is possible to protect wiring between two terminals using a separator.

In addition, in another configuration, the conducting wire may extend in a third direction different from the first direction and the second direction, from a side surface, in the second direction, of one of the terminals.

According to the above configuration, it is possible to form a conducting wire so as to extend obliquely from the side surface of a terminal, and it is possible to make a change in the impedance smaller than a case where a conducting wire is bent at a right angle in the middle. Thus, it is possible to reduce the generation of noise.

In addition, in another configuration, when the cartridge is viewed a side of the cartridge where the plurality of terminals are exposed, the terminal placement region may be divided into a plurality of regions by the at least one separator, and the plurality of terminals may be in the regions.

According to the above configuration, for example, it is possible, using the separators, to prevent a user's fingers from touching terminals placed in a plurality of regions.

In addition, in another configuration, the at least one separator may be a part of a housing of the cartridge.

According to the above configuration, it is possible to form the separators at a low cost.

In addition, in another configuration, the cartridge may further include an insertion slot configured to receive a storage medium.

According to the above configuration, it is possible to detachably insert an external storage medium into the cartridge. Thus, the game apparatus can read data from the external storage medium or write data to the external storage medium. For example, as the external storage medium detachably inserted into the cartridge, a general-purpose storage medium may be used.

In addition, another example of the exemplary embodiment is a cartridge having a front end and a rear end and capable of connecting to a game apparatus by inserting the cartridge, the front end first, into a cartridge insertion slot of the game apparatus. The cartridge includes a plurality of terminals configured to electrically connect to terminals of the game apparatus in the cartridge insertion slot. A direction in which the cartridge is inserted into or removed from the cartridge insertion slot is a first direction. The plurality of terminals may include a first data input/output terminal and a second data input/output terminal sequentially arranged in the first direction. The first data input/output terminal is closer to the front end of the cartridge than the second input/output terminal is. The cartridge is configured to connect to the game apparatus by inserting the cartridge into the cartridge insertion slot so that the first data input/output terminal is connected to a first terminal of the game apparatus, and the second data input/output terminal is connected to a second terminal of the game apparatus. The first data input/output terminal is placed such that the second terminal of the game apparatus comes into contact with the first data input/output terminal during insertion of the cartridge into the cartridge insertion slot.

According to the above configuration, a cartridge is inserted or removed from into a cartridge insertion slot from a front end of the cartridge. A second data input/output terminal and a first data input/output terminal are placed so as to be arranged in a first direction, and the first data input/output terminal is placed closer to the front end of the cartridge than the second data input/output terminal is. In the process of inserting a cartridge into a cartridge insertion slot of a game apparatus, a second terminal of the game apparatus comes into contact with the first data input/output terminal of the cartridge. If the cartridge is inserted further, the second terminal of the game apparatus comes into contact with the second data input/output terminal. That is, the first data input/output terminal and the second data input/output terminal are not substantially shifted in a second direction. Thus, it is possible to shorten the length in the second direction of the cartridge.

In addition, in another configuration, at least part of the first data input/output terminal may be aligned in the first direction with at least part of the second data input/output terminal.

According to the above configuration, the first data input/output terminal and the second data input/output terminal are not substantially shifted in the second direction. Thus, it is possible to shorten the length in the second direction of the cartridge.

In addition, in another configuration, a direction perpendicular to the first direction may be a second direction. A chip-enable terminal or a power supply terminal may be adjacent to the first data input/output terminal and the second data input/output terminal in the second direction.

According to the above configuration, a chip-enable terminal or a power supply terminal of which the voltage infrequently changes is placed adjacent, in the second direction, to a data input/output terminal of which the voltage frequently changes. Thus, the data input/output terminal is less likely to be influenced by noise. Further, the chip-enable terminal or the power supply terminal is placed adjacent to the data input/output terminal. Thus, it is possible to reduce the influence of the data input/output terminal on the surroundings.

In addition, another example of the exemplary embodiment is a cartridge having a front end and a rear end and capable of connecting to a game apparatus by inserting the cartridge, the front end first, into a cartridge insertion slot of the game apparatus. The cartridge includes a plurality of terminals electrically connected to terminals of the game apparatus in the cartridge insertion slot. The plurality of terminals include a clock terminal configured to receive a clock signal from the game apparatus, and a strobe terminal configured to output a strobe signal to the game apparatus. A direction in which the cartridge is inserted into or removed from the cartridge insertion slot may be a first direction. The strobe terminal and the clock terminal are arranged sequentially in the first direction. The clock terminal is closer to the front end of the cartridge than the strobe terminal is to the front end of the cartridge.

According to the above configuration, a cartridge is inserted or removed from into a cartridge insertion slot from a front end of the cartridge. A strobe terminal (an output terminal) and a clock terminal (an input terminal) are placed so as to be arranged in a first direction, and the clock terminal is placed closer to the front end of the cartridge than the strobe terminal is. Thus, for example, when a cartridge is removed from a game apparatus, an output terminal on the cartridge side (the strobe terminal on the cartridge side) does not come into contact with an output terminal on the game apparatus side (a clock terminal on a game apparatus side). Thus, it is possible to pull out the cartridge from the game apparatus more securely.

In addition, in another configuration, at least part of the clock terminal may be aligned in the first direction with at least part of the strobe terminal.

According to the above configuration, the clock terminal and the strobe terminal are not substantially shifted in the second direction. Thus, it is possible to shorten the length in the second direction of the cartridge.

In addition, in another configuration, when the cartridge is connected to the game apparatus by inserting the cartridge into the cartridge insertion slot, the strobe terminal of the cartridge is connected to a strobe terminal of the game apparatus, and the clock terminal of the cartridge is connected to a clock terminal of the game apparatus. The clock terminal may be placed such that during insertion of the cartridge into the cartridge insertion slot, the strobe terminal of the game apparatus comes into contact with the clock terminal of the cartridge.

According to the above configuration, in the process of inserting the cartridge into the cartridge insertion slot of the game apparatus, the clock terminal on the cartridge side is present on a path through which the strobe terminal on the game apparatus side passes. That is, the clock terminal and the strobe terminal are not substantially shifted in the second direction. Thus, it is possible to shorten the length in the second direction of the cartridge.

In addition, in another configuration, a direction perpendicular to the first direction may be a second direction, a ground terminal may be provided adjacent to the clock terminal and the strobe terminal in the second direction.

According to the above configuration, a ground terminal is placed adjacent to the clock terminal and the strobe terminal, whereby the clock terminal and the strobe terminal are less likely to be influenced by noise. Further, it is possible to reduce the influence of the clock terminal and the strobe terminal on the surroundings.

In addition, another example of the exemplary embodiment is a cartridge having a front end and a rear end and capable of connecting to a game apparatus by inserting the cartridge, the front end first, into a cartridge insertion slot of the game apparatus. The cartridge includes a plurality of terminals configured to be electrically connect to terminals of the game apparatus in the cartridge insertion slot. A direction in which the cartridge is inserted into or removed from the cartridge insertion slot is a first direction. A direction perpendicular to the first direction is a second direction. The plurality of terminals of the cartridge include at least four short terminals and a long terminal with a length in the first direction that is greater than lengths of the short terminals. The four short terminals include a first set of short terminals including two short terminals arranged sequentially in the first direction, and a second set of short terminals including two short terminals arranged sequentially in the first direction and with positions different from the first set of short terminals in the second direction. The long terminal is between the first set of short terminals and the second set of short terminals. At least part of each of the four short terminals is aligned in the second direction with the long terminal. The long terminal is a power supply terminal or a chip-enable terminal. Each of the short terminals is a terminal of which a voltage is configured to change more frequently than a voltage of the long terminal.

According to the above configuration, at least two sets of two short terminals arranged in a first direction are provided, and a long terminal is provided between the two sets of the short terminals. Each short terminal is a terminal of which the voltage frequently changes, and the long terminal is a power supply terminal or a chip-enable terminal of which the voltage infrequently changes. Thus, for example, it is possible to prevent noise from entering the short terminal present adjacent, in the second direction, to the long terminal. Further, with the long terminal provided adjacent to the two short terminals, it is possible to reduce the influence of the two short terminals on the surroundings.

In addition, in another configuration, the four short terminals may be data input/output terminals. The long terminal may be a power supply terminal.

According to the above configuration, the power supply terminal of which the voltage infrequently changes is provided adjacent to a data input/output terminal. Thus, the data input/output terminal is less likely to be influenced by noise from the power supply terminal. Further, with the power supply terminal provided adjacent to the input/output terminal, it is possible to reduce the influence of the data input/output terminal on the surroundings.

In addition, in another configuration, the first set of short terminals may be a clock terminal and a strobe terminal. The second set of short terminals may be two data input/output terminals. The long terminal may be a chip-enable terminal.

According to the above configuration, the chip-enable terminal of which the voltage infrequently changes is provided adjacent to a clock terminal and a strobe terminal. Thus, the clock terminal and the strobe terminal are less likely to be influenced by noise from the chip-enable terminal. Further, for example, with the chip-enable terminal, it is possible to reduce the influence of two data input/output terminals on the surroundings.

In addition, in another configuration, the clock terminal may be closer to the front end of the cartridge than the strobe terminal is to the front end of the cartridge.

According to the above configuration, the clock terminal (an input terminal) and the strobe terminal (an output terminal) are placed so as to be arranged in the first direction, and the clock terminal is placed on the side to be inserted into a cartridge insertion slot first. Thus, for example, when a cartridge is removed from a game apparatus, an output terminal on the cartridge side (the strobe terminal on the cartridge side) does not come into contact with an output terminal on the game apparatus side (a clock terminal on the game apparatus side). Thus, it is possible to pull out the cartridge from the game apparatus more securely.

In addition, another example of the exemplary embodiment is a cartridge capable of connecting to a game apparatus by inserting the cartridge into a cartridge insertion slot of the game apparatus. The cartridge includes a first terminal group and a second terminal group each with terminals configured to electrically connect to the game apparatus. The first terminal group includes a power supply terminal. The second terminal group includes a data input/output terminal. The terminals of the first terminal group and the terminals of the second terminal are alternately arranged in a predetermined direction.

According to the above configuration, a power supply terminal as a first terminal and a data input/output terminal as a second terminal are placed so as to be arranged alternately in a predetermined direction. Thus, for example, the data input/output terminal is less likely to be influenced by noise than a case where data input/output terminals are placed so as to be arranged in the predetermined direction. Further, it is possible to reduce the influence of the data input/output terminal on the surroundings.

In addition, in another configuration, the second terminal group may include a plurality of data input/output terminals. The first terminal group and the plurality of data input/output terminals may be alternately arranged in a predetermined direction.

In addition, in another configuration, the first terminal group may include a plurality of power supply terminals. The plurality of power supply terminals and the plurality of data input/output terminals may be alternately arranged in a predetermined direction.

In addition, in another configuration, the first terminal group may include a chip-enable terminal, and the second terminal group may include a clock terminal or a strobe terminal. The terminals of the first terminal group and the terminals of the second terminal group may be alternately arranged in a predetermined direction.

According to the above configuration, a first terminal (a power supply terminal or a chip-enable terminal) and a second terminal (a data input/output terminal, a clock terminal, or a strobe terminal) are placed so as to be arranged alternately. Thus, the second terminal is less likely to be influenced by noise. Further, it is possible to reduce the influence of the second terminal on the surroundings.

In addition, in another configuration, the first terminal group may include a ground terminal. The terminals of the first terminal group and the terminals of the second terminal group may be placed alternately arranged in a predetermined direction.

According to the above configuration, a first terminal (a power supply terminal, a chip-enable terminal, or a ground terminal) and the second terminal (a data input/output terminal, a clock terminal, or a strobe terminal) are placed so as to be arranged alternately. Thus, the second terminal is less likely to be influenced by noise. Further, it is possible to reduce the influence of the second terminal on the surroundings.

In addition, in another configuration, the second terminal group may include a strobe terminal and a clock terminal arranged sequentially in a first direction perpendicular to the predetermined direction. The first direction may be a direction in which the cartridge is configured to be inserted into the cartridge insertion slot. The clock terminal may be on a side of the cartridge to be inserted into the cartridge insertion slot first when the cartridge is inserted into the cartridge insertion slot.

According to the above configuration, the second terminal (the data input/output terminal, the clock terminal, or the strobe terminal) is less likely to be influenced by noise. Further, it is possible to reduce the influence of the second terminal on the surroundings. Further, the clock terminal (an input terminal) and the strobe terminal (an output terminal) are placed so as to be arranged in a first direction, and the clock terminal is placed on the side to be inserted into a cartridge insertion slot first. Thus, for example, when a cartridge is removed from a game apparatus, an output terminal on the cartridge side (the strobe terminal on the cartridge side) does not come into contact with an output terminal on the game apparatus side (a clock terminal on the game apparatus side). Thus, it is possible to pull out the cartridge from the game apparatus more securely.

In addition, in another configuration, a reset terminal may be in one end portion in the predetermined direction. The first terminal group may include a ground terminal, a chip-enable terminal, a first power supply terminal, and a second power supply terminal. The second terminal group may include a strobe terminal and a plurality of data input/output terminals. The terminals of the first terminal group and the terminals of the second terminal group may be alternately arranged from the other end portion to the one end portion in the predetermined direction. A data input/output terminal may be adjacent, on the one end portion side, to a terminal of the second terminal group placed alternately from the other end portion to the one end portion, and the reset terminal may be adjacent, on the one end portion side, to the data input/output terminal.

According to the above configuration, the first terminal and the second terminal are arranged alternately from the other end portion to one end portion. Further, a data input/output terminal is placed adjacent to the first terminal and the second terminal. Further, a reset terminal is provided on the one end portion side. The reset terminal is provided in the one end portion. Thus, it is possible to make an unnecessary signal less likely to enter the reset terminal.

In addition, in another configuration, a ground terminal may be between the data input/output terminal and the reset terminal, and the data input/output terminal is adjacent, on the one end portion side, to the second terminal group placed alternately from the other end portion to the one end portion.

In addition, another example of the exemplary embodiment is a cartridge capable of connecting to a game apparatus by inserting the cartridge into a cartridge insertion slot of the game apparatus. The cartridge includes: a plurality of first terminals configured to electrically connect to the game apparatus; and a plurality of second terminals configured to electrically connect to the game apparatus. The plurality of first terminals include at least one power supply terminal and at least one ground terminal. The plurality of second terminals include at least one data input/output terminal, a clock terminal, and a strobe terminal. A plurality of dense terminal regions each including at least one of the first terminals and at least one of the second terminals. The plurality of dense terminal regions are arranged sequentially in a predetermined direction. A distance in the predetermined direction between two of the dense terminal regions is longer than a distance in the predetermined direction between the at least one first terminal and the at least one second terminal in each dense terminal region.

According to the above configuration, a plurality of dense terminal regions including the first terminal and the second terminal are placed. The first terminal is a power supply terminal or a ground terminal and is a data input/output terminal, a clock terminal, or a strobe terminal. Such a first terminal is near the second terminal. Thus, the second terminal is less likely to be influenced by noise. Thus, it is possible to reduce the influence of the second terminal on the surroundings. Further, a gap is provided between dense terminal regions. Thus, it is possible to make the dense terminal regions less likely to be influenced by each other.

In addition, in another configuration, the cartridge may further include a conducting wire connected to the at least one first terminal or the at least one second terminal between the dense terminal regions.

According to the above configuration, it is possible to place a conducting wire in a gap between dense terminal regions.

In addition, in another configuration, the cartridge may further include at least one separator between the dense terminal regions.

According to the above configuration, it is possible to cover the gap between the dense terminal regions using a separator. For example, it is possible to make a user's fingers less likely to touch terminals. Further, in a case where a conducting wire is placed in the gap between the dense terminal regions, it is possible to protect the conducting wire using a separator.

In addition, in another configuration, the plurality of dense terminal regions may include a first dense terminal region and a second dense terminal region adjacent to each other. A data input/output terminal in the first dense terminal region and a data input/output terminal in the second dense terminal region may be adjacent to each other.

According to the above configuration, even if a data input/output terminal in a first dense terminal region and a data input/output terminal in a second dense terminal region are adjacent to each other, a gap is provided between the data input/output terminals. Thus, it is possible to make the data input/output terminals less likely to be influenced by each other.

In addition, in another configuration, the cartridge may further include a conducting wire from the data input/output terminal in the first dense terminal region and a conducting wire from the data input/output terminal in the second dense terminal region that are both between the first dense terminal region and the second dense terminal region.

According to the above configuration, in the gap between the first dense terminal region and the second dense terminal region, a conducting wire for a data input/output terminal in each dense terminal region is placed. Thus, it is possible to reduce the number of gaps. Thus, it is possible to make the width of the cartridge small.

In addition, another example of the exemplary embodiment is a cartridge capable of connecting to a game apparatus by inserting the cartridge into a cartridge insertion slot of the game apparatus. The cartridge includes a terminal placement region in which a plurality of terminals configured to electrically connect to terminals of the game apparatus in the cartridge insertion slot are placed. A direction in which a user inserts the cartridge into the cartridge insertion slot is a first direction. A direction perpendicular to the first direction is a second direction. A single first terminal in the first direction and two second terminals in the first direction are arranged alternately in the second direction in a part of the terminal placement region.

According to the above configuration, a single terminal and two terminals arranged in a first direction are placed alternately in a second direction in a part of a terminal placement region. The two terminals are arranged in the first direction, whereby it is possible to shorten a length in the second direction.

In addition, in another configuration, each of the first terminals may be one of a power supply terminal, a ground terminal, and a chip-enable terminal. Each of the second terminals may be one of a data input/output terminal, a strobe terminal, and a clock terminal.

According to the above configuration, a first terminal (a power supply terminal, a ground terminal, or a chip-enable terminal) of which the voltage infrequently changes and a second terminal (a data input/output terminal, a strobe terminal, or a clock terminal) of which the voltage frequently changes are arranged alternately, whereby it is possible to reduce noise in the second terminal (the data input/output terminal, the clock terminal, or the strobe terminal). Further, it is possible to reduce the influence of the second terminal on the surroundings.

In addition, in another configuration, four terminal groups each including one of the first terminals and at least one of the second terminals may be sequentially arranged in the second direction in a part of the terminal placement region.

In addition, in another configuration, the second direction may be a direction from one end to the other end of the terminal placement region. A part of the terminal placement region may include an array, in order, of the first terminal, the second terminal, the first terminal, the second terminal, the first terminal, the second terminal, the first terminal, and the second terminal from the one end to the other end. In order from the one end to the other end, the second terminal, the first terminal, and the first terminal may be placed further on the other end of the second terminal furthest on the other end of the part of the terminal placement region.

According to the exemplary embodiment, for example, it is possible to shorten the width of a cartridge.

In addition, another example of the exemplary embodiment is a cartridge capable of connecting to a game apparatus by inserting the cartridge into a cartridge insertion slot of the game apparatus, the cartridge comprising: a first row of electrical contact points aligned in a first direction that is perpendicular to a second direction that the cartridge is configured to be inserted into the cartridge insertion slot; and a second row of electrical contact points aligned in the first direction and between the first row and an edge of the cartridge that is inserted into the cartridge insertion slot, wherein the first row of electrical contact points are part of, in order, a card detection terminal, a strobe signal terminal, a chip enable terminal, a first data input/output terminal, a first power supply terminal, a second data input/output terminal, a second power supply terminal, a third data input/output terminal, a fourth data input/output terminal, a ground terminal and a reset terminal, the second row of electrical contact points are part of, in order, the card detection terminal, a clock signal terminal, a fifth data input/output terminal, a sixth data input/output terminal, a seventh data input/output terminal and an eighth data input/output terminal, spacing between the electrical contact points is either a first distance or a second distance that is greater than the first distance and the spacing is, in order, the first distance, the second distance, the first distance, the second distance, the first distance, the second distance, the first distance, the second distance, the first distance and the first distance, and the electrical contact point in the first row and the electrical contact point in the second row that are both part of the card detection terminal are aligned in the second direction, the electrical contact point in the second row that is part of the clock signal terminal is aligned in the second direction with the electrical contact point in the first row that is part of the strobe signal terminal, the electrical contact point in the second row that is part of the fifth data input/output terminal is aligned in the second direction with the electrical contact point in the first row that is part of the first data input/output terminal, the electrical contact point in the second row that is part of the sixth data input/output terminal is aligned in the second direction with the electrical contact point in the first row that is part of the second data input/output terminal, the electrical contact point in the second row that is part of the seventh data input/output terminal is aligned in the second direction with the electrical contact point in the first row that is part of the third data input/output terminal, and the electrical contact point in the second row that is part of the eight data input/output terminal is aligned in the second direction with the electrical contact point in the first row that is part of the fourth data input/output terminal.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 5 is a diagram showing non-limiting examples of the details of terminals T1 to T16 provided in the cartridge 1;

FIG. 6 is a diagram illustrating a non-limiting example of the use of the terminals of the cartridge 1;

DETAILED DESCRIPTION OF NON-LIMITING EXAMPLE EMBODIMENTS

Figure 1A:
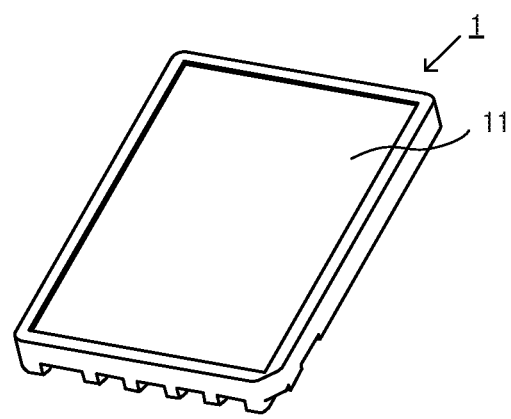
FIG. 1A is an external perspective view showing a non-limiting example of the front surface of a cartridge 1.
Figure 1B:
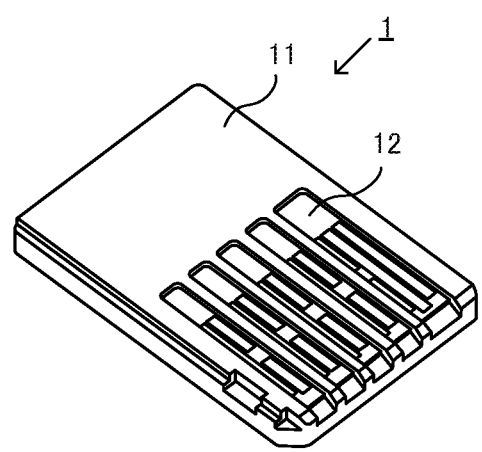
FIG. 1B is an external perspective view showing a non-limiting example of the back surface of the cartridge 1.
Figure 2:
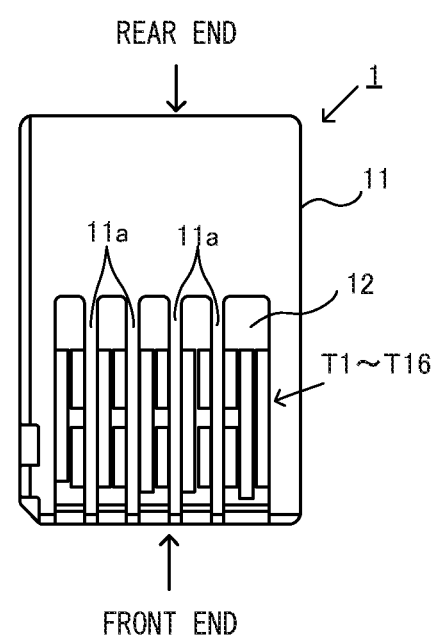
FIG. 2 is an external view of a non-limiting example of the back surface of the cartridge 1.
Figure 3:
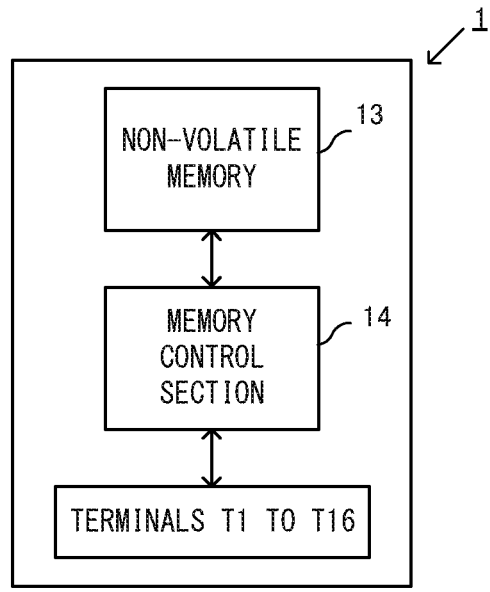
FIG. 3 is a block diagram showing a non-limiting example of the internal configuration of the cartridge 1.

With reference to the drawings, a cartridge (e.g., a memory card) according to an exemplary embodiment is described below. FIGS. 1A and 1B are external perspective views of a cartridge 1 according to the exemplary embodiment. FIG. 1A is an external perspective view showing the front surface of the cartridge 1. FIG. 1B is an external perspective view showing the back surface of the cartridge 1. FIG. 2 is an external view of the back surface of the cartridge 1. FIG. 3 is a block diagram showing the internal configuration of the cartridge 1.

As shown in FIGS. 1A, 1B, and 2, the cartridge 1 is configured by accommodating a substrate 12 in a housing 11 formed of resin or the like. The cartridge 1 is formed to be about 31.1 mm long, about 21.4 mm broad, and about 3.4 mm thick, for example. It should be noted that the size of the cartridge 1 is merely illustrative, and is not limited to this. The cartridge 1 has a front end and a rear end, and in a region on the front end side on the back surface of the cartridge 1, a part of the substrate 12 is exposed from the housing 11, and a plurality of external connection terminals T1 to T16 are provided in the exposed part. The housing 11 includes four separators 11a, and a terminal placement region where the plurality of external connection terminals T1 to T16 are placed is divided into five regions by the separators 11a. The four separators 11a are formed as a part of the housing 11. Here, in the present specification, the front end of the cartridge 1 means the lower end of the cartridge 1 in FIG. 2, and the front ends of the terminals T1 to T16 mean end portions of the respective terminals closer to the front end (the lower end in FIG. 2) of the cartridge 1.

As shown in FIG. 3, on the substrate 12, a non-volatile memory 13, which stores data (e.g., a program, image data, sound data, and the like), a memory control section 14, and the external connection terminals T1 to T16 are implemented. The non-volatile memory 13 may be a read-only memory, or may be a readable and writable memory. For example, a flash memory may be used as the non-volatile memory 13. The memory control section 14 controls the reading of data stored in the non-volatile memory 13 and the writing of data to the non-volatile memory 13. For example, based on a command from an information processing apparatus, the memory control section 14 reads data from the non-volatile memory 13 and outputs the read data to the information processing apparatus. Further, in a case where the non-volatile memory 13 is a writable memory, the memory control section 14 performs control to write, to the non-volatile memory 13, data output from an information processing apparatus. Further, the memory control section 14 may have the function of encrypting and decrypting data. For example, when writing data to the non-volatile memory 13, the memory control section 14 may encrypt data and write the encrypted data to the non-volatile memory 13. Further, when reading data from the non-volatile memory 13, the memory control section 14 may acquire encrypted data from the non-volatile memory 13, decrypt the encrypted data, and output the decrypted data to an information processing apparatus.

Figure 4:
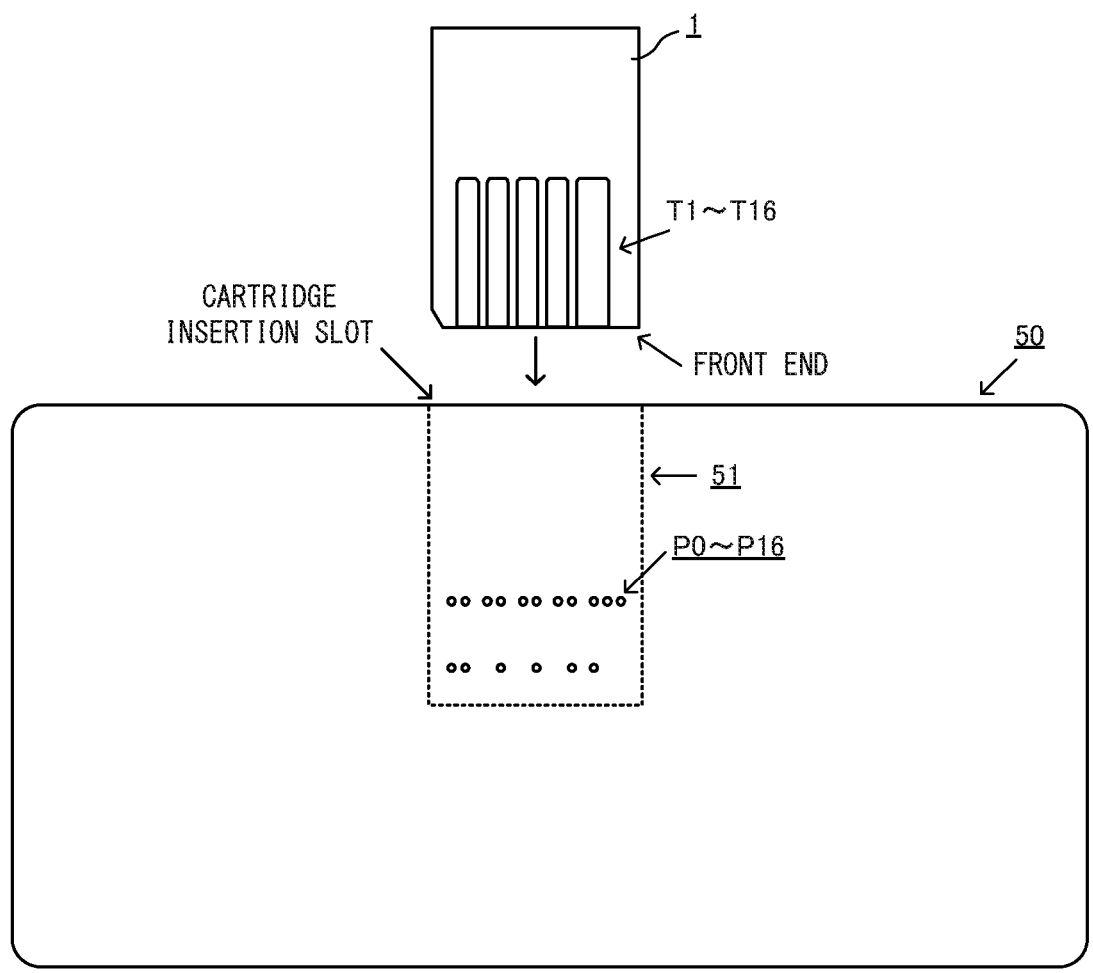
FIG. 4 is a diagram showing a non-limiting example of the state where the cartridge 1 is connected to an information processing apparatus 50.

The cartridge 1 is detachably connected to a predetermined information processing apparatus. FIG. 4 is a diagram showing the state where the cartridge 1 is attached to an information processing apparatus 50.

The information processing apparatus 50 is an apparatus capable of executing various applications. For example, the information processing apparatus 50 may be a mobile game apparatus, or may be a stationary game apparatus. It should be noted that the information processing apparatus 50 is not limited to an apparatus for game use, and may be an apparatus capable of executing any other application. The information processing apparatus 50 may be able to execute a game application and also able to execute another application. Further, the information processing apparatus 50 may not execute a game application and may be an apparatus capable of executing another application. For example, the information processing apparatus 50 may be a mobile phone, a smartphone, a tablet terminal, or the like. For example, the information processing apparatus 50 includes a CPU, a RAM, a storage device (e.g., a non-volatile memory, a magnetic disk, or the like), a display device, an input button, a touch panel, and a communication apparatus, which are not shown in the figures.

As shown in FIG. 4, the information processing apparatus 50 includes a cartridge accommodation portion 51, which accommodates the cartridge 1. For example, on the upper surface of the information processing apparatus 50, a cartridge insertion slot for inserting the cartridge 1 is provided. The cartridge 1 is inserted through the cartridge insertion slot, thereby accommodating the cartridge 1 in the cartridge accommodation portion 51. The cartridge 1 is inserted into the cartridge insertion slot of the information processing apparatus 50 from the side on which the terminals T1 to T16 are placed. That is, the cartridge 1 is inserted into a cartridge insertion slot from the front end of the cartridge 1. A user inserts the cartridge 1 into the cartridge insertion slot of the information processing apparatus 50 downward in FIG. 4 with the side on which the terminals T1 to T16 are placed facing down.

The information processing apparatus 50 can read and execute a predetermined application program (e.g., a game program) stored in the non-volatile memory 13 of the cartridge 1. For example, the predetermined application program may be a program for executing a game application, an application for displaying and photographing a moving image and a still image, an application for creating and editing a document, an application for viewing a web, an application for viewing, transmitting, and receiving email, or the like.

As shown in FIG. 4, in the cartridge accommodation portion 51 of the information processing apparatus 50 (hereinafter occasionally referred to as a "main body"), terminals P0 to P16 on the main body side that are electrically connected to the external connection terminals T1 to T16 of the cartridge 1 are provided. Hereinafter, the external connection terminals T1 to T16 on the cartridge 1 side are referred to as "terminals", and the terminals P0 to P16 on the main body side are referred to as "pins".

Next, the details of the external connection terminals T1 to T16 of the cartridge 1 are described. FIG. 5 is a diagram showing the details of the terminals T1 to T16 provided in the cartridge 1. FIG. 6 is a diagram illustrating the use of the terminals of the cartridge 1.

FIG. 5 is an enlarged view of a part of the substrate 12. FIG. 5 does not show the separators 11a of the housing 11, conducting wires from the terminals T1 to T16, and the like. Here, it is assumed that the cartridge insertion slot of the information processing apparatus 50 is present below FIG. 5, and the user inserts the cartridge 1 into the cartridge insertion slot in a direction from top to bottom (an insertion direction) in FIG. 5. That is, the lower end of the cartridge 1 in FIG. 5 corresponds to the front end of the cartridge 1. Hereinafter, the positional relationships between the external connection terminals (hereinafter referred to simply as "terminals") placed on the substrate 12 are described on the assumption that the direction in which the cartridge 1 is inserted into or removed from the cartridge insertion slot of the information processing apparatus 50 is an up-down direction.

As shown in FIG. 5, in the substrate 12, a terminal placement region A (a region surrounded by a dashed line) where the 16 terminals T1 to T16 are placed is provided. The terminal placement region A is divided into a lower region (also referred to as a "first region") and an upper region (also referred to as a "second region"), which is located above the lower region. The lower region is a region on the side that is inserted first into the cartridge insertion slot in a case where the terminal placement region A is divided into two regions in the insertion/removal direction of the cartridge 1, and is a region on the front end side of the cartridge 1 (e.g., in a case where the terminal placement region A is divided by a dashed line passing through the middle of a gap between two short terminals arranged one above the other and shown in FIG. 5).

In the terminal placement region A, five terminal groups (also referred to as "dense terminal regions") including a plurality of terminals are formed. Specifically, on the leftmost side of the terminal placement region A, a terminal group B1 is provided. To the right side of the terminal group B1, a terminal group B2 is provided. To the right side of the terminal group B2, a terminal group B3 is provided. To the right side of the terminal group B3, a terminal group B4 is provided. To the right side of the terminal group B4, a terminal group B5 is provided. The terminal group B1 is configured such that a single long terminal T1 extending in the up-down direction and two short terminals (T2 and T3) arranged one above the other are arranged in the right direction. Further, the terminal group B2 is configured such that a single long terminal T4 extending in the up-down direction and two short terminals (T5 and T6) arranged one above the other are arranged in the right direction. Further, the terminal group B3 is configured such that a single long terminal T7 extending in the up-down direction and two short terminals (T8 and T9) arranged one above the other are arranged in the right direction. Further, the terminal group B4 is configured such that a single long terminal T10 extending in the up-down direction and two short terminals (T11 and T12) arranged one above the other are arranged in the right direction. Further, the terminal group B5 is configured such that two short terminals (T13 and T14) arranged one above the other, a single long terminal T15 extending in the up-down direction, and a single long terminal T16 extending in the up-down direction are arranged in the right direction. Each terminal is specifically described below.

At the left end of the terminal placement region A, the terminal T1 is provided. The terminal T1 is formed across the upper region and the lower region of the terminal placement region A and formed so as to extend in the up-down direction.

As shown in FIG. 6, the terminal T1 is a ground terminal. The terminal T1 is connected to a ground pin of the information processing apparatus 50, thereby being grounded. Further, the terminal T1 also functions as a detection terminal with which the information processing apparatus 50 detects the cartridge 1. It should be noted that the terminal T1, which functions both as the ground terminal and the detection terminal, is referred to as "GND/DET" in the figures. The terminal T1 is not a terminal through which a high-frequency signal flows as in a clock terminal, a strobe terminal, or data input/output terminals described later. That is, the terminal T1 is a terminal in which the frequency of voltage change is relatively low while the terminal is connected to the ground pin of the information processing apparatus 50. For example, the voltage of the terminal T1 may be almost constant (e.g., 0 V). It should be noted that the voltage of the ground terminal T1 does not need to be 0 V so long as the voltage has a relatively low value.

Near the right side of the terminal T1, the terminal T2 and the terminal T3 are provided. The terminal T2 is provided in the upper region, and the terminal T3 is provided in the lower region. The terminal T2 and the terminal T3 are placed so as to be arranged one above the other, and the positions in the horizontal direction of the terminal T2 and the terminal T3 coincide with each other. That is, the terminal T3 is placed on a straight line extending in the up-down direction from the position of the terminal T2. If the terminal T2 is moved in the down direction to the position of the terminal T3, at least parts of the moved terminal T2 and the terminal T3 overlap each other.

As shown in FIG. 6, the terminal T2 is a terminal (a strobe terminal) for outputting a strobe signal. The terminal T3 is a terminal (a clock terminal) for inputting a clock signal. In the figures, the strobe terminal is referred to as "DQS", and the clock terminal is referred to as "CLK". In a case where the cartridge 1 is normally connected to the information processing apparatus 50 (in a case where the terminals of the cartridge 1 are electrically connected to the pins on the main body side), a clock signal from the information processing apparatus 50 is input to the clock terminal T3. Further, in a case where the cartridge 1 is normally connected to the information processing apparatus 50, a strobe signal is output from the strobe terminal T2 to the information processing apparatus 50.

A clock signal is a signal used by the main body to receive data from the cartridge 1 via a data input/output terminal, or by the main body to transmit data to the cartridge 1 via the data input/output terminal. The clock signal is a signal that periodically changes between a high-voltage state and a low-voltage state, and is a high-frequency signal. Based on the state of the voltage of the data input/output terminal at the time when this clock signal is switched (in other words, the time when a low voltage and a high voltage are switched), it is determined what data ("0" or "1") is flowing through the data input/output terminal. That is, the clock terminal T3 is a terminal through which a high-frequency signal flows, and is a terminal of which the voltage frequently changes.

A strobe signal is a signal for assisting a clock signal. The strobe signal is a signal output from the cartridge 1, is a signal having a waveform similar to that of a clock signal, and is a signal delayed as compared to a clock signal. A time lag occurs between a clock signal output from the main body and a signal output from the non-volatile memory 13 of the cartridge 1 and input to the main body via a circuit in the cartridge 1. On the main body side, the strobe signal is used to determine the degree of this lag. Similarly to the clock terminal T3, the strobe terminal T2 is also a terminal through which a high-frequency signal flows, and is a terminal of which the voltage frequently changes.

To the right side of the terminal T2 and the terminal T3, the terminal T4 is provided. The terminal T4 is formed across the upper region and the lower region in the terminal placement region A and formed so as to extend in the up-down direction.

As shown in FIG. 6, the terminal T4 is a chip-enable terminal. In the figures, the chip-enable terminal is referred to as "CEB". The chip-enable terminal is a terminal for inputting a chip-enable signal for selecting whether or not to input and output data. While data communication (e.g., the input and output of image data, sound data, or the like, or the input and output of a command) is not performed between the cartridge 1 and the information processing apparatus 50, the chip-enable terminal T4 is maintained in a high-voltage state. On the other hand, while data communication is performed between the cartridge 1 and the information processing apparatus 50, the chip-enable terminal T4 is maintained in a low-voltage state. That is, the chip-enable terminal T4 is not a terminal through which a high-frequency signal flows as in the clock terminal T3, the strobe terminal T2, or the data input/output terminals described later. The chip-enable terminal T4 can be said to be a terminal of which the voltage infrequently changes. It should be noted that contrary to the above, while data communication is not performed between the cartridge 1 and the information processing apparatus 50, the chip-enable terminal T4 may be maintained in a low-voltage state, and while data communication is performed between the cartridge 1 and the information processing apparatus 50, the chip-enable terminal T4 may be maintained in a high-voltage state.

Near the right side of the terminal T4, the terminal T5 and the terminal T6 are provided. The terminal T5 is provided in the upper region, and the terminal T6 is provided in the lower region. The terminal T5 and the terminal T6 are placed so as to be arranged one above the other, and the positions in the horizontal direction of the terminal T5 and the terminal T6 coincide with each other. That is, the terminal T6 is placed on a straight line extending in the up-down direction from the position of the terminal T5. If the terminal T5 is moved in the down direction to the position of the terminal T6, at least parts of the moved terminal T5 and the terminal T6 overlap each other.

As shown in FIG. 6, the terminal T5 and the terminal T6 are data input/output terminals. In the figures, each data input/output terminal is referred to as "IO". At a certain time, the data input/output terminal functions as a data input terminal for inputting data to the cartridge 1. At another time, the data input/output terminal functions as a data output terminal for outputting data from the cartridge 1.

Specifically, before data communication is started, the data input/output terminal is in an input state. For example, in a case where the main body reads data stored in the non-volatile memory 13 of the cartridge 1, a command for reading data from the main body is input from the data input/output terminal. At this time, the data input/output terminal is in an input state, and therefore, the command is input. If this command is input, the memory control section 14 switches the data input/output terminal to an output state. Then, the memory control section 14 reads data stored in the non-volatile memory 13 and outputs the read data from the data input/output terminal. If the reading of the data is finished, the memory control section 14 changes back the data input/output terminal to the input state.

Data communication via the data input/output terminal is performed at a relatively high speed. When data or a command is input and output, a high-frequency signal flows through the data input/output terminal. That is, the data input/output terminal can be said to be a terminal of which the voltage frequently changes.

To the right side of the terminal T5 and the terminal T6, the terminal T7 is provided. The terminal T7 is formed across the upper region and the lower region in the terminal placement region A and formed so as to extend in the up-down direction.

The terminal T7 is a power supply terminal for a memory control section (referred to as "Vcc" in the figures). In a case where the cartridge 1 is electrically connected to the main body, the main body supplies power to the terminal T7, and the memory control section 14 of the cartridge 1 operates by the supplied power. The voltage of power supplied from the main body to the terminal T7 is about 3.1 V. The voltage of power supplied from the main body to the terminal T7 is almost constant. That is, the power supply terminal T7 is not a terminal through which a high-frequency signal flows as in the clock terminal, the strobe terminal, or the data input/output terminals. The power supply terminal T7 can be said to be a terminal of which the voltage infrequently changes.

Near the right side of the terminal T7, the terminal T8 and the terminal T9 as data input/output terminals are provided. The terminal T8 is provided in the upper region, and the terminal T9 is provided in the lower region. The terminal T8 and the terminal T9 are placed so as to be arranged one above the other. Specifically, the positions in the horizontal direction of the terminal T8 and the terminal T9 coincide with each other. That is, the terminal T9 is placed on a straight line extending in the up-down direction from the position of the terminal T8. If the terminal T8 is moved in the down direction to the position of the terminal T9, at least parts of the moved terminal T8 and the terminal T9 overlap each other.

To the right side of the terminal T8 and the terminal T9, the terminal T10 is provided. The terminal T10 is formed across the upper region and the lower region in the terminal placement region A and formed so as to extend in the up-down direction.

The terminal T10 is a power supply terminal for data input and output (referred to as "Vccio" in the figures). In a case where the cartridge 1 is electrically connected to the main body, the main body supplies power for data input and output to the terminal T10. This power supply for data input and output supplies power to a data input/output terminal, and data communication is performed between the main body and the cartridge 1 via the data input/output terminal. The voltage of power supplied from the main body to the terminal T10 is about 1.8 V. The voltage of power supplied from the main body to the terminal T10 is almost constant. That is, the power supply terminal T10 is not a terminal through which a high-frequency signal flows as in the clock terminal, the strobe terminal, or the data input/output terminals. The power supply terminal T10 can be said to be a terminal of which the voltage infrequently changes.

Near the right side of the terminal T10, the terminal T11 and the terminal T12 as data input/output terminals are provided. The terminal T11 is provided in the upper region, and the terminal T12 is provided in the lower region. The terminal T11 and the terminal T12 are placed so as to be arranged one above the other. Specifically, the positions in the horizontal direction of the terminal T11 and the terminal T12 coincide with each other. That is, the terminal T12 is placed on a straight line extending in the up-down direction from the position of the terminal T11. If the terminal T11 is moved in the down direction to the position of the terminal T12, at least parts of the moved terminal T11 and the terminal T12 overlap each other.

To the right side of the terminal T11 and the terminal T12, the terminal T13 and the terminal T14 as data input/output terminals are provided. The terminal T13 is provided in the upper region, and the terminal T14 is provided in the lower region. The terminal T13 and the terminal T14 are placed so as to be arranged one above the other. Specifically, the positions in the horizontal direction of the terminal T13 and the terminal T14 coincide with each other. That is, the terminal T14 is placed on a straight line extending in the up-down direction from the position of the terminal T13. If the terminal T13 is moved in the down direction to the position of the terminal T14, at least parts of the moved terminal T13 and the terminal T14 overlap each other.

Here, substantially, the eight data input/output terminals (the terminals T5, T6, T8, T9, and T11 to T14) are all in input states at a certain time and are all in output states at another time. That is, there is no case where at a certain time, some of the eight data input/output terminals are in input states and input data, while the rest of the eight data input/output terminals are in output states and output data. It should be noted that "are all in input states at a certain time and are all in output states at another time" does not mean that the times of switching between the input states and the output states of the eight data input/output terminals completely coincide with each other. The times of switching of the data input/output terminals may not need to completely coincide with each other so long as the eight data input/output terminals switch substantially at the same time.

Near the right side of the terminal T13 and the terminal T14, the terminal T15 is provided. The terminal T15 is provided across the upper region and the lower region in the terminal placement region A and formed so as to extend in the up-down direction.

The terminal T15 is a ground terminal (referred to as "GND" in the figures). The terminal T15 is connected to a ground pin of the main body, thereby grounding the cartridge 1. Since the terminal T15 is a ground terminal, the voltage of the terminal T15 is almost constant (e.g., 0 V). That is, the terminal T15 is not a terminal through which a high-frequency signal flows as in the clock terminal, the strobe terminal, or the data input/output terminals. The terminal T15 can be said to be a terminal of which the voltage infrequently changes.

Near the right side of the terminal T15, the terminal T16 is provided. The terminal T16 is provided across the upper region and the lower region in the terminal placement region A and formed so as to extend in the up-down direction.

The terminal T16 is a reset terminal for inputting a reset signal (referred to as "RES" in the figures). If a reset signal is input to the cartridge 1, each device (the memory control section 14 or the like) of the cartridge 1 is changed back to the initial state. Specifically, when the terminal T16 is at a low voltage, the device is reset. Then, if a predetermined time elapses since the cartridge 1 has been sensed on the main body side, the main body changes the terminal T16 to a high-voltage state, and the reset is canceled. In this state, data communication can be performed between the main body and the cartridge 1. Basically, after the main body and the cartridge 1 are electrically connected together, the terminal T16 is maintained in a high-voltage state (the state where a reset is canceled). Thus, the reset terminal T16 is not a terminal through which a high-frequency signal flows as in the clock terminal, the strobe terminal, or the data input/output terminals. The reset terminal T16 can be said to be a terminal of which the voltage infrequently changes.

(Description of Feature of Placement of Terminals)

Next, the feature of the placement of the terminals is described. As shown in FIG. 5, two terminals are placed so as to be arranged one above the other, and the two terminals arranged one above the other are not shifted in the left-right direction. Thus, it is possible to make the width of the cartridge 1 small, while increasing the number of data input/output terminals. Thus, it is possible to perform high-speed data communication between the cartridge 1 and the information processing apparatus 50. It should be noted that the positions in the left-right direction of the two terminals arranged one above the other may not need to completely coincide with each other. For example, as in the terminals T2 and T3 in FIG. 31 described later, the two terminals arranged one above the other may be slightly shifted in the left-right direction.

In addition, as shown in FIG. 5, near the terminals of which the voltages frequently change, such as the clock terminal, the strobe terminal, and the data input/output terminals, the terminals of which the voltages infrequently change, such as the ground terminals, the chip-enable terminal, and the power supply terminals, are placed. Specifically, near the left side of the strobe terminal T2 and the clock terminal T3, the ground-and-detection terminal T1 is provided. The terminal T1 is formed across the upper region and the lower region and formed with such a length as to be across the entirety of the terminal T2 and a part of the terminal T3.

Figure 7:
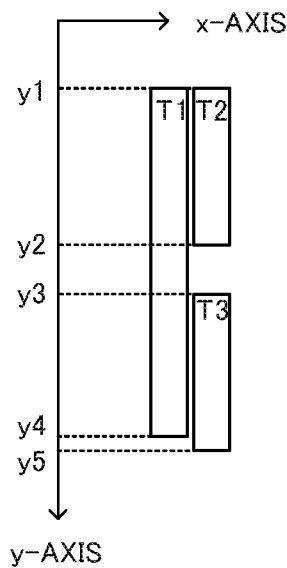
FIG. 7 is a diagram showing a non-limiting example in which the terminals T1, T2, and T3 are extracted, and is a diagram illustrating a non-limiting example of the placement of the terminals.

FIG. 7 is a diagram in which the terminals T1, T2, and T3 are extracted, and is a diagram illustrating the placement of the terminals. An axis parallel with the up-down direction of the cartridge 1 (the direction in which the cartridge 1 is inserted into or removed from the cartridge insertion slot on the main body side) is defined as a y-axis, and an axis parallel with the left-right direction of the cartridge 1 is defined as an x-axis.

As shown in FIG. 7, the y-axis coordinate value of the upper end of the terminal T1 is "y1", and the y-axis coordinate value of the lower end of the terminal T1 is "y4". Further, the y-axis coordinate value of the upper end of the terminal T2 is "y1", and the y-axis coordinate value of the lower end of the terminal T2 is "y2". Further, the y-axis coordinate value of the upper end of the terminal T3 is "y3", and the y-axis coordinate value of the lower end of the terminal T3 is "y5".

The range of the terminal T1 in the y-axis direction is "y1" to "y4". The range of the terminal T2 in the y-axis direction is "y1" to "y2". The range of the entirety of the terminal T2 in the y-axis direction is included in the range of the terminal T1 in the y-axis direction. Further, the range of the terminal T3 in the y-axis direction is "y3" to "y5". A part of the terminal T3 (a portion from y3 to y4) is included in the range of the terminal T1 in the y-axis direction, but another part of the terminal T3 (a portion from y4 to y5) is not included in the range of the terminal T1 in the y-axis direction.

That is, the terminal T1 is present adjacent to the terminal T2 in the horizontal direction of the terminal T2 over the entirety of the terminal T2 in the up-down direction and is present adjacent to the terminal T3 in the horizontal direction of the terminal T3 in a part of the terminal T3 in the up-down direction. For example, if the terminal T2 and the terminal T3 are moved in the left direction to the position of the terminal T1, the entirety of the moved terminal T2 overlaps the terminal T1, and a part of the moved terminal T3 overlaps the terminal T1. It should be noted that if the terminal T2 and the terminal T3 are moved in the left direction to the position of the terminal T1, at least a part of the moved terminal T2 may overlap the terminal T1, and at least a part of the moved terminal T3 may overlap the terminal T1. For example, if the widths in the horizontal direction of the terminal T2 and the terminal T3 are smaller (or greater) than the width in the horizontal direction of the terminal T1, and if the terminal T2 and the terminal T3 are moved to the position of the terminal T1, parts of the moved terminal T2 and the terminal T1 overlap each other, and parts of the moved terminal T3 and the terminal T1 overlap each other. Also in such a case, "the terminal T1 is present adjacent to the terminal T2 in the horizontal direction of the terminal T2 and is present adjacent to the terminal T3 in the horizontal direction of the terminal T3". That is, "the terminal T1 is present adjacent to the terminal T2 in the horizontal direction of the terminal T2" means that if a straight line extends in the horizontal direction (specifically, in the left direction) from at least a part of the terminal T2 in the up-down direction of the terminal T2, the straight line comes into contact with the terminal T1. Similarly, "the terminal T1 is present adjacent to the terminal T3 in the horizontal direction of the terminal T3" means that if a straight line extends in the left direction from at least a part of the terminal T3 (the range from y3 to y4 in the example shown in FIG. 7) in the up-down direction of the terminal T3, the straight line comes into contact with the terminal T1.

As described above, near the strobe terminal T2 and the clock terminal T3, the ground terminal T1 is provided. Thus, the strobe terminal T2 and the clock terminal T3 are less likely to be influenced by noise. That is, the voltage of the terminal T1 is almost constant (e.g., 0 V), and therefore, electromagnetic noise is less likely to be generated from this terminal. Thus, the terminal T2 and the terminal T3, which are located near the terminal T1, are less likely to be influenced by noise.

For example, in a case where near the strobe terminal T2 and the clock terminal T3, a data input/output terminal of which the voltage frequently changes is provided, a high-frequency signal may flow through the data input/output terminal, thereby generating an electromagnetic field and influencing the strobe terminal T2 and the clock terminal T3. The opposite is also true. In a case where near the strobe terminal T2 and the clock terminal T3, a data input/output terminal is provided, a high-frequency signal may flow through the strobe terminal T2 and the clock terminal T3, thereby influencing the data input/output terminal. That is, if a high-frequency signal flows through a certain terminal, the certain terminal may cause the generation of noise, and the waveform of a signal flowing through a terminal present around the certain terminal may be disturbed. If the waveform of a high-frequency signal flowing through the clock terminal T3, the strobe terminal T2, or each data input/output terminal is disturbed, erroneous data may be transmitted and received. In the exemplary embodiment, near the strobe terminal T2 and the clock terminal T3, the terminal of which the voltage frequently changes and which causes the generation of noise is not provided, but the terminal T1 of which the voltage infrequently changes is provided. This can make the terminals less likely to be influenced by noise, and can prevent the transmission and reception of erroneous data. Further, a high-frequency signal flows through the strobe terminal T2 and the clock terminal T3, and therefore may influence another terminal around the strobe terminal T2 and the clock terminal T3. Near the strobe terminal T2 and the clock terminal T3, however, the terminal T1 is provided. This can reduce the influence on another terminal other than the terminals T2 and T3. That is, the influence of an electromagnetic field from the strobe terminal T2 and the clock terminal T3 is likely to be absorbed by the terminal T1 present closest to the strobe terminal T2 and the clock terminal T3. This can make the influence on another terminal smaller than the case where the terminal T1 is not provided near the strobe terminal T2 and the clock terminal T3.

Figure 8A:
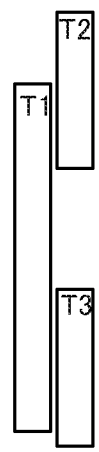
FIG. 8A is a diagram showing a non-limiting example of a case where the terminal T1 is present adjacent to the terminal T2 in the horizontal direction of the terminal T2 in a part of the terminal T2 in the up-down direction and is present adjacent to the terminal T3 in the horizontal direction of the terminal T3 in a part of the terminal T3 in the up-down direction.
Figure 8B:
FIG. 8B is a diagram showing a non-limiting example of a case where the terminal T1 is present adjacent to the terminal T2 in the horizontal direction of the terminal T2 over the entirety of the terminal T2 in the up-down direction and is present adjacent to the terminal T3 in the horizontal direction of the terminal T3 over the entirety of the terminal T3 in the up-down direction.
Figure 8C:
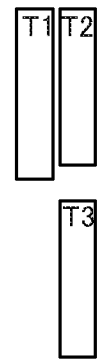
FIG. 8C is a diagram showing a non-limiting example of a case where the terminal T1 is present adjacent to the terminal T2 in the horizontal direction of the terminal T2 over the entirety of the terminal T2 in the up-down direction and is not present adjacent to the terminal T3 in the horizontal direction of the terminal T3 over the entirety of the terminal T3 in the up-down direction.
Figure 8D:
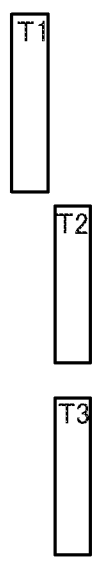
FIG. 8D is a diagram showing a non-limiting example of a case where the terminal T1 is not present adjacent to the terminal T2 in the horizontal direction of the terminal T2 over the entirety of the terminal T2 in the up-down direction and is not present adjacent to the terminal T3 in the horizontal direction of the terminal T3 over the entirety of the terminal T3 in the up-down direction.

FIGS. 8A to 8D are diagrams showing examples of cases where the lengths and the positions of the terminals are changed. FIG. 8A is a diagram showing an example of a case where the terminal T1 is present adjacent to the terminal T2 in the horizontal direction of the terminal T2 in a part of the terminal T2 in the up-down direction and is present adjacent to the terminal T3 in the horizontal direction the terminal T3 in a part of the terminal T3 in the up-down direction. FIG. 8B is a diagram showing an example of a case where the terminal T1 is present adjacent to the terminal T2 in the horizontal direction of the terminal T2 over the entirety of the terminal T2 in the up-down direction and is present adjacent to the terminal T3 in the horizontal direction of the terminal T3 over the entirety of the terminal T3 in the up-down direction. FIG. 8C is a diagram showing an example of a case where the terminal T1 is present adjacent to the terminal T2 in the horizontal direction of the terminal T2 over the entirety of the terminal T2 in the up-down direction and is not present adjacent to the terminal T3 in the horizontal direction of the terminal T3 over the entirety of the terminal T3 in the up-down direction. FIG. 8D is a diagram showing an example of a case where the terminal T1 is not present adjacent to the terminal T2 in the horizontal direction of the terminal T2 over the entirety of the terminal T2 in the up-down direction and is not present adjacent to the terminal T3 in the horizontal direction of the terminal T3 over the entirety of the terminal T3 in the up-down direction. In FIGS. 8A to 8D, the up-down direction corresponds to the y-axis direction in FIG. 7, and the left-right direction corresponds to the x-axis direction in FIG. 7.

In FIG. 8A, the upper end of the terminal T2 is not included in the range of the terminal T1 in the up-down direction, and the lower end of the terminal T2 is included in the range of the terminal T1 in the up-down direction. Further, the upper end of the terminal T3 is included in the range of the terminal T1 in the up-down direction, and the lower end of the terminal T3 is not included in the range of the terminal T1 in the up-down direction. That is, the terminal T1 is present adjacent to the terminal T2 in the horizontal direction of the terminal T2 in a part of the terminal T2 in the up-down direction, and the terminal T1 is present adjacent to the terminal T3 in the horizontal direction of the terminal T3 in a part of the terminal T3 in the up-down direction. In other words, if the terminal T2 and the terminal T3 are moved in the left direction to the position of the terminal T1, a part of the moved terminal T2 overlaps the terminal T1, and a part of the moved terminal T3 overlaps the terminal T1.

In addition, in FIG. 8B, the upper end of the terminal T2 coincides with the upper end of the terminal T1, and the lower end of the terminal T2 is included in the range of the terminal T1 in the up-down direction. Further, the upper end of the terminal T3 is included in the range of the terminal T1 in the up-down direction, and the lower end of the terminal T3 coincides with the lower end of the terminal T1. That is, the terminal T1 is present adjacent to the terminal T2 in the horizontal direction of the terminal T2 over the entirety of the terminal T2 in the up-down direction, and the terminal T1 is present adjacent to the terminal T3 in the horizontal direction of the terminal T3 over the entirety of the terminal T3 in the up-down direction. In other words, if the terminal T2 and the terminal T3 are moved in the left direction to the position of the terminal T1, the entirety of the moved terminal T2 overlaps the terminal T1, and the entirety of the moved terminal T3 overlaps the terminal T1.

Also with the placement of the terminals as shown in FIGS. 8A and 8B, it is possible to produce the effects as described above. That is, in FIGS. 7, 8A, and 8B, the terminal T1 of which the voltage infrequently changes is present near at least a part of the terminal T2 in the horizontal direction of the terminal T2 and is present near at least a part of the terminal T3 in the horizontal direction of the terminal T3. Thus, it is possible to make both the terminal T2 and the terminal T3 less likely to be influenced by noise, and possible to improve the qualities of the waveforms of both the terminal T2 and the terminal T3.

On the other hand, in FIG. 8C, the upper end of the terminal T2 coincides with the upper end of the terminal T1, and the lower end of the terminal T2 is included in the range of the terminal T1 in the up-down direction. However, the upper end of the terminal T3 is not included in the range of the terminal T1 in the up-down direction. That is, the terminal T1 is present adjacent to the terminal T2 in the horizontal direction of the terminal T2 over the entirety of the terminal T2 in the up-down direction, but is not present adjacent to the terminal in the horizontal direction of the T3 the terminal T3 over the entirety of the terminal T3 in the up-down direction. In other words, if the terminal T2 and the terminal T3 are moved in the left direction to the position of the terminal T1, the entirety of the moved terminal T2 overlaps the terminal T1, but the entirety of the moved terminal T3 does not overlap the terminal T1.

Thus, in the placement of the terminals as shown in FIG. 8C, the terminal T1 is present near the terminal T2 in the horizontal direction of the terminal T2. Thus, it is possible to reduce the influence on another terminal as described above. On the other hand, the terminal T1 is not present near the terminal T3 in the horizontal direction of the terminal T3.

In addition, in FIG. 8D, the terminal T2 and the terminal T3 are not included in the range of the terminal T1 in the up-down direction. That is, the terminal T1 is not present adjacent to the terminal T2 in the horizontal direction of the terminal T2 over the entirety of the terminal T2 in the up-down direction, and is not present adjacent to the terminal T3 in the horizontal direction of the terminal T3 over the entirety of the terminal T3 in the up-down direction. In other words, if the terminal T2 and the terminal T3 are moved in the left direction to the position of the terminal T1, the entirety of the moved terminal T2 does not overlap the terminal T1, and the entirety of the moved terminal T3 does not overlap the terminal T1.

Referring back to FIG. 5, the same applies to the data input/output terminals. That is, the data input/output terminals are also terminals of which the voltages frequently change, similarly to the strobe terminal T2 and the clock terminal T3. Near the left side of the data input/output terminals T5 and T6, the chip-enable terminal T4 of which the voltage infrequently changes is provided. Further, near the left side of the data input/output terminals T8 and T9, the power supply terminal T7 of which the voltage infrequently changes is provided. Further, near the left side of the data input/output terminals T11 and T12, the power supply terminal T10 of which the voltage infrequently changes is provided. Further, near the right side of the data input/output terminals T13 and T14, the ground terminal T15 of which the voltage infrequently changes is provided.

As described above, in the exemplary embodiment, in the horizontal direction, near two short terminals (T2 and T3, T5 and T6, T8 and T9, T11 and T12, or T13 and T14) which are arranged in the up-down direction and of which the voltages frequently change, a long terminal (T1, T4, T7, T10, or T15) of which the voltage infrequently changes is placed. The long terminal is formed across the upper region and the lower region and located near at least parts of both the two short terminals. The long terminal is provided near the two short terminals, whereby it is possible to make the two short terminals less likely to be influenced by noise from the long terminal near the two short terminals, and possible to reduce the influence of the two short terminals on another terminal.

It should be noted that a long terminal and two short terminals near the long terminal may be placed as shown in FIGS. 7, 8A, 8B, and 8C.

In addition, to the right side of the reset terminal T16, another terminal is not provided. Thus, the reset terminal T16 is less likely to be influenced by noise. Further, near the left side of the reset terminal T16, the terminal T15 (the ground terminal) of which the voltage infrequently changes is provided. For example, if the terminal T13 and the terminal T14 of which the voltages frequently change are provided near the reset terminal T16, noise may enter the terminal T16, and each device in the cartridge 1 may be reset. In the exemplary embodiment, to minimize noise entering the reset terminal T16, the ground terminal T15 is provided between the reset terminal T16 and the data input/output terminals T13 and T14.

As described above, in the exemplary embodiment, near a terminal (the strobe terminal T2, the clock terminal T3, or the data input/output terminal T5, T6, T8, T9, or T11 to T14) of which the voltage frequently changes, a terminal (the ground terminal T1 or T15, the chip-enable terminal T4, or the power supply terminal T7 or T10) of which the voltage infrequently changes is provided. This can make the terminals less likely to be influenced by noise. Further, it is possible to reduce the influence of the terminal (T2, T3, T5, T6, T8, T9, or T11 to T14) of which the voltage frequently changes, on the surroundings of the terminal.

Figure 9:
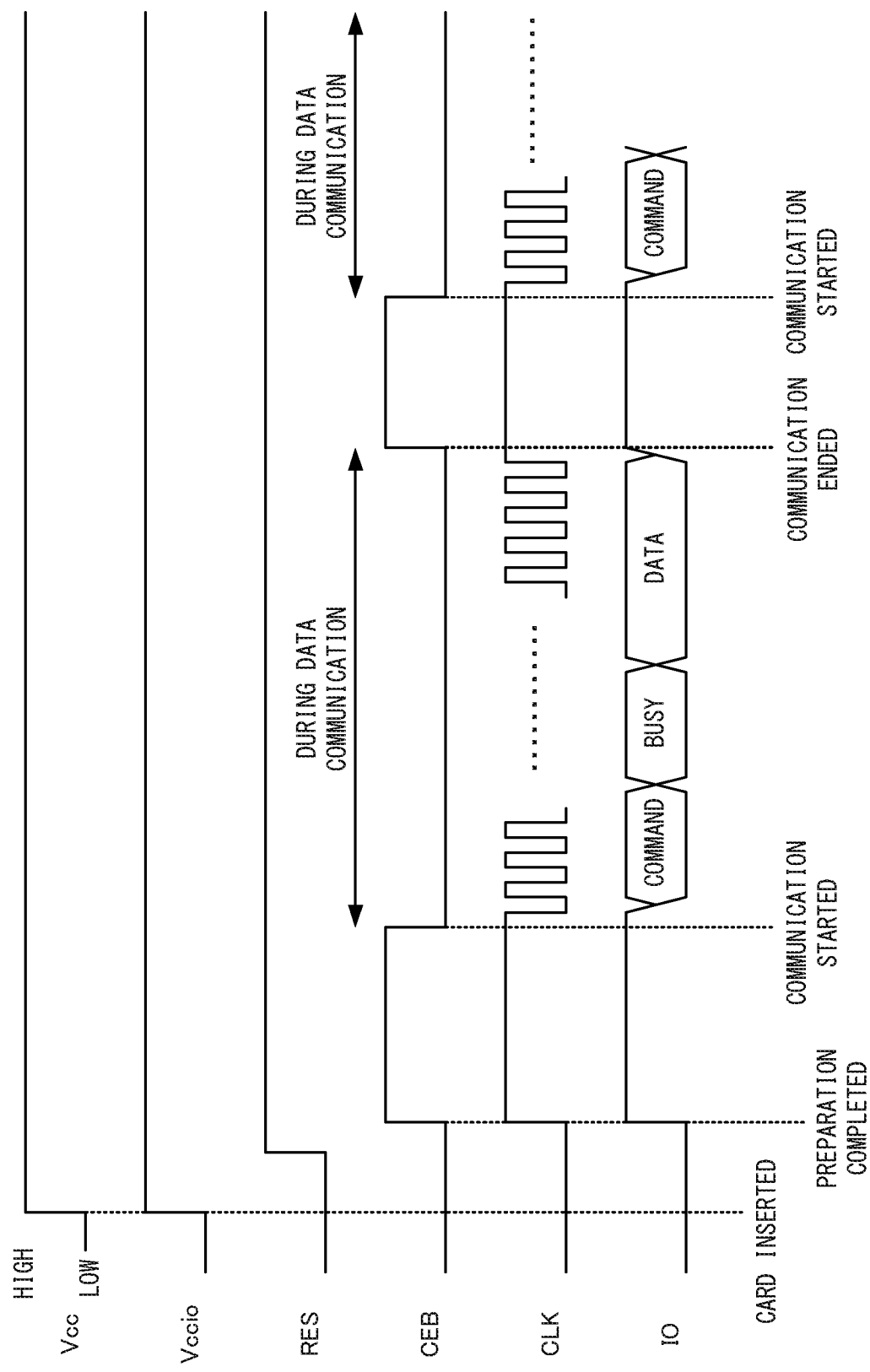
FIG. 9 is a diagram showing a non-limiting example of the state of the voltage of each terminal from when the cartridge 1 is connected to the information processing apparatus 50 to when data communication is performed.

Here, a description is given of the state of the voltage of each terminal when the cartridge 1 is inserted into the cartridge insertion slot of the information processing apparatus 50, and data communication is performed. FIG. 9 is a diagram showing an example of the state of the voltage of each terminal from when the cartridge 1 is connected to the information processing apparatus 50 to when data communication is performed.

As shown in FIG. 9, if the cartridge 1 (a card) is inserted into the cartridge insertion slot of the information processing apparatus 50, then first, the voltage levels of the power supply terminal T7 (Vcc) and the power supply terminal T10 (Vccio) change to "high voltage". Next, the voltage level of the reset terminal T16 (RES) changes to "high voltage". While the cartridge 1 is connected to the information processing apparatus 50, the voltage levels of the power supply terminal T7 (Vcc), the power supply terminal T10 (Vccio), and the reset terminal T16 (RES) are maintained at "high voltage". If the voltage level of the reset terminal T16 (RES) changes to "high voltage", the preparation on the cartridge 1 side is completed, and the voltage level of the chip-enable terminal T4 (CEB) changes to "high voltage".

In a case where the information processing apparatus 50 reads data from the cartridge 1 (or writes data to the cartridge 1), the voltage level of the chip-enable terminal T4 (CEB) changes to "low voltage", and the voltage level of the clock terminal T3 (CLK) changes between "high voltage" and "low voltage" in a constant cycle. It should be noted that although not shown in the figures, also the strobe terminal T2 has a waveform similar to that of the clock terminal T3, except that the waveform of the strobe terminal T2 is slightly delayed. Further, in accordance with input or output data, the eight data input/output terminals (IO) change to "high voltage" and "low voltage". Specifically, a command is transmitted from the information processing apparatus 50 to the cartridge 1 using the eight data input/output terminals (IO), and then, after a predetermined waiting time (BUSY), actual data (e.g., image data, sound data, or the like stored in the cartridge 1) is transmitted from the cartridge 1 to the information processing apparatus 50.

As shown in FIG. 9, while data communication is performed between the information processing apparatus 50 and the cartridge 1, the chip-enable terminal T4 (CEB) is maintained at "low voltage". On the other hand, while the data communication is performed, the clock terminal T3 (and also the strobe terminal T2) and the eight data input/output terminals repeat "high voltage" and "low voltage".

As described above, while the information processing apparatus 50 and the cartridge 1 are connected together, the voltage levels of the power supply terminal T7, the power supply terminal T10, and the reset terminal T16 are maintained at "high voltage". Further, while the information processing apparatus 50 and the cartridge 1 are connected together, the chip-enable terminal T4 changes between "high voltage" and "low voltage", but the voltage of the chip-enable terminal T4 infrequently changes. That is, at the time when the data communication is started, the chip-enable terminal T4 changes from "high voltage" to "low voltage", but is maintained at "low voltage" during the data communication. In contrast, during the data communication (while the chip-enable terminal T4 is maintained at "low voltage"), the clock terminal T3, the strobe terminal T2, and the eight data input/output terminals change between "high voltage" and "low voltage", and the voltages of the clock terminal T3, the strobe terminal T2, and the eight data input/output terminals frequently change.

In the present specification, a terminal of which the voltage level changes between "high voltage" and "low voltage" while data communication is performed is referred to as a "terminal of which the voltage frequently changes". Specifically, the "terminal of which the voltage frequently changes" means the clock terminal T3, the strobe terminal T2, and the eight data input/output terminals (T5, T6, T8, T9, T11, T12, T13, and T14). On the other hand, a terminal of which the voltage level is relatively stable (e.g., a terminal of which the voltage is almost constant) while data communication is performed is referred to as a "terminal of which the voltage infrequently changes". Specifically, the "terminal of which the voltage infrequently changes" means the ground-and-detection terminal T1, the chip-enable terminal T4, the power supply terminals T7 and T10, the ground terminal T15, and the reset terminal T16.

Figure 10:
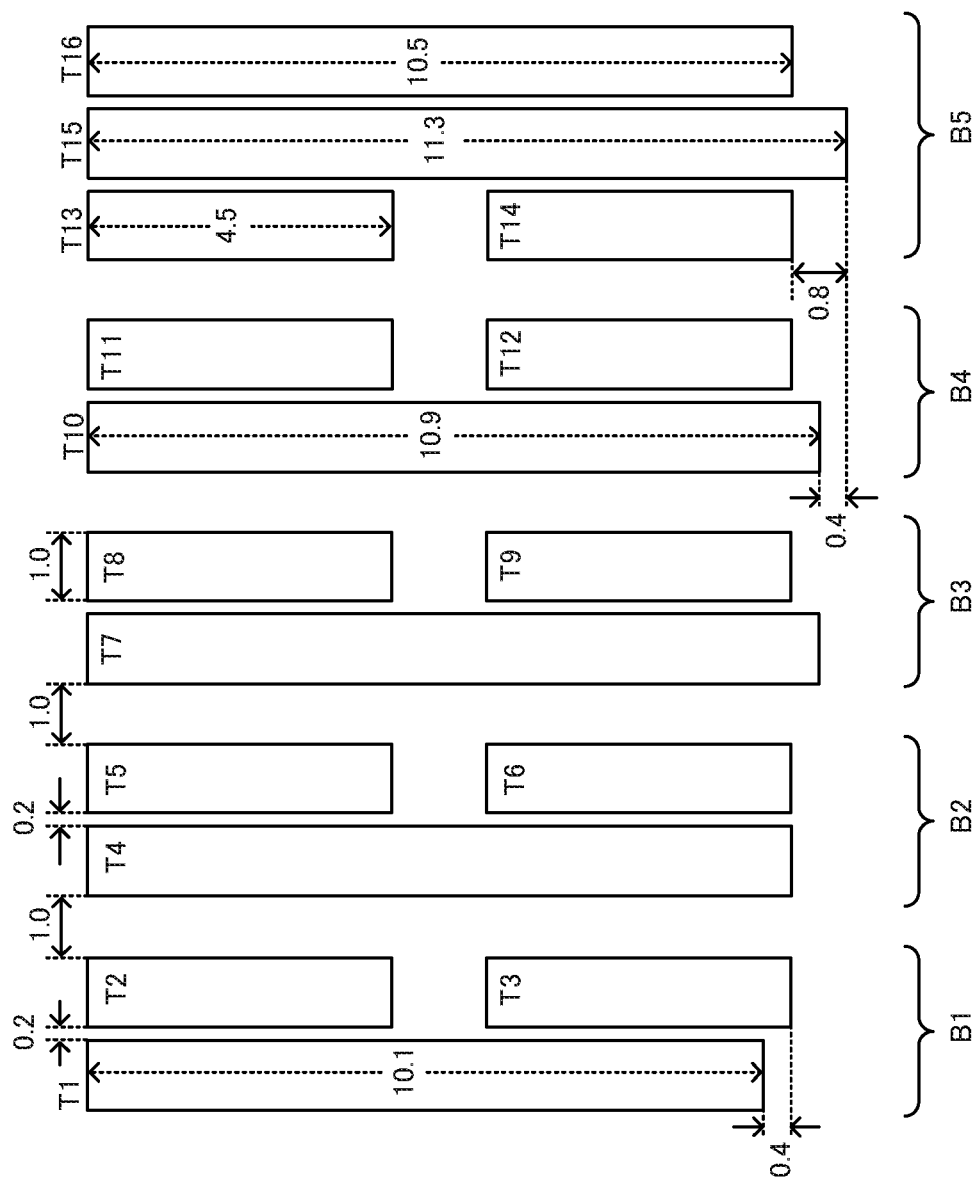
FIG. 10 is a diagram illustrating a non-limiting example of the spaces between the terminals and the positions of the lower ends of the terminals.

Next, a description is given of the spaces between the terminals and the positions of the lower ends of the terminals. FIG. 10 is a diagram illustrating the spaces between the terminals and the positions of the lower ends of the terminals.

As shown in FIG. 10, the distance in the horizontal direction between the terminal T2 and the terminal T1 is about 0.2 mm, for example, and the distance in the horizontal direction between the terminal T3 and the terminal T1 is about 0.2 mm, for example. Similarly, the distance in the horizontal direction between the terminal T5 and the terminal T4, which are included in the terminal group B2, is also about 0.2 mm, and the distance in the horizontal direction between the terminal T6 and the terminal T4, which are included in the terminal group B2, is also about 0.2 mm. The same applies to the other terminal groups. That is, in all the terminal groups, the distance in the horizontal direction between two terminals included in the same terminal group is about 0.2 mm.

In addition, the distance in the horizontal direction between the terminal group B1 and the terminal group B2 is about 1.0 mm. The same applies to the other terminal groups. A certain terminal group is about 1.0 mm away from a terminal group adjacent to the certain terminal group. That is, the distance between a certain terminal group and a terminal group adjacent to the certain terminal group is longer than the distance in the horizontal direction between terminals included in each terminal group.

In the exemplary embodiment, "near" typically means the distance in the horizontal direction (about 0.2 mm) between two terminals included in the same terminal group. It should be noted that the range of "near" is not limited to about 0.2 mm Specifically, the range of "near" may be a range of which the upper limit is the distance between the pin P0 and the pin P2 (e.g., about 1.2 mm) in FIG. 11 (described later).

In addition, the positions in the up-down direction of the six long terminals (T1, T4, T7, T10, T15, and T16) and the upper ends of the five terminals (T2, T5, T8, T11, and T13) present in the upper region coincide with each other. Further, the positions in the up-down direction of the upper ends of the five terminals (T3, T6, T9, T12, and T14) present in the lower region coincide with each other. Further, in the exemplary embodiment, all the widths of the terminals T1 to T16 are the same and are about 1 mm, for example.

All the lengths in the up-down direction of the five short terminals (T2, T5, T8, T11, and T13) present in the upper region and the five short terminals (T3, T6, T9, T12, and T14) present in the lower region are the same and are about 4.5 mm, for example. On the other hand, the positions in the up-down direction of the lower ends of the six long terminals and the positions in the up-down direction of the lower ends of the five terminals in the lower region are different from each other as shown in FIG. 10.

Specifically, as shown in FIG. 10, the terminal T15 is the longest in the up-down direction, and the lower end of the terminal T15 is located at the lowest position. For example, the length in the up-down direction of the terminal T15 is about 11.3 mm. Further, the terminal T7 and the terminal T10 are the second longest after the terminal T15, and the lengths in the up-down direction of the terminal T7 and the terminal T10 are the same. For example, the lengths in the up-down direction of the terminal T7 and the terminal T10 are about 10.9 mm. Thus, the lower ends of the terminal T7 and the terminal T10 are located, for example, about 0.4 mm above the lower end of the terminal T15.

In addition, the lengths in the up-down direction of the terminal T4 and the terminal T16 are the same. For example, the lengths in the up-down direction of the terminal T4 and the terminal T16 are about 10.5 mm.

In addition, the lower ends of the terminals T3, T4, T6, T9, T12, T14, and T16 are aligned. That is, the positions in the up-down direction of the lower ends of the terminals T3, T4, T6, T9, T12, T14, and T16 coincide with each other. The lower ends of the terminals T3, T4, T6, T9, T12, T14, and T16 are located, for example, about 0.8 mm above the lower end of the terminal T15.

In addition, among the plurality of long terminals, the terminal T1 extends downward at the shortest distance. The length in the up-down direction of the terminal T1 is about 10.1 mm, for example. Specifically, the lower end of the terminal T1 is located, for example, about 0.4 mm above the lower end of the terminal T3 (also T4, T6, T9, T12, T14, and T16).

As described above, the front end of the ground terminal T15 (i.e., the lower end of the terminal T15 in FIG. 5) is located closest to the front end of the cartridge 1. Further, among the terminals T1, T3, T4, T6, T7, T9, T10, T12, T14, T15, and T16 (i.e., the terminals other than the terminals provided in the upper region), the front end of the ground-and-detection terminal T1 (see FIG. 5) is located furthest away from the front end of the cartridge 1. Further, the front ends of the power supply terminals T7 and T11 are located closer to the front end of the cartridge 1 than the front end of the clock terminal T3 is (and also the front ends of the chip-enable terminal T4 and the data input/output terminals T6, T9, T12, and T14 are). It should be noted that the size of each terminal shown in FIG. 10 is merely illustrative, and the length and the width of each terminal may be changed.

(Placement of Pins on Main Body Side)

Figure 11:
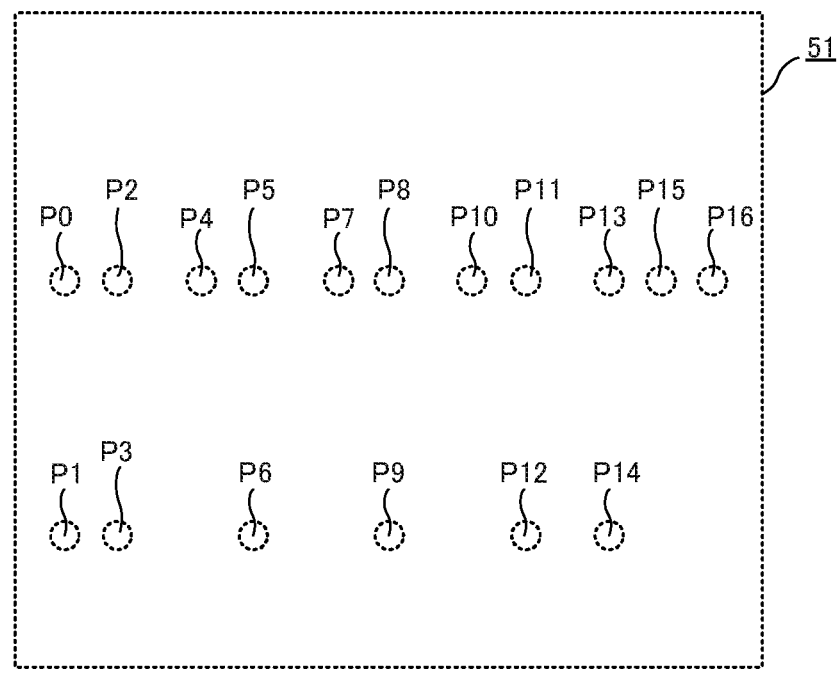
FIG. 11 is a diagram showing a non-limiting example of the placement of pins on the information processing apparatus 50 (main body) side.

Next, the placement of the pins on the main body side is described. FIG. 11 is a diagram showing the placement of the pins on the information processing apparatus 50 (main body) side. In FIG. 11, the cartridge insertion slot is located on the upper side, and the up-down direction in FIG. 11 is the insertion/removal direction of the cartridge 1. As shown in FIG. 11, in the cartridge accommodation portion 51 of the main body, the 17 pins P0 to P16 are placed. The pins P0, P2, P4, P5, P7, P8, P10, P11, P13, P15, and P16 are located in a region on the upper side in the cartridge accommodation portion 51. The pins P0, P2, P4, P5, P7, P8, P10, P11, P13, P15, and P16 are placed so as to be arranged in the horizontal direction. That is, the positions in the up-down direction of the 11 pins P0, P2, P4, P5, P7, P8, P10, P11, P13, P15, and P16 coincide with each other. Further, the pins P1, P3, P6, P9, P12, and P14 are located on the lower side in the cartridge accommodation portion 51 and placed so as to be arranged in the horizontal direction. That is, the positions in the up-down direction of the six pins P1, P3, P6, P9, P12, and P14 coincide with each other.

In addition, the positions in the horizontal direction of two pins arranged in the up-down direction coincide with each other. That is, the positions in the horizontal direction of the pin P0 and the pin P1 coincide with each other. The positions in the horizontal direction of the pin P2 and the pin P3 coincide with each other. The positions in the horizontal direction of the pin P5 and the pin P6 coincide with each other. Further, the positions in the horizontal direction of the pin P8 and the pin P9 coincide with each other. The positions in the horizontal direction of the pin P11 and the pin P12 coincide with each other. The positions in the horizontal direction of the pin P13 and the pin P14 coincide with each other.

The pins P0 to P16 are placed so that when the cartridge 1 is accommodated in the cartridge accommodation portion 51, the pins P0 to P16 are located at almost the centers in the horizontal direction of the terminals T1 to T16. For example, the space between the pin P0 and the pin P2 is about 1.2 mm, which is obtained by adding the widths of the terminals T1 and T2 (1.0 mm×½×2=1.0 mm) to the distance between the terminal T1 and the terminal T2 (about 0.2 mm). Similarly, the space between the pin P4 and the pin P5, the space between the pin P7 and the pin P8, the space between the pin P10 and the pin P11, the space between the pin P13 and the pin P15, the space between the pin P15 and the pin P16, and the space between the pin P1 and the pin P3 are also about 1.2 mm, for example. Further, the space between the pin P2 and the pin P4 is about 2.0 mm, which is obtained by adding the width of the terminals T2 and T4 (about 1.0 mm) to the distance between the terminal group B1 and the terminal group B2 (about 1.0 mm). Similarly, the space between the pin P5 and the pin P7, the space between the pin P8 and the pin P10, and the space between the pin P11 and the pin P13 are also about 2.0 mm.

Figure 12:
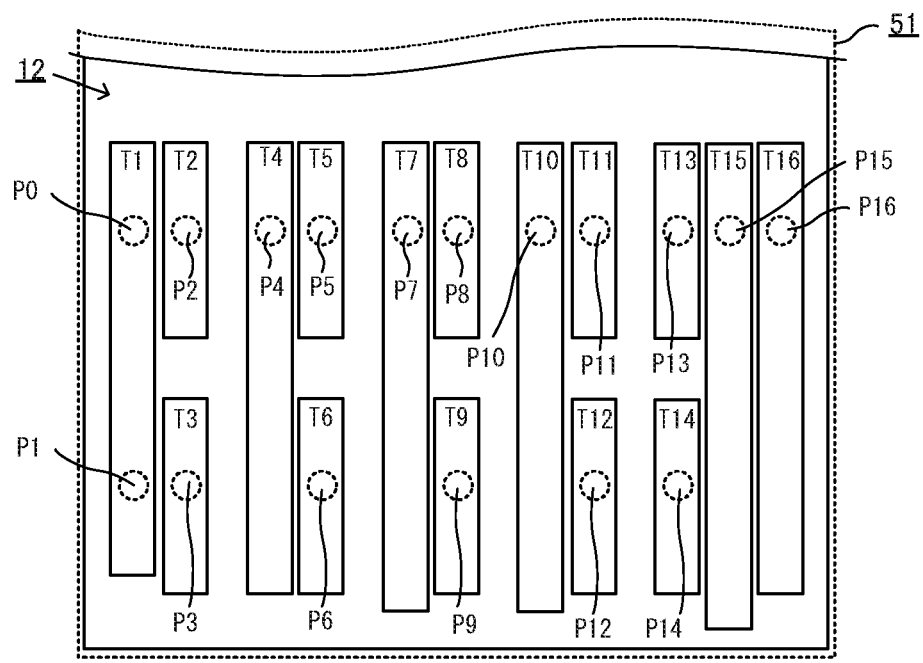
FIG. 12 is a diagram showing a non-limiting example of the connection state between the pins on the main body side and the terminals on the cartridge 1 side when the cartridge 1 is accommodated in a cartridge accommodation portion 51 on the main body side.

FIG. 12 is a diagram showing the connection state between the pins on the main body side and the terminals on the cartridge 1 side when the cartridge 1 is accommodated in the cartridge accommodation portion 51 on the main body side.

As shown in FIG. 12, in a case where the cartridge 1 is completely accommodated in the cartridge accommodation portion 51 on the main body side (i.e., in a case where the cartridge 1 is inserted into the cartridge insertion slot of the main body from the lower end of the cartridge 1, and the cartridge 1 is inserted all the way into the cartridge accommodation portion 51 and fixedly accommodated in the cartridge accommodation portion 51), the terminal T1 of the cartridge 1 is electrically connected to the pins P0 and P1 on the main body side. Further, the terminals T2 to T16 of the cartridge 1 are connected to the pins P2 to P16, respectively, on the main body side.

The pin P0 on the main body side is a ground pin. The pin P1 is a detection pin for detecting the cartridge 1. If sensing the short-circuiting of the pin P0 and the pin P1, the information processing apparatus 50 senses the cartridge 1.

The pin P2 is a strobe signal pin for inputting a strobe signal from the cartridge 1. The pin P3 is a clock signal pin for outputting a clock signal to the cartridge 1. Further, the pin P4 is a pin for outputting a chip-enable signal. Further, the pins P5 and P6 are pins for data input and output. The pin P7 is a power supply pin for supplying power to the memory control section 14 of the cartridge 1, and the voltage of the power to be supplied is about 3.1 V. Further, the pins P8 and P9 are pins for data input and output. Further, the pin P10 is a power supply pin for supplying power for data input and output to the cartridge 1, and the voltage of the power to be supplied is about 1.8 V. The pins P11 to P14 are pins for data input and output. The pin P15 is a ground pin. Further, the pin P16 is a pin for outputting a reset signal (a reset cancellation signal).

(State of Each Terminal when Cartridge is Inserted)

Figure 13:
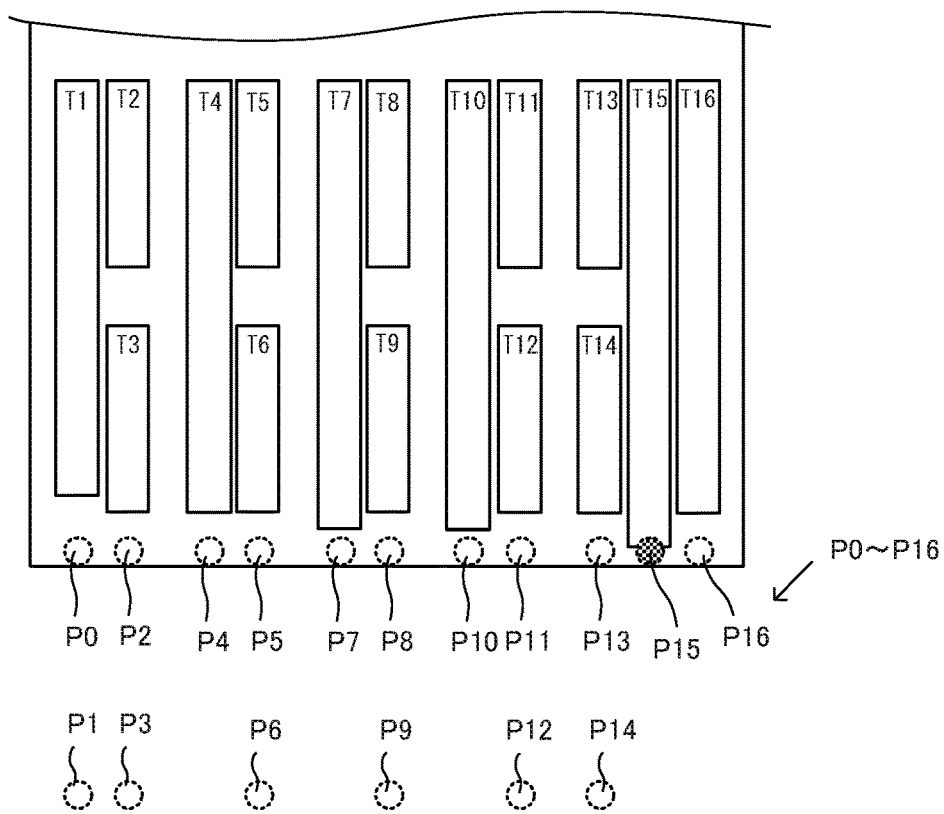
FIG. 13 is a diagram showing a non-limiting example of the state where in a case where the cartridge 1 is inserted into a cartridge insertion slot of the information processing apparatus 50, a terminal of the cartridge 1 comes into contact with a pin on the main body side first.
Figure 14:
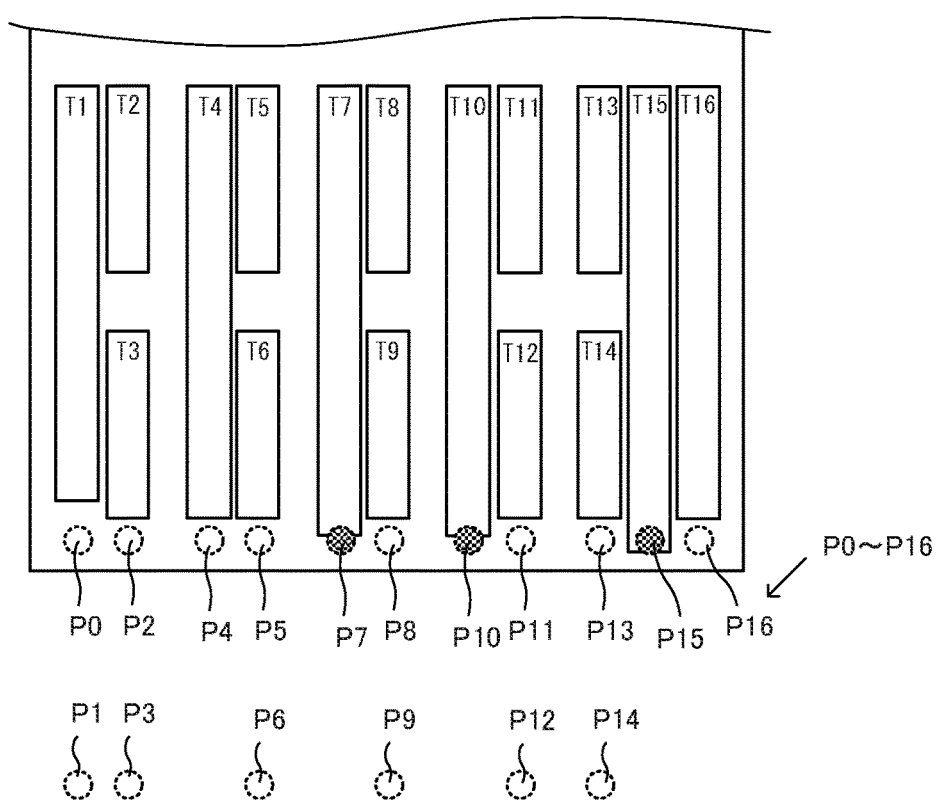
FIG. 14 is a diagram showing a non-limiting example of the state of each terminal when the cartridge 1 is inserted further (downward) from the state in FIG. 13.
Figure 15:
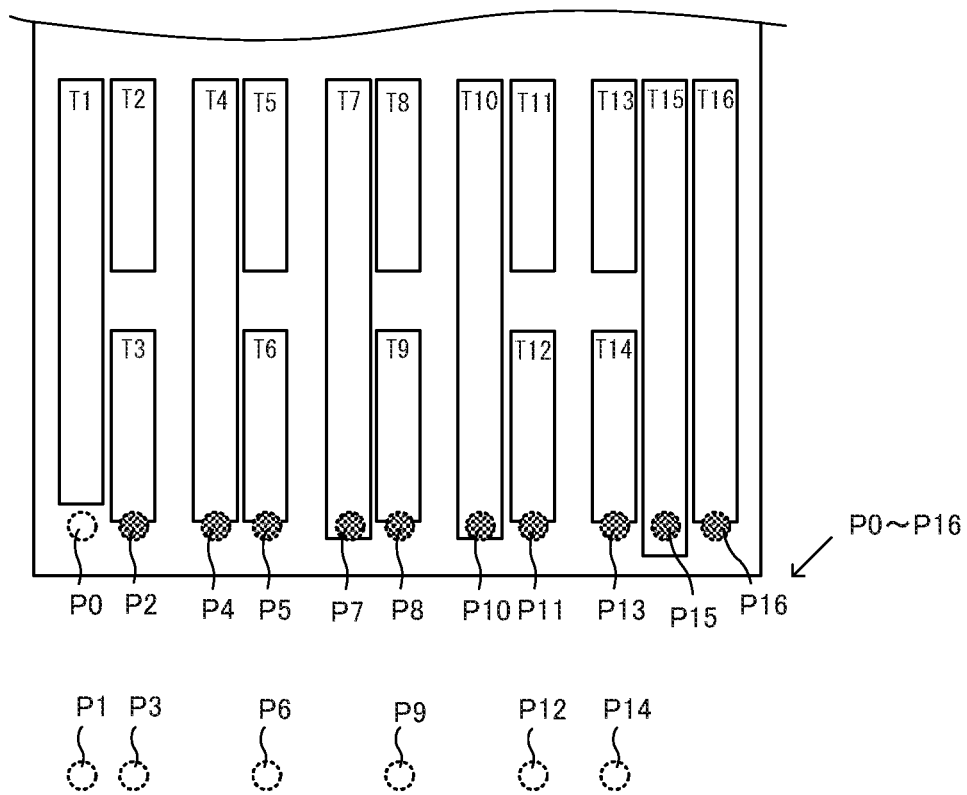
FIG. 15 is a diagram showing a non-limiting example of the state of each terminal when the cartridge 1 is inserted further (downward) from the state in FIG. 14.
Figure 16:
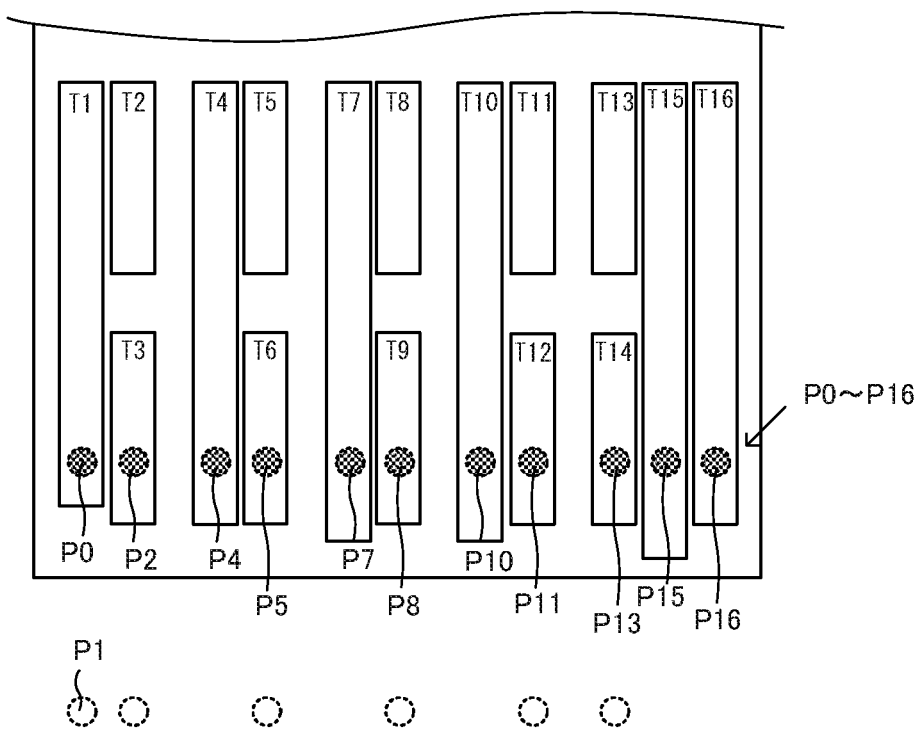
FIG. 16 is a diagram showing a non-limiting example of the state of each terminal when the cartridge 1 is inserted further (downward) from the state in FIG. 15.
Figure 17:
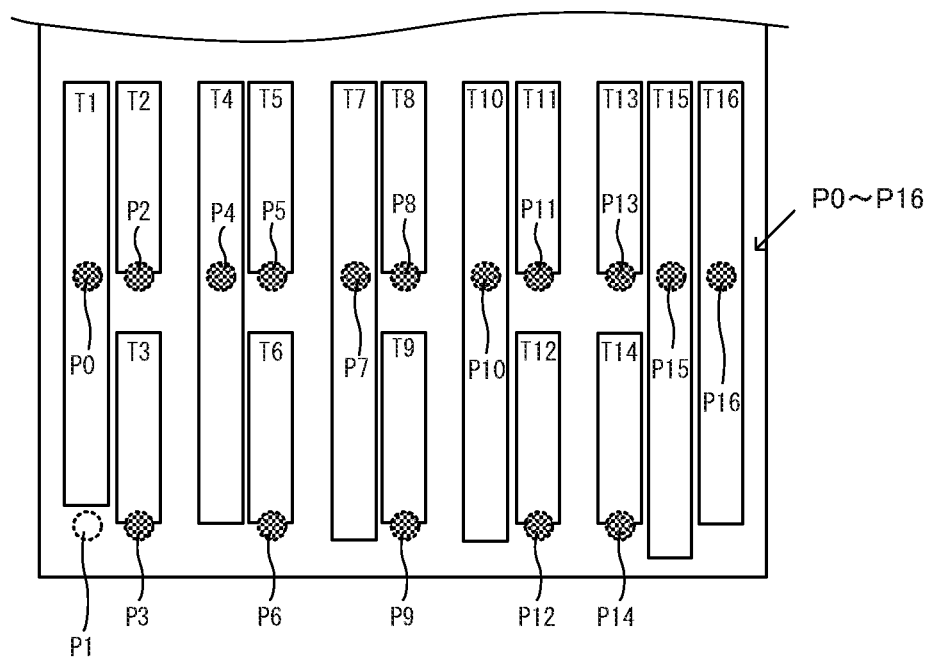
FIG. 17 is a diagram showing a non-limiting example of the state of each terminal when the cartridge 1 is inserted further (downward) from the state in FIG. 16.
Figure 18:
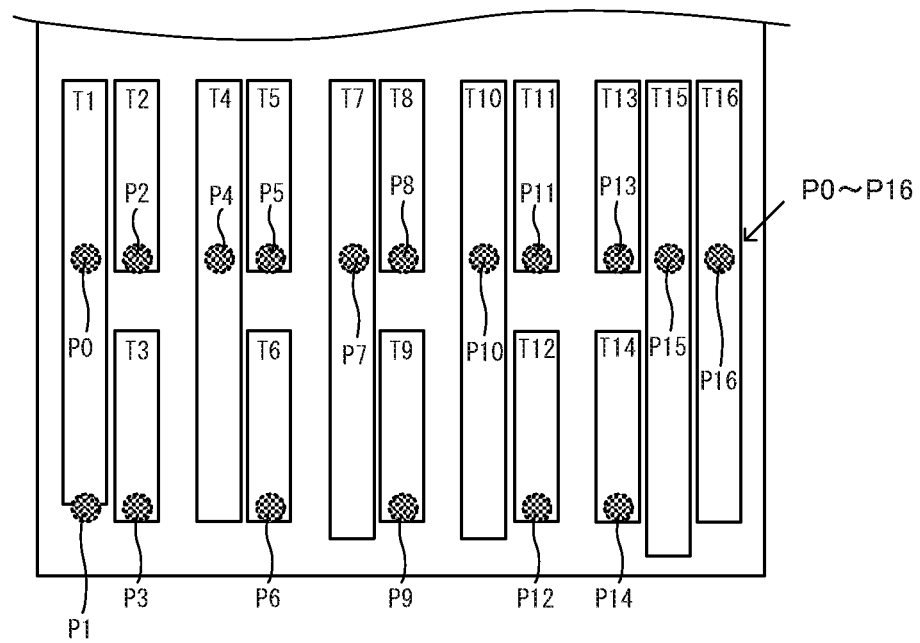
FIG. 18 is a diagram showing a non-limiting example of the state of each terminal when the cartridge 1 is inserted further (downward) from the state in FIG. 17.

Next, a description is given of the state of each terminal when the cartridge 1 is inserted into the cartridge insertion slot of the information processing apparatus 50. FIGS. 13 to 18 are diagrams showing the transition of the contact state of each terminal when the cartridge 1 is inserted into the cartridge insertion slot. FIG. 13 is a diagram showing the state where in a case where the cartridge 1 is inserted into the cartridge insertion slot of the information processing apparatus 50, the terminals of the cartridge 1 come into contact with the pins on the main body side first. FIG. 14 is a diagram showing the state of each terminal when the cartridge 1 is inserted further (downward) from the state in FIG. 13. FIG. 15 is a diagram showing the state of each terminal when the cartridge 1 is inserted further (downward) from the state in FIG. 14. FIG. 16 is a diagram showing the state of each terminal when the cartridge 1 is inserted further (downward) from the state in FIG. 15. FIG. 17 is a diagram showing the state of each terminal when the cartridge 1 is inserted further (downward) from the state in FIG. 16. FIG. 18 is a diagram showing the state of each terminal when the cartridge 1 is inserted further (downward) from the state in FIG. 17.

In FIGS. 13 to 18, a pin on the main body side that is not in contact with a terminal of the cartridge 1 is indicated by a dashed white circle. A pin on the main body side that is in contact with a terminal of the cartridge 1 is indicated by a filled circle.

As shown in FIG. 13, in a case where the cartridge 1 is inserted into the cartridge insertion slot of the information processing apparatus 50, the ground terminal T15 comes into contact with the ground pin P15 on the main body side first because the lower end of the ground terminal T15 is located at the lowest position (i.e., the front end of the ground terminal T15 is located closest to the front end of the cartridge 1). The ground terminal T15 is thus brought into contact with the ground pin P15 on the main body side first, whereby it is possible to release unnecessary electric charges accumulated in the electronic circuits in the cartridge 1.

As shown in FIG. 14, if the cartridge 1 is pushed further down from the state in FIG. 13, the power supply terminals T7 and T10 come into contact with the pins P7 and P10, respectively, on the main body side. The power supply terminal T7 comes into contact with the power supply pin P7 on the main body side, whereby it is possible to supply power to the memory control section 14 in the cartridge 1. In the state where the power supply pin P7 on the main body side is ON (about 3.1 V), the memory control section 14 can operate.

As shown in FIG. 15, if the cartridge 1 is pushed further down from the state in FIG. 14, the terminal T3 comes into contact with the pin P2 on the main body side. The terminal T4 comes into contact with the pin P4 on the main body side. The terminal T6 comes into contact with the pin P5 on the main body side. The terminal T9 comes into contact with the pin P8 on the main body side. The terminal T12 comes into contact with the pin P11 on the main body side. The terminal T14 comes into contact with the pin P13 on the main body side. The terminal T16 comes into contact with the pin P16 on the main body side.

As shown in FIG. 16, if the cartridge 1 is pushed further down from the state in FIG. 15, the terminal T1 comes into contact with the pin P0 on the main body side.

In the states shown in FIGS. 15 and 16, the terminal T3 is in contact with the pin P2. Further, the terminal T6 is in contact with the pin P5. Further, the terminal T9 is in contact with the pin P8. Further, the terminal T12 is in contact with the pin P11. Further, the terminal T14 is in contact with the pin P13. These terminals are in contact with pins different from pins on the main body side to which these terminals should be connected by rights. In this state, however, the detection pin P1 on the main body side is not in contact with the terminal T1. Thus, the main body does not detect the cartridge 1, and a signal is not input from the main body side to each terminal of the cartridge 1.

If the cartridge 1 is pushed further down from the state shown in FIG. 16, the state transitions to that shown in FIG. 17. In this state shown in FIG. 17, all the pins except for the pin P1 on the main body side come into contact with the terminals T1 to T16. That is, the terminal T1 comes into contact with the pin P0. Further, the terminal T2 comes into contact with the pin P2. Further, the terminal T3 comes into contact with the pin P3. Further, the terminal T4 comes into contact with the pin P4. Further, the terminal T5 comes into contact with the pin P5. Further, the terminal T6 comes into contact with the pin P6. Further, the terminal T7 comes into contact with the pin P7. Further, the terminal T8 comes into contact with the pin P8. Further, the terminal T9 comes into contact with the pin P9. Further, the terminal T10 comes into contact with the pin P10. Further, the terminal T11 comes into contact with the pin P11. Further, the terminal T12 comes into contact with the pin P12. Further, the terminal T13 comes into contact with the pin P13. Further, the terminal T14 comes into contact with the pin P14. Further, the terminal T15 comes into contact with the pin P15. Further, the terminal T16 comes into contact with the pin P16. In this state, the detection pin P1 on the main body side is not in contact with the terminal T1. Thus, the main body does not detect the cartridge 1, and a signal is not input from the main body side to each terminal of the cartridge 1.

Then, as shown in FIG. 18, if the cartridge 1 is pushed further down from the state in FIG. 17, the terminal T1 comes into contact with the pin P1 on the main body side, and all the pins P0 to P16 come into contact with the terminals T1 to T16. Consequently, the main body detects the cartridge 1, and a signal is input from the main body side to the cartridge 1.

As is clear from FIGS. 13 to 18, first, the ground terminal T15 comes into contact with the ground pin P15 (FIG. 13). Next, the power supply terminals T7 and T10 come into contact with the power supply pins P7 and P10, respectively (FIG. 14). Next, the chip-enable terminal T4, the reset terminal T16, the strobe terminal T2, the clock terminal T3, and the data input/output terminals (T5, T6, T8, T9, and T11 to T14) come into contact with the pins on the main body side (FIG. 17). Then, finally, the detection terminal T1 comes into contact with the detection pin P1 on the main body side (FIG. 18).

When the cartridge 1 is inserted into the cartridge insertion slot of the information processing apparatus 50, the terminals come into contact with the pins on the main body side in such order, whereby it is possible to insert the cartridge 1 more securely.

That is, the ground terminal T15 comes into contact with the ground pin P15 on the main body side first, whereby it is possible to release unnecessary electric charges accumulated in the circuits in the cartridge 1.

Next, the power supply terminals T7 and T10 come into contact with the power supply pins P7 and P10, respectively, on the main body side, whereby in a case where the power supply pin P7 on the main body side is in an ON state, power is supplied to the memory control section 14 in the cartridge 1, and a signal input to each terminal of the cartridge 1 can be controlled. In a case where power is supplied to the memory control section 14, and the memory control section 14 is in an operable state (in a case where the power supply pin P7 on the main body side is in an ON state, and the power supply pin P7 is in contact with the power supply terminal T7), and even if some unexpected signal is input to a terminal of the cartridge 1, it is possible to control (ignore) such the signal.

In addition, the configuration is such that the detection pin P1 on the main body side comes into contact with the terminal T1 last. Thus, until all the terminals are connected to the pins on the main body side to which the terminals should be connected by rights, the main body does not detect the cartridge 1, and a signal from the main body side is not input to each terminal of the cartridge 1. For example, if the main body side detects the cartridge 1 in the state shown in FIG. 16, a command for reading data may be sent from the main body side to the cartridge 1. In this case, for example, the terminal T6 is connected to the pin P5 even though the terminal T6 should be connected to the pin P6 on the main body side by rights. Thus, an unexpected signal can be input. In the exemplary embodiment, however, the configuration is such that the detection pin P1 on the main body side is connected to the terminal T1 last. This can prevent such a situation from occurring.

It should be noted that the power supply terminals T7 and T10 do not necessarily need to simultaneously come into contact with the pins on the main body side. For example, the power supply terminal T7 may come into contact with the pin P7 on the main body side first. That is, the lower end of the power supply terminal T7 may be provided below the lower end of the power supply terminal T10. Further, for example, the ground terminal T15 may have the same length as those of the power supply terminals T7 and T10.

(State of Each Terminal when Cartridge is Removed)

When the cartridge 1 is removed from the main body, the order is reversed from the above. That is, the state transitions from FIG. 12 to FIGS. 18, 17, 16, 15, 14, and 13 in this order, and all the terminals come out of contact with the pins on the main body side.

Specifically, first, the detection pin P1 comes out of contact with the terminal T1, and the main body recognizes the removal of the cartridge 1 (FIG. 17). In response, the main body immediately switches the reset pin P16 from a high-voltage state to a low-voltage state. That is, a reset signal is transmitted to the cartridge 1. In this state, the reset terminal T16 of the cartridge 1 is in contact with the pin P16 on the main body side, and the power supply terminal T7 is also in contact with the power supply pin P7 on the main body side. Thus, if power is supplied from the main body side, the cartridge 1 can receive this reset signal. The memory control section 14 of the cartridge 1 initializes the circuits in accordance with the reception of this reset signal.

In a reset state (in the state where the reset terminal T16 is at a low voltage (0 V)), the memory control section 14 of the cartridge 1 ignores any signal input from the main body side. Thus, even if some unexpected signal is input to each terminal of the cartridge 1, it is possible to prevent a failure from occurring. For example, even if an erroneous signal is input to, for example, a data input/output terminal of the cartridge 1 from the main body side due to some cause, the memory control section 14 of the cartridge 1 ignores the signal. This can prevent a failure from occurring.

In addition, in the state shown in FIG. 17, the ground terminals T1 and T15 are also in contact with the ground pins on the main body side. Thus, unnecessary electric charges are not accumulated in the circuits in the cartridge 1. Further, the reset terminal T16 is also in contact with the reset pin P16 on the main body side. Thus, the reset terminal T16 does not enter a high-voltage state beyond expectation, and the reset is not canceled. Thus, even if a signal beyond expectation flows through each terminal of the cartridge 1, a failure is unlikely to occur.

In addition, the reset terminal T16 is provided near the right side of the ground terminal T15, and another terminal is not placed to the right side of the reset terminal T16. Thus, when the cartridge 1 is inserted into or removed from the main body, another pin (e.g., a data input/output pin) on the main body side is unlikely to come into contact with the reset terminal T16, and the reset terminal T16 is unlikely to enter a high-voltage state beyond expectation (i.e., the reset is unlikely to be canceled).

If the state shown in FIG. 17 transitions to the state shown in FIG. 16, the terminals T2, T5, T8, T11, and T13 in the upper region of the cartridge 1 come out of contact with the pins P2, P5, P8, P11, and P13 on the upper side of the main body. Instead, the pins P2, P5, P8, P11, and P13 on the upper side of the main body come into contact with the terminals T3, T6, T9, T12, and T14, respectively, in the lower region of the cartridge 1.

Specifically, in this state shown in FIG. 16, the strobe signal pin P2 on the main body side is in contact with the clock terminal T3 of the cartridge 1. The strobe signal pin P2 on the main body side is a pin to which a strobe signal from the cartridge 1 is input, and a signal is not output from the pin P2 to the cartridge 1 side. Further, the terminal T3 of the cartridge 1 is a terminal to which a clock signal from the main body side is input, and a signal is not output from the terminal T3 to the main body side. That is, in the state shown in FIG. 16, the pin P2 for input and the terminal T3 for input are in contact with each other, and a signal does not flow between the pin P2 and the terminal T3.

In a case where the clock terminal and the strobe terminal are opposite (i.e., in a case where the clock signal pin and the clock terminal are on the upper side, and the strobe signal pin and the strobe terminal are on the lower side), and the state transitions to that shown in FIG. 16 when the cartridge 1 is removed from the main body, the clock signal pin on the main body side comes into contact with the strobe terminal on the cartridge 1 side, and an unexpected signal may be input.

In the exemplary embodiment, however, the strobe terminal and the strobe signal pin are placed on the upper side, and the clock terminal and the clock signal pin are placed on the lower side. Thus, when the cartridge 1 is removed from the main body, a pin on the main body side in an input state merely comes into contact with a terminal on the cartridge side in an input state. In this case, as described above, it is possible to prevent an unexpected signal from being input.

In addition, in the state shown in FIG. 16, the data input/output terminals T6, T9, T12, and T14 are in contact with the pins P5, P8, P11, and P13, respectively, on the main body side and are in contact with pins different from pins with which the data input/output terminals T6, T9, T12, and T14 should be in contact by rights. In such a state, however, the power supply terminal T7 is in contact with the power supply pin P7 of the main body, and the memory control section 14 can operate in the reset state (if the power supply pin P7 on the main body side is in an ON state). Thus, even if a signal is input to the terminals T6, T9, T12, and T14, the memory control section 14 can ignore the signal.

In addition, all the eight data input/output terminals enter input states or output states at the same time. Based on a command from the main body side, the memory control section 14 of the cartridge 1 switch all the eight data input/output terminals T5, T6, T8, T9, and T11 to T14 to either input states or output states. For example, in a case where the main body reads data in the cartridge 1, a command for reading data from the eight data input/output pins P5, P6, P8, P9, and P11 to P14 is output. This command is input to the eight data input/output terminals T5, T6, T8, T9, and T11 to T14 in input states. Then, the memory control section 14 of the cartridge 1 switches the eight data input/output terminals to output states. Also on the main body side, the eight data input/output pins are switched to input states. Then, the memory control section 14 reads data from the non-volatile memory 13 and outputs the data from the eight data input/output terminals. If the reading of the data is finished, the memory control section 14 changes back the eight data input/output terminals to input states.

That is, the memory control section 14 switches all the eight data input/output terminals T5, T6, T8, T9, and T11 to T14 to input states at a certain time and switches all the eight data input/output terminals T5, T6, T8, T9, and T11 to T14 to output states at another time.

Thus, even if the state transitions to that shown in FIG. 16 while the cartridge 1 is being removed from the main body, there is no case where the pins P5, P8, P11, and P13 on the main body side enter output states, and the terminals T6, T9, T12, and T14 of the cartridge 1 enter output states. For example, while data is transmitted from the cartridge 1 to the main body side, the eight data input/output pins P5, P6, P8, P9, and P11 to P14 on the main body side are all in input states, and the eight data input/output terminals T5, T6, T8, T9, and T11 to T14 of the cartridge 1 are all in output states. If the cartridge 1 is removed from the main body at high speed while the main body is reading data in the cartridge 1, the pins P5, P8, P11, and P13 on the main body side are in contact with the terminals T6, T9, T12, and T14, respectively, of the cartridge 1 as in FIG. 16 until processing is performed when the cartridge 1 is removed on the main body side (the process of ending data input and output). Even in such a case, the pins P5, P8, P11, and P13 on the main body side are in input states, and the terminals T6, T9, T12, and T14 of the cartridge 1 are in output states. That is, there is no case where both the pins on the main body side and the terminals of the cartridge 1 are in output states. The same applies while data is transmitted from the main body side to the cartridge 1.

As described above, when the cartridge 1 is inserted or removed, the clock terminal T3 and the data input/output terminals T6, T9, T12, and T14 come into contact with pins different from pins on the main body side with which the clock terminal T3 and the data input/output terminals T6, T9, T12, and T14 should come into contact by rights. Even in such a state, however, a terminal and a pin in output states do not come into contact with each other. Further, a signal input to each terminal from the memory control section 14 of the cartridge 1 is controlled. Thus, it is possible to remove the cartridge 1 from the main body with less failure.

If the state shown in FIG. 16 transitions to the state shown in FIG. 15, the terminal T1 comes out of contact with the pin P0 on the main body side. Also in this state, the power supply terminal T7 is in contact with the power supply pin P7 on the main body side, and the memory control section 14 can operate in the reset state (if the power supply pin P7 on the main body side is in an ON state). That is, a signal input to each terminal of the cartridge 1 can be controlled (e.g., the state of the terminal in the reset state (the state where a current does not flow through the terminal) can be maintained) by the memory control section 14.

If the state shown in FIG. 15 transitions to the state shown in FIG. 14, all the terminals except for the power supply terminals T7 and T10 and the ground terminal T15 come out of contact with the pins on the main body side. Also in this state, the reset terminal T16 is in a low-voltage state (0 V), and the power supply terminal T7 is in contact with the power supply pin P7 on the main body side. Thus, if the power supply pin P7 on the main body side is in an ON state, power is supplied to the memory control section 14. Thus, the memory control section 14 can operate.

If the state shown in FIG. 14 transitions to the state shown in FIG. 13, the two power supply terminals T7 and T10 come out of contact with the power supply pins P7 and P10 on the main body side, and only the ground terminal T15 is in contact with the ground pin P15 on the main body side. Then, finally, the ground terminal T15 comes out of contact with the pin P15 on the main body side, and the cartridge 1 is completely pulled out from the main body. Since the ground terminal T15 is removed from the main body last (the ground terminal T15 is in contact with the ground pin P15 in the main body to the last), the cartridge 1 is removed from the main body in an electrically stable state.

As described above, in the cartridge 1 according to the exemplary embodiment, the above placement and the above lengths of the terminals are employed. Thus, it is possible to insert or remove the cartridge 1 more securely.

(Wiring from Each Terminal)

Figure 19:
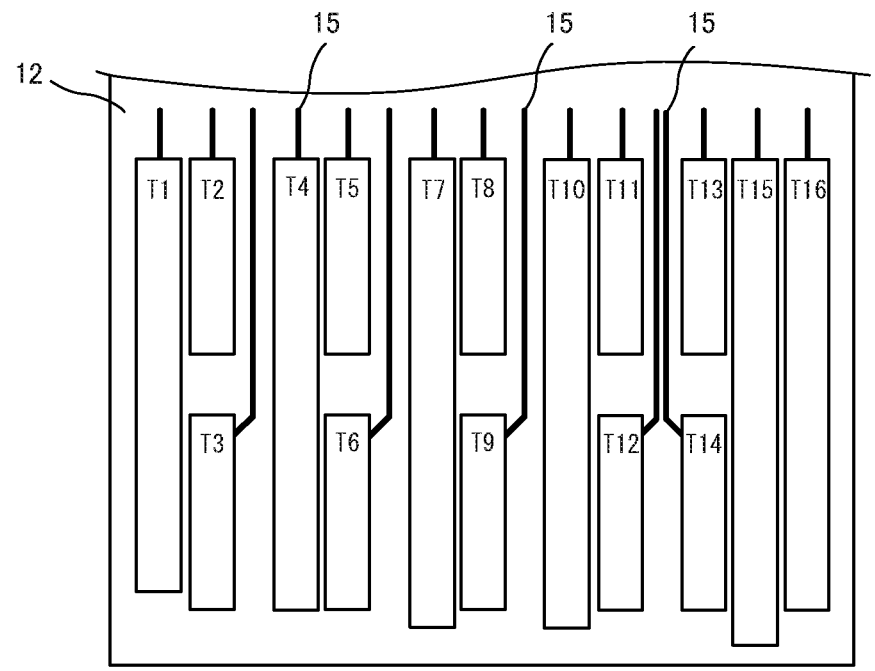
FIG. 19 is a diagram showing non-limiting examples of conducting wires formed on a substrate 12 of the cartridge 1.

Next, a description is given of wiring for connecting each terminal to the circuits in the cartridge 1. FIG. 19 is a diagram showing conducting wires formed on the substrate 12 of the cartridge 1.

As shown in FIG. 19, conducting wires 15 are formed by printing on the front surface of the substrate 12. Although not shown in the figures, the terminals T1 to T16 are connected to the memory control section 14 in the cartridge 1 by the conducting wires 15. The conducting wires from the terminals T3, T6, T9, T12, and T14 provided in the lower region extend upward through the gaps between the terminal groups. Specifically, the conducting wires are drawn obliquely upward (e.g., in a 45-degree direction such that the horizontal direction is 0 degrees) from the sides of the terminals T3, T6, T9, T12, and T14 provided in the lower region. Then, the conducting wires are formed so as to bend sharply in the middle and extend linearly in the up direction.

Here, it is also possible that each conducting wire is drawn in a 0-degree direction (a lateral direction) from the side of the terminal, is bent at a right angle in the middle, and extends upward. However, if the conducting wire is bent at a right angle in the middle, the line width in this right-angle portion is greater than those in other portions, and the impedance changes at the right-angle portion. This causes the generation of noise. Thus, in the exemplary embodiment, the configuration is such that the conducting wire is bent at an angle (e.g., 45 degrees) smaller than 90 degrees to make a change in the line width small, i.e., make a change in the impedance small, thereby making noise less likely to be generated.

In addition, as shown in FIG. 19, the conducting wire from the terminal T12 and the conducting wire from the terminal T14 extend upward through the same gap. This can reduce the number of gaps, and therefore can make the width of the entirety of the cartridge 1 small.

In addition, in the exemplary embodiment, the conducting wires are drawn from the sides of the terminals T3, T6, T9, T12, and T14 provided in the lower region, without drawing the conducting wires from the upper ends of the terminals T3, T6, T9, T12, and T14. Consequently, when the substrate 12 is accommodated in the housing 11, these conducting wires are hidden behind the separators 11a of the housing 11. Further, the conducting wires are not drawn from the upper ends of the terminals but are drawn from the sides. Thus, when the cartridge 1 is inserted into or removed from the main body, the pins on the main body side do not come into contact with the conducting wires (a pin on the main body side passes between terminals placed one above the other, the pin does not pass over a conducting wire). Thus, it is possible to prevent physical damage on the conducting wires.

Figure 20:
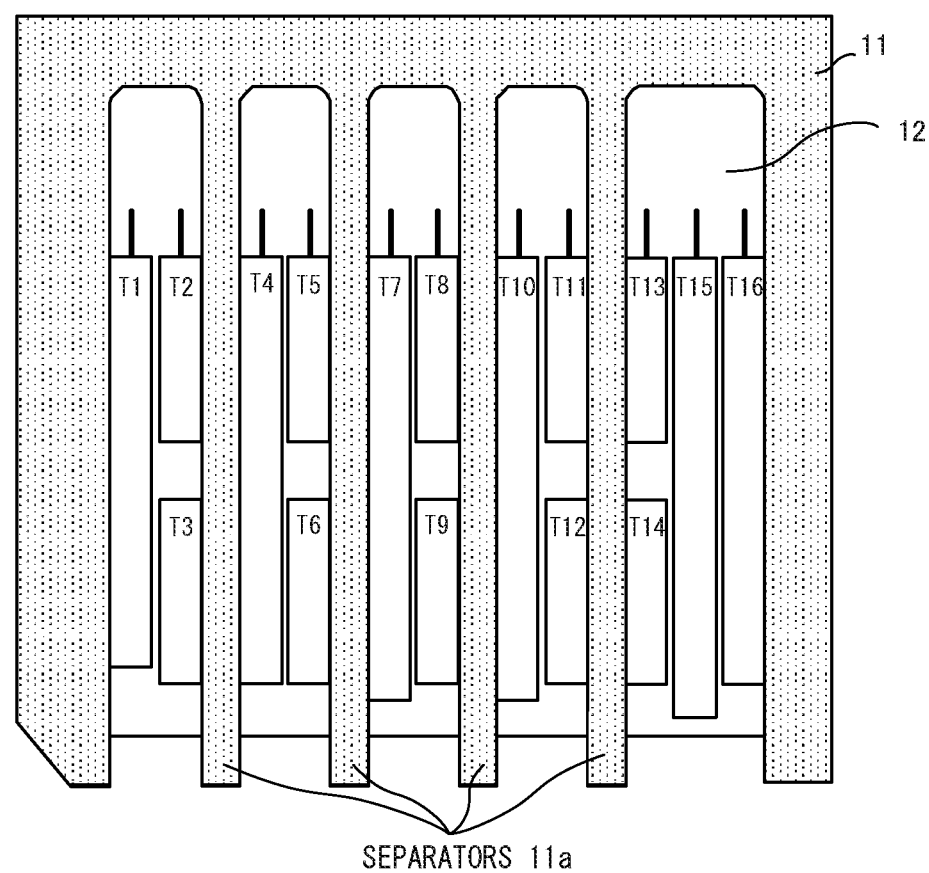
FIG. 20 is an enlarged view of a non-limiting example of a part of the cartridge 1 when the substrate 12 is accommodated in a housing 11.

FIG. 20 is an enlarged view of a part of the cartridge 1 when the substrate 12 is accommodated in the housing 11. As shown in FIG. 20, the terminals T1 to T16 are exposed to the outside, and the gap between a terminal group (e.g., the terminals T1 to T3) and a terminal group (e.g., the terminals T4 to T6) is covered by one of the separators 11a, which is a part of the housing 11. As described above, all the conducting wires from the terminals T3, T6, T9, T12, and T14 are concealed by the separators 11a. Thus, it is possible to protect the conducting wires. Further, with the separators 11a, it is possible to prevent the user's fingers from touching the terminals.

It should be noted that the exemplary embodiment is not limited to the case where the conducting wires 15 are formed by printing on the front surface of the substrate 12. Alternatively, the configuration may be such that the conducting wires 15 are formed within the substrate so that the conducting wires 15 are not visible on the front surface of the substrate 12.

(Main Effects)

As described above, the terminals T1 to T16 of the cartridge 1 are characterized in their placement and lengths, which produce the following main effects.

That is, a plurality of sets of two terminals arranged in the up-down direction (the insertion/removal direction of the cartridge 1) are placed in the horizontal direction. This can increase the number of data input/output terminals to enable high-speed data input and output, and also can shorten the length in the horizontal direction of the cartridge 1.

In addition, near a terminal (the data input/output terminals, the strobe terminal, or the clock terminal) of which the voltage frequently changes, a terminal (the ground terminals, the power supply terminals, the chip-enable terminal, or the reset terminal) of which the voltage infrequently changes is provided. Particularly, two terminals of which the voltages frequently change are arranged one above the other, and near the two terminals in the left direction or the right direction, a long terminal of which the voltage infrequently changes and which is across the upper region and the lower region is provided. This makes it possible to place two short terminals of which the voltages frequently change, adjacent to a single long terminal of which the voltage infrequently changes. Thus, even if many data input/output terminals are placed, it is possible to place long terminals near the data input/output terminals. As described above, near a terminal of which the voltage frequently changes, a terminal of which the voltage infrequently changes is provided, whereby it is possible to make the terminal of which the voltage frequently changes less likely to be influenced by noise. Further, near a terminal of which the voltage frequently changes, a long terminal of which the voltage infrequently changes is provided, whereby it is possible to reduce the influence of the terminal of which the voltage frequently changes, on the surroundings of the terminal.

In addition, in the exemplary embodiment, the strobe terminal T2 and the clock terminal T3 are placed in the upper region and the lower region, respectively. Consequently, when the cartridge 1 is removed from the main body, the clock signal pin (output) on the main body side does not come into contact with the strobe terminal (output) on the cartridge side. Thus, it is possible to remove the cartridge 1 from the main body more securely.

In addition, in the exemplary embodiment, four sets of two data input/output terminals arranged one above the other are provided. The eight data input/output terminals are all in input states or output states at a certain time. Thus, when the cartridge 1 is removed from the main body, and even if a data input/output terminal in the lower region comes into contact with a data input/output pin on the upper side on the main body side, there is no case where both the main body side and the cartridge side are in output states. Thus, it is possible to remove the cartridge 1 from the main body with less failure.

In addition, in the exemplary embodiment, the configuration is such that when the cartridge 1 is inserted into the main body, the terminal T1 comes into contact with the detection pin P1 on the main body side last. Consequently, until all the terminals are connected to the pins on the main body side, the main body does not detect the cartridge 1, and an unexpected signal is not input from the main body to the cartridge 1. Conversely, when the cartridge 1 is removed from the main body, the detection pin P1 on the main body side separates from the terminal T1 first, and the main body does not detect the cartridge 1. After that, a signal is not output from the main body. Thus, it is possible to decrease the likelihood that an unexpected signal is input from the main body side to the cartridge 1.

In addition, in the exemplary embodiment, when the cartridge 1 is inserted into the main body, the ground terminal T15 comes into contact with the ground pin P15 first. Thus, it is possible to release unnecessary electric charges accumulated in the circuits of the cartridge 1.

In addition, in the exemplary embodiment, when the cartridge 1 is inserted into the main body, the power supply terminal T7 comes into contact with the power supply pin on the main body side before the data input/output terminals, the reset terminal, and the chip-enable terminal come into contact with the pins on the main body side. This makes it possible to supply power to the power supply terminal T7. In a case where the power supply pin P7 on the main body side is in an ON state, the memory control section 14 of the cartridge 1 can operate. Consequently, even if an unexpected signal is input to each terminal before the cartridge 1 is completely inserted into the main body, the signal can be controlled.

(Variations)

It should be noted that the shapes, the placement, and the sizes of the above terminals of the cartridge 1 are not limited to those described above. Variations of the cartridge 1 are described below.

FIGS. 21 to 31 are diagrams showing examples of terminals in another exemplary embodiment. In FIGS. 21 to 31, similarly to the above, terminals placed on the substrate 12 of the cartridge 1 are represented as "T1 to T16", and pins on the main body side are represented as "P0 to P16".

Figure 21:
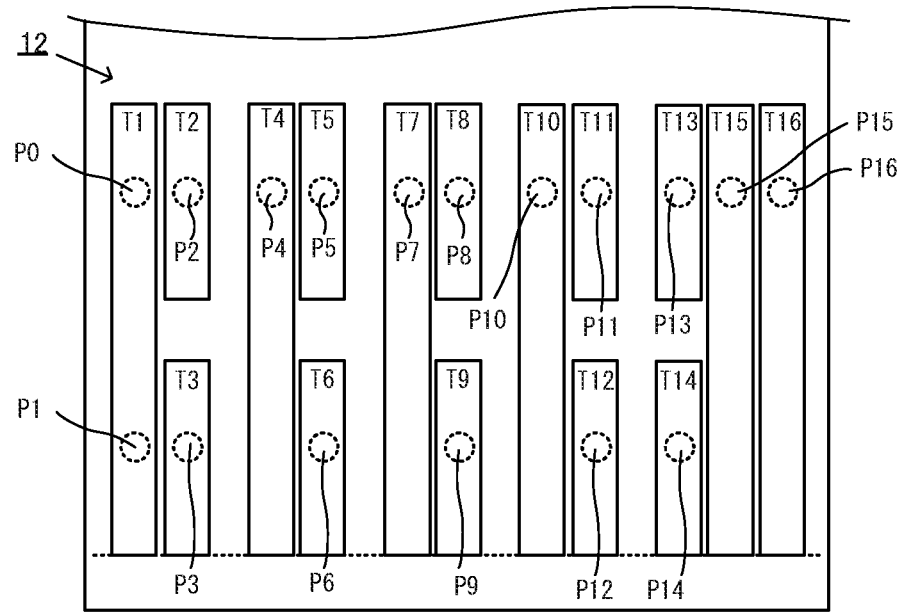
FIG. 21 is a diagram showing non-limiting examples of the shapes of terminals according to another exemplary embodiment.

As shown in FIG. 21, the lower ends of the terminals may be all aligned. Specifically, in a variation shown in FIG. 21, the positions in the up-down direction of the lower ends of the six long terminals (T1, T4, T7, T10, T15, and T16) across the upper region and the lower region and the positions in the up-down direction of the lower ends of the five terminals (T3, T6, T9, T12, and T14) in the lower region coincide with each other.

Figure 22:
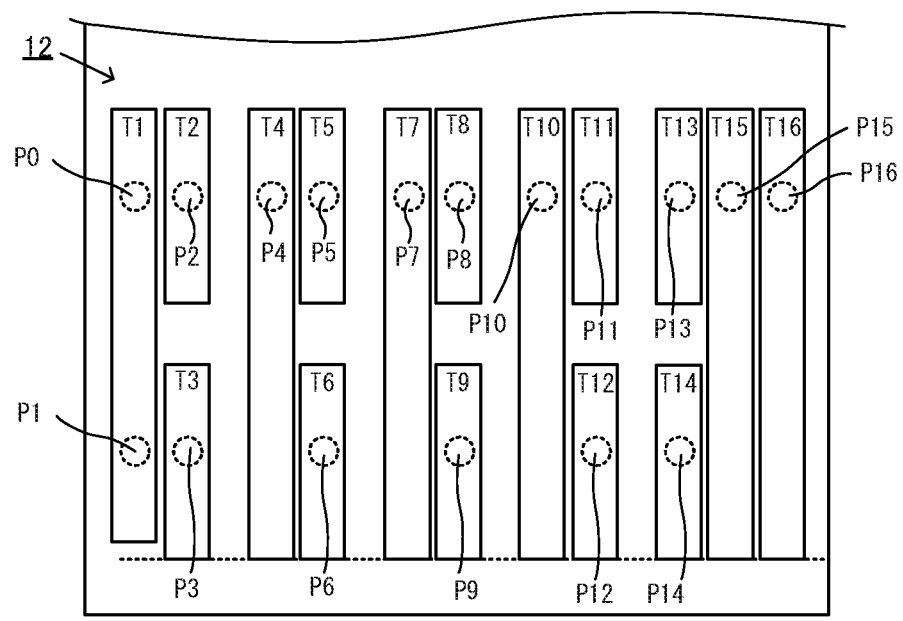
FIG. 22 is a diagram showing non-limiting examples of the shapes of terminals according to another exemplary embodiment.

In addition, as shown in FIG. 22, the lower ends of all the terminals except for the terminal T1 may be aligned. Specifically, in a variation shown in FIG. 22, the positions in the up-down direction of the lower ends of the five long terminals (T4, T7, T10, T15, and T16) across the upper region and the lower region and the positions in the up-down direction of the lower ends of the five terminals (T3, T6, T9, T12, and T14) in the lower region coincide with each other. On the other hand, the lower end of the ground-and-detection terminal T1 is located above the lower ends of the other terminals. Thus, when the cartridge 1 is inserted into the main body, the detection pin P1 on the main body side comes into contact with the terminal T1 last. That is, the main body detects the cartridge 1 in the state where all the terminals are connected to the pins on the main body side. Consequently, the main body can transmit a signal to the cartridge 1 in the state where all the terminals of the cartridge 1 are connected to the pins on the main body side. Thus, it is possible to prevent a failure from occurring.

Figure 23:
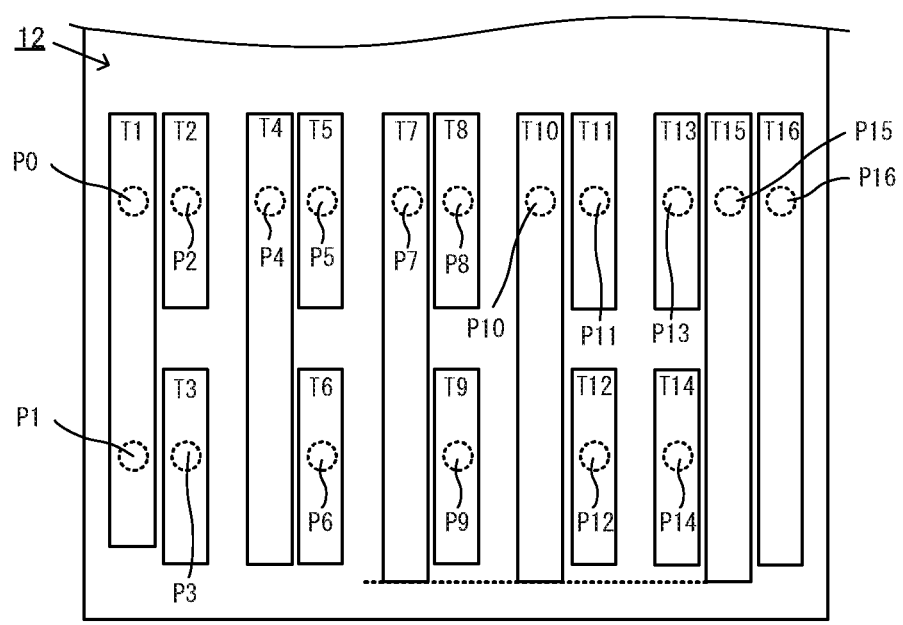
FIG. 23 is a diagram showing non-limiting examples of the shapes of terminals according to another exemplary embodiment.

In addition, as shown in FIG. 23, the lower end of the terminal T15 may be aligned with the terminals T7 and T10.

In the above exemplary embodiment, when the cartridge 1 is inserted into the main body, the terminals of the cartridge 1 are connected to the pins on the main body side in order from (1) to (4) as follows.

(1) The ground terminal T15 is brought into contact with the ground pin P15 on the main body side first.

(2) The power supply terminals T7 and T10 are brought into contact with the power supply pins P7 and P10 on the main body side.
(3) The strobe terminal T2, the clock terminal T3, the chip-enable terminal T4, the eight data input/output terminals T5, T6, T8, T9, and T11 to T14, and the reset terminal T16 are brought into contact with the pins P2, P3, P4, P5, P6, P8, P9, P11 to P14, and P16, respectively, on the main body side.
(4) The ground-and-detection terminal T1 is brought into contact with the detection pin P1 on the main body side.

In contrast, in a variation shown in FIG. 23, the ground terminal T15 and the power supply terminals T7 and T10 are connected to the pins P15, P7, and P10, respectively, on the main body side first. Also in such a configuration, it is possible to release unnecessary electric charges in the cartridge 1 first and also possible to allow the supply of power to the memory control section 14. In a case where power is supplied from the main body side to the power supply terminal T7, the memory control section 14 can control a signal.

Figure 24:
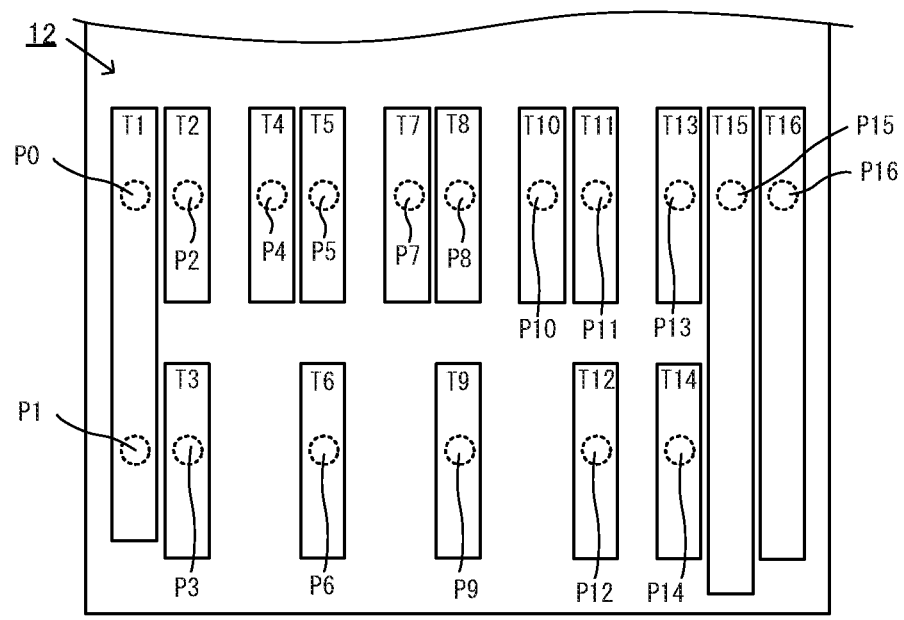
FIG. 24 is a diagram showing non-limiting examples of the shapes of terminals according to another exemplary embodiment.

In addition, as shown in FIG. 24, some of the long terminals may be formed to be short. For example, in FIG. 24, the chip-enable terminal T4 and the power supply terminals T7 and T10 are provided in the upper region and formed to be short, similarly to the other terminals provided in the upper region (T2, T5, and the like).

Figure 25:
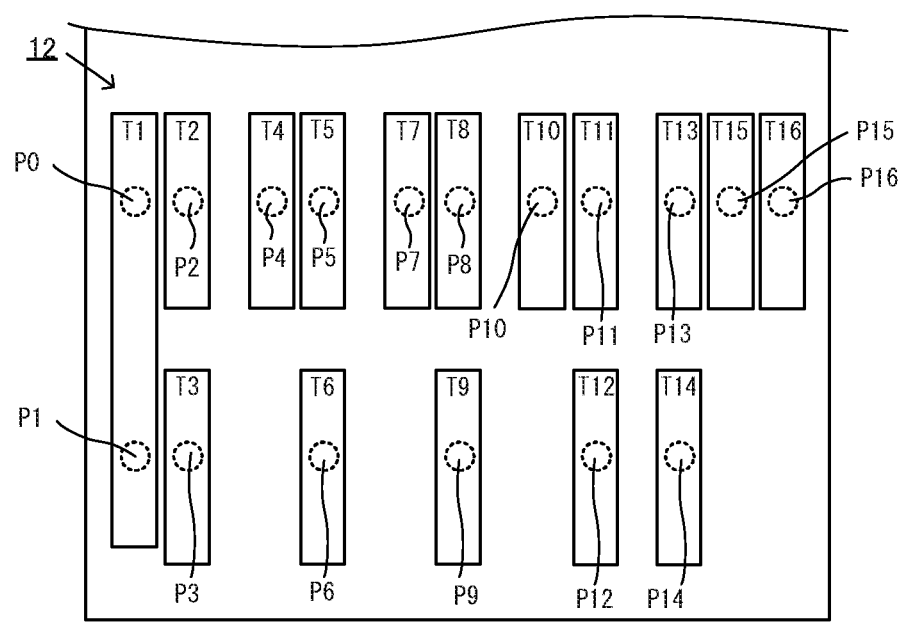
FIG. 25 is a diagram showing non-limiting examples of the shapes of terminals according to another exemplary embodiment.

In addition, as shown in FIG. 25, all the long terminals except for the terminal T1 may be formed to be short. Specifically, in the example shown in FIG. 25, the chip-enable terminal T4, the power supply terminals T7 and T10, the ground terminal T15, and the reset terminal T16 are provided in the upper region and formed to be short, similarly to the other terminals (T2, T5, and the like) provided in the upper region. On the other hand, the ground-and-detection terminal T1 is formed with such a length as to be across the upper region and the lower region. This is because the main body detects the cartridge 1 based on the short-circuiting of the pin P0 and the pin P1 on the main body side, and therefore, the terminal T1 needs to be formed to be at least longer than the distance between the pin P0 and the pin P1.

It should be noted that FIGS. 24 and 25 are merely illustrative. Alternatively, at least one of the terminals T4, T7, T10, T15, and T16 may be formed to be short. For example, the two terminals T15 and T16 may be formed to be short (e.g., similarly to the terminal T13). Further, for example, the terminals T4 and/or T16 may be formed to be short.

Figure 26:
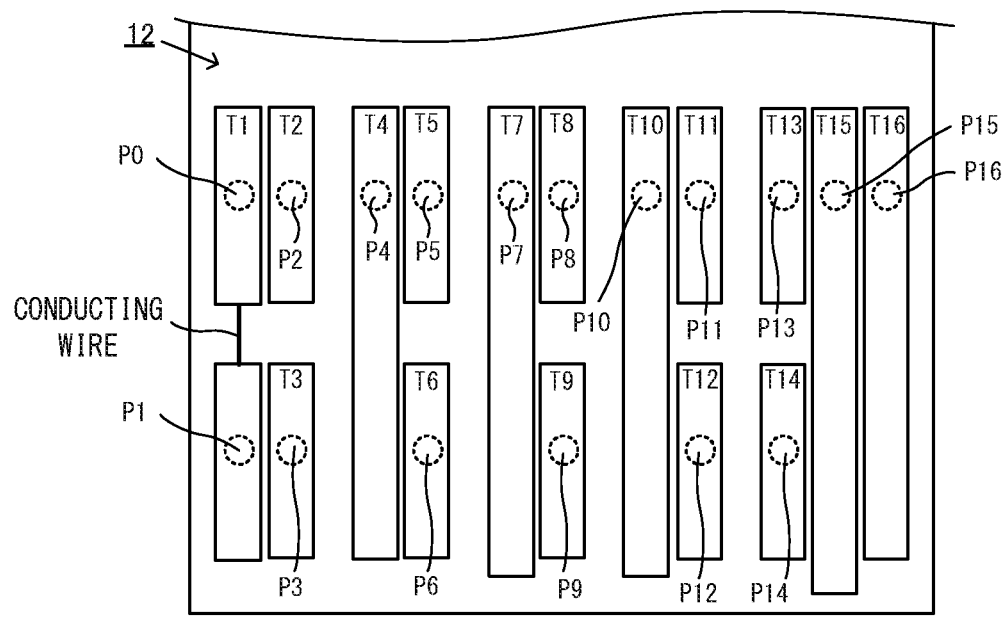
FIG. 26 is a diagram showing non-limiting examples of the shapes of terminals according to another exemplary embodiment.

In addition, as shown in FIG. 26, the ground-and-detection terminal T1 may be divided into two short terminals, and these two terminals may be connected together by a conducting wire. The two terminals connected by such a conducting wire are electrically a single terminal, which is substantially the same as the long terminal T1 across the upper region and the lower region shown in FIG. 5. It should be noted that in a case where the terminal T1 is divided into two terminals in appearance as in FIG. 26, a conducting wire may be formed by printing on the front surface of the substrate 12, or a conducting wire may be formed within the substrate 12 so as not to be visible from the outside.

Figure 27:
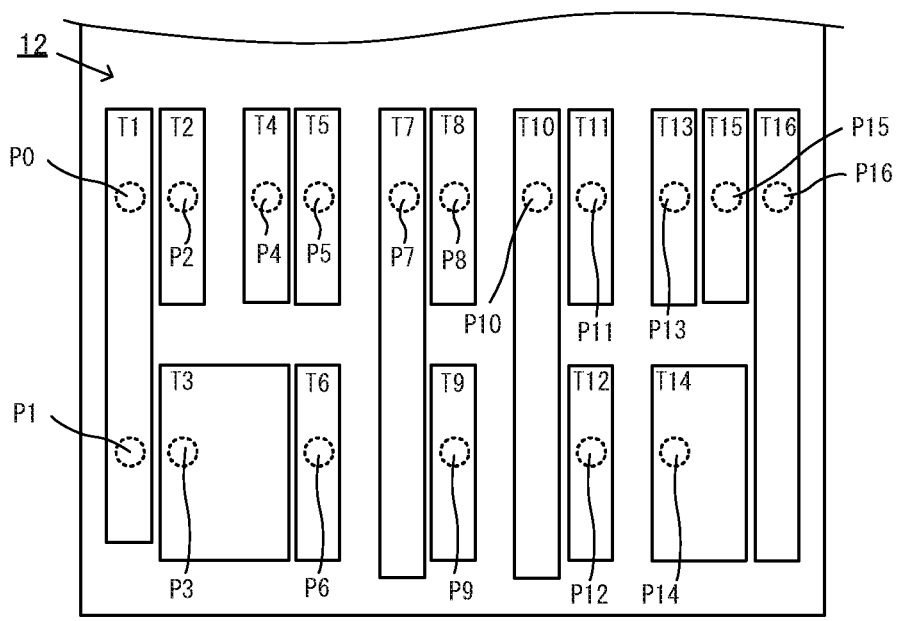
FIG. 27 is a diagram showing non-limiting examples of the shapes of terminals according to another exemplary embodiment.

In addition, as shown in FIG. 27, the configuration may be such that the widths of some of the terminals are great. For example, in the example shown in FIG. 27, the terminal T4 is made short (placed in the upper region), and the width of the terminal T3 is made so great as to reach a region created by making the terminal T4 short. Further, the terminal T15 is made short, and the width of the terminal T14 is made so great as to reach a region created by making the terminal T15 short.

That is, in the above exemplary embodiment, as shown in FIG. 5, four terminal groups, each including a single long terminal and two short terminals arranged one above the other, are formed to be arranged in the horizontal direction. Further, gaps are provided between the terminal groups. In another exemplary embodiment, for example, as shown in FIG. 27, the terminals of the cartridge 1 may have any shapes so long as the terminals of the cartridge 1 are connected to correct pins on the main body side when the cartridge 1 is fixed to the main body.

Figure 28:
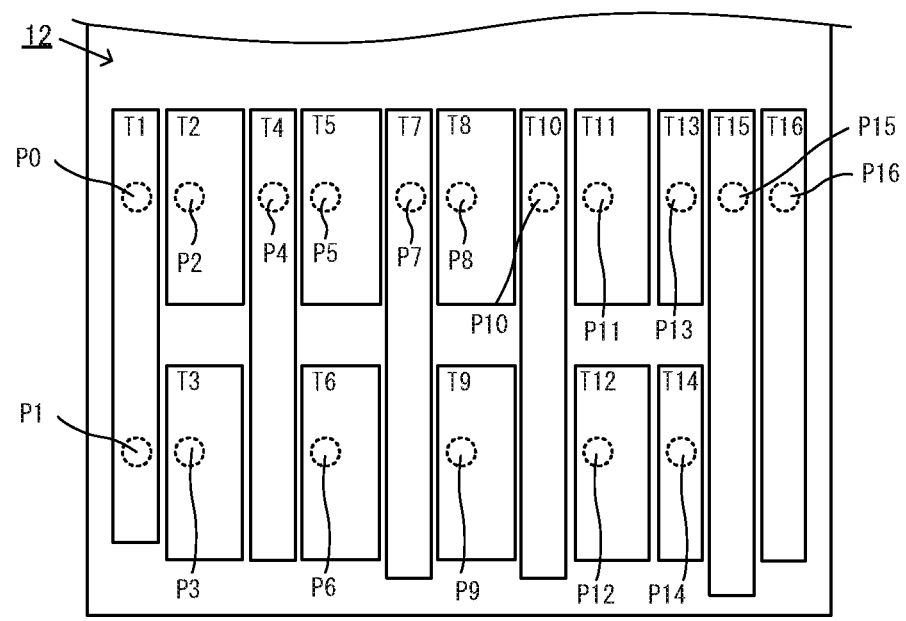
FIG. 28 is a diagram showing non-limiting examples of the shapes of terminals according to another exemplary embodiment.

For example, as shown in FIG. 28, all the distances between the terminals may be set to be the same, and the gaps between the terminal groups as shown in FIG. 5 may not be provided. Also with such shapes of the terminals, the configuration is such that near a terminal of which the voltage frequently changes, a terminal of which the voltage infrequently changes is provided. For example, near the left side of the strobe terminal T2, the ground-and-detection terminal T1 is present. Near the left side of the data input/output terminal T5, the chip-enable terminal T4 is present. Near the left side of the data input/output terminal T8, the power supply terminal T7 is present. Near the left side of the data input/output terminal T11, the power supply terminal T10 is present. Near the right side of the data input/output terminal T13, the ground terminal T15 is present. Similarly, near the left side of the clock terminal T3, the ground-and-detection terminal T1 is present. Near the left side of the data input/output terminal T6, the chip-enable terminal T4 is present. Near the left side of the data input/output terminal T9, the power supply terminal T7 is present. Near the left side of the data input/output terminal T12, the power supply terminal T10 is present. Near the right side of the data input/output terminal T14, the ground terminal T15 is present.

In addition, also in FIG. 28, similarly to FIG. 5, in at least a part of the terminal placement region, a terminal of which the voltage infrequently changes and a terminal of which the voltage frequently changes are arranged alternately in the horizontal direction. For example, in the upper region, the terminals T1, T2, T4, T5, T7, T8, T10, and T11 are arranged in the horizontal direction. Thus, the configuration is such that a terminal of which the voltage infrequently changes and a terminal of which the voltage frequently changes are arranged alternately in the horizontal direction. Further, to the right of the terminal T11, the data input/output terminal T13 is provided. To the right of the data input/output terminal T13, the ground terminal T15 is provided. To the right of the ground terminal T15 (at the right end of the terminal placement region), the reset terminal T16 is provided. Similarly, in the lower region, the terminals T1, T3, T4, T6, T7, T9, T10, and T12 are arranged in the horizontal direction.

It should be noted that in FIG. 28, a conducting wire from each terminal may be formed within the substrate 12.

Figure 29:
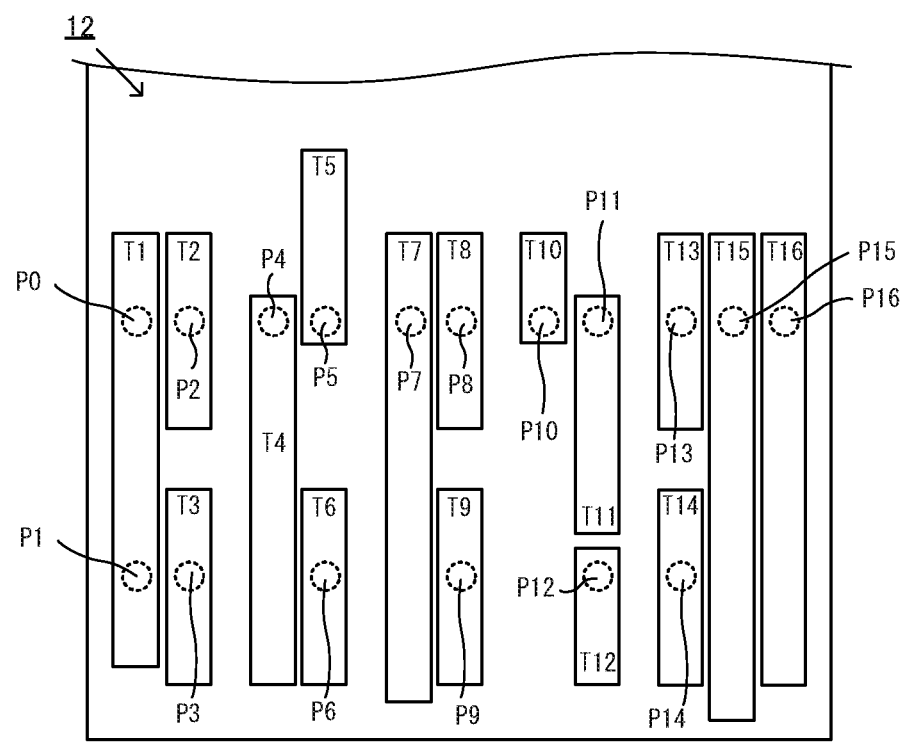
FIG. 29 is a diagram showing non-limiting examples of the shapes of terminals according to another exemplary embodiment.

In addition, for example, as shown in FIG. 29, the terminals of the cartridge 1 according to the above exemplary embodiment may be placed at different positions in the up-down direction, or may be formed with different lengths in the up-down direction. In the example shown in FIG. 29, the terminals T4, T5, T10, T11, and T12 are different from the respective terminals shown in FIG. 5 and the like in position and length. Specifically, the terminal T4 is formed to be shorter than the terminal T4 shown in FIG. 5 and is so formed that in a case where the cartridge is inserted all the way into the main body, an upper end portion of the terminal T4 comes into contact with the pin P4 on the main body side. Further, the terminal T5 is moved to a position above that shown in FIG. 5 and is so formed that in a case where the cartridge is inserted all the way into the main body, a lower end portion of the terminal T5 comes into contact with the pin P5 on the main body side. Further, the terminal T10 is formed to be short and is so formed that in a case where the cartridge is inserted all the way into the main body, a lower end portion of the terminal T10 comes into contact with the pin P10 on the main body side. Further, the terminal T11 is formed to be longer than the terminal T11 shown in FIG. 5 and also located at a lower position. The terminal T11 is so formed that in a case where the cartridge is inserted all the way into the main body, an upper end portion of the terminal T11 comes into contact with the pin P11 on the main body side. Further, the terminal T12 is formed to be shorter than the terminal T12 shown in FIG. 5 and is so formed that in a case where the cartridge is inserted all the way into the main body, an upper end portion of the terminal T12 comes into contact with the pin P12 on the main body side.

Also with the placement of the terminals as shown in FIG. 29, in a case where the cartridge is inserted all the way into the main body (in a case where the cartridge is completely inserted into the main body and fixed), the terminals of the cartridge are electrically connected to the pins on the main body side. Thus, the main body can read or write data from or to the cartridge.

As described above, the positions and the shapes of the terminals of the cartridge may be any positions and shapes so long as the terminals of the cartridge are electrically connected to the pins on the main body side. The configuration is such that even if the positions and the shapes of the terminals are changed, among at least some of the plurality of terminals of the cartridge, near a terminal of which the voltage frequently changes in the horizontal direction, a terminal of which the voltage infrequently changes is located.

Specifically, near the left side of the strobe terminal T2, the ground-and-detection terminal T1 is present. Near the left side of the data input/output terminal T5, the chip-enable terminal T4 is present. Further, near the left side of the data input/output terminal T8, the power supply terminal T7 is present. Near the left side of the data input/output terminal T11, the power supply terminal T10 is present. Further, near the right side of the data input/output terminal T13, the ground terminal T15 is present.

In addition, in at least a part of the terminal placement region, a terminal of which the voltage infrequently changes and a terminal of which the voltage frequently changes are arranged alternately in the horizontal direction. Also in the example shown in FIG. 29, for example, in the upper region, the terminals T1, T2, T4, T5, T7, T8, T10, and T11 are arranged in the horizontal direction (the direction in which the pins on the main body side on the upper side are arranged), and a terminal of which the voltage infrequently changes and a terminal of which the voltage frequently changes are arranged alternately in the horizontal direction.

Figure 30:
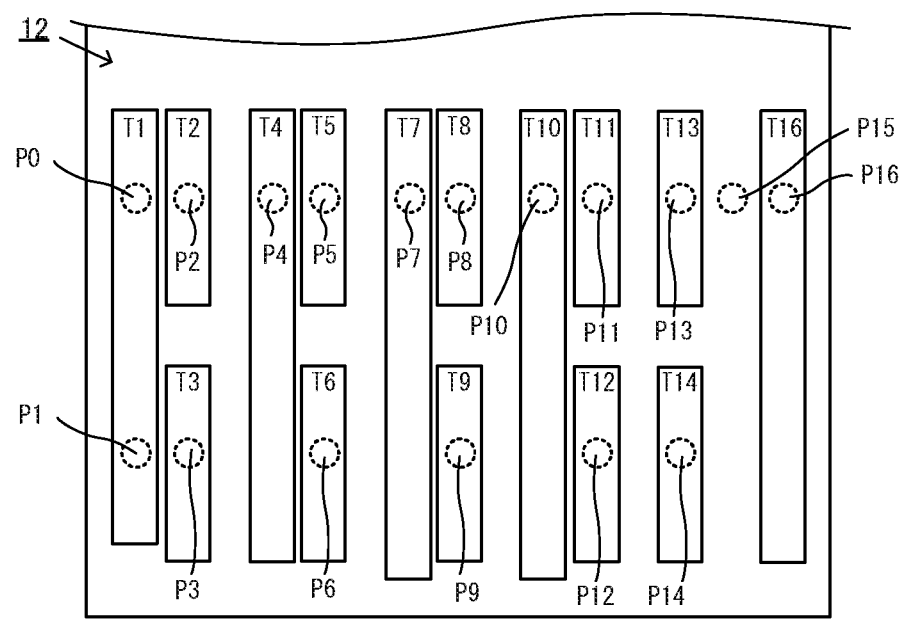
FIG. 30 is a diagram showing non-limiting examples of the shapes of terminals according to another exemplary embodiment.

In addition, as shown in FIG. 30, the ground terminal T15 may not be provided. Even if the terminal T15 is not provided, the terminal T1 is connected to the pin P0 on the main body side, thereby grounding the cartridge. Thus, the ground terminal T15 may not be provided.

Figure 31:
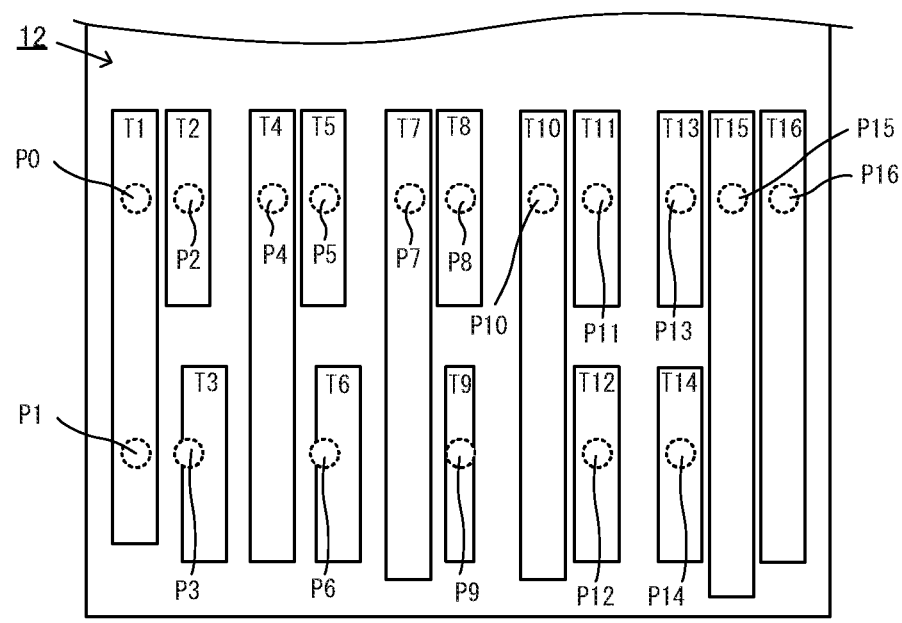
FIG. 31 is a diagram showing non-limiting examples of the shapes of terminals according to another exemplary embodiment.

In addition, as shown in FIG. 31, two short terminals arranged one above the other may be slightly shifted in the left-right direction. For example, in FIG. 31, the terminal T2 and the terminal T3 are placed so as to be arranged one above the other, and the position of the center in the horizontal direction of the terminal T2 and the position of the center in the horizontal direction of the terminal T3 do not completely coincide with each other. Similarly, the terminal T5 and the terminal T6 are placed so as to be arranged one above the other, and the position of the center in the horizontal direction of the terminal T5 and the position of the center in the horizontal direction of the terminal T6 do not completely coincide with each other. As described above, insomuch that two short terminals arranged one above the other come into contact with the pins on the main body side, the centers in the horizontal direction of the two short terminals arranged one above the other may be substantially shifted in the left-right direction. That is, the positions in the left-right direction of two terminals arranged one above the other do not need to exactly coincide with each other. Further, the widths of two short terminals arranged one above the other do not necessary need to be the same. As in the terminal T9 in FIG. 31, the width of the terminal T9 may be configured to be smaller than that of the terminal T8 (or conversely, the width of the terminal T9 may be configured to be greater than that of the terminal T8). As described above, the width of one of two terminals arranged one above the other may be configured to be smaller (or greater) than that of the other terminal so long as the two terminals come into contact with the pins on the main body side.

It should be noted that the variations shown in FIGS. 21 to 31 are merely illustrative. Alternatively, the positions and the sizes of the terminals and the distances between the terminals may be any positions, sizes, and distances so long as the terminals of the cartridge and the pins on the main body side are electrically connected together. Further, in the terminal placement region, in addition to the terminals electrically connected to the pins on the main body side, a terminal that is not electrically connected to any of the pins on the main body side may be provided.

In addition, the non-volatile memory 13 of the cartridge may be detachably connected to the cartridge 1.

Figure 32:
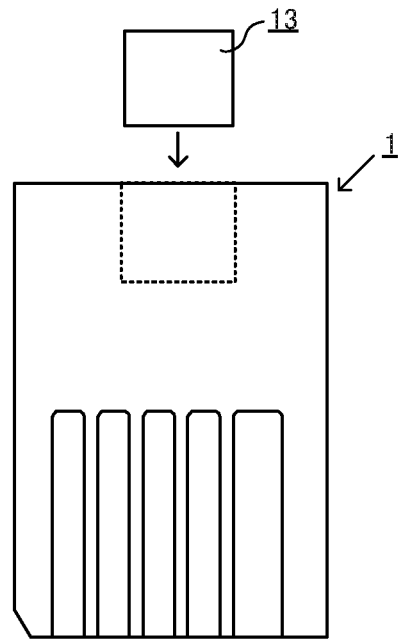
FIG. 32 is a diagram showing a non-limiting example of the configuration in which a non-volatile memory 13 is detachably connected to the cartridge 1.
Figure 33:
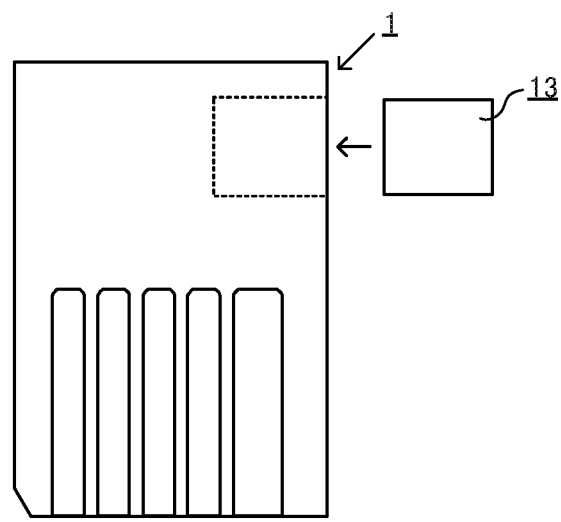
FIG. 33 is a diagram showing a non-limiting example of the configuration in which the non-volatile memory 13 is detachably connected to the cartridge 1.

FIGS. 32 and 33 are diagrams showing examples of the configuration in which the non-volatile memory 13 is detachably connected to the cartridge 1. In the example shown in FIG. 32, for example, an insertion slot for inserting the non-volatile memory 13 is provided at the upper end of the cartridge 1. The non-volatile memory 13 is inserted into the insertion slot and fixed to the cartridge 1. The information processing apparatus 50 reads a predetermined program or data (e.g., a game program, game data, or the like) from the non-volatile memory 13 or writes a predetermined program or data to the non-volatile memory 13 via the cartridge 1. As the attachable and detachable non-volatile memory 13, a general-purpose non-volatile memory may be used. For example, as the attachable and detachable non-volatile memory 13, an SD card, a mini SD card, a micro SD card, or the like may be used. Further, a general-purpose non-volatile memory based on another standard may be detachably connected to the cartridge 1. Further, in the example shown in FIG. 33, for example, an insertion slot for inserting the non-volatile memory 13 is provided on the side surface of the cartridge 1, and the non-volatile memory 13 is inserted into the insertion slot provided on the side surface. As described above, the non-volatile memory 13 may be detachably connected to the cartridge 1. It should be noted that the exemplary embodiment is not limited to the form in which the non-volatile memory 13 is inserted through the upper surface or the side surface of the cartridge 1. Alternatively, for example, a recessed portion for fitting the non-volatile memory 13 may be formed on the front surface or the back surface of the cartridge 1, and the non-volatile memory 13 is fit into the recessed portion, thereby detachably connecting the non-volatile memory 13 to the cartridge 1.

In addition, in the above exemplary embodiment, as a storage device for storing a predetermined program, data, or the like, the non-volatile memory 13 is used. Alternatively, any storage medium (e.g., a magnetic disk, an optical disc, or the like) capable of storing information may be used, instead of the non-volatile memory.

In addition, in the cartridge according to the exemplary embodiment, instead of the insertion slot of the non-volatile memory 13 in the above exemplary embodiment, an insertion slot (e.g., the cartridge accommodation portion 51 of the information processing apparatus 50) for inserting another cartridge may be provided. In this case, via the cartridge according to the exemplary embodiment, the information processing apparatus 50 reads a predetermined program or data (e.g., a game program, game data, or the like) stored in another cartridge inserted into the insertion slot, or writes data to another cartridge. That is, the cartridge according to the exemplary embodiment also includes a cartridge of a so-called adapter type that mediates communication between another cartridge and the information processing apparatus 50.

In addition, in the cartridge 1, the separators 11a are provided. The separators 11a, however, may not be necessarily provided. For example, some or all of the four separators 11a shown in FIG. 2 may not be provided.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A cartridge having a front end and a rear end and configured to connect to a game apparatus by inserting the cartridge, the front end first, into a cartridge insertion slot of the game apparatus, a direction in which the cartridge is inserted into or removed from the cartridge insertion slot is a first direction, the cartridge comprising:
a terminal placement region that includes a first region and a second region and that includes a plurality of terminals configured to electrically connect to terminals of the game apparatus in the cartridge insertion slot, wherein
the second region and the first region are adjacent to each other in the first direction,
the first region is closer in the terminal placement region to the front end of the cartridge than the second region is,
the plurality of terminals include at least a strobe terminal and a clock terminal,
the clock terminal is in the first region, and
the strobe terminal is in the second region.

2. The cartridge of claim 1, wherein the strobe terminal and the clock terminal are sequentially arranged in the first direction,
wherein the plurality of terminals further comprise at least a first data input/output terminal and a second data input/output terminal, and
wherein a direction perpendicular to the first direction is a second direction.

3. The cartridge of claim 2, wherein one of the plurality of terminals includes the first data input/output terminal, the first data input/output terminal being located in the first region.

4. The cartridge of claim 2, wherein one of the plurality of terminals includes the second data input/output terminal, the second data input/output terminal being located in the second region.

5. The cartridge of claim 2, wherein the plurality of terminals includes the second data input/output terminal and the first data input/output terminal being sequentially arranged in the first direction.

6. The cartridge of claim 2, further comprising a plurality of long terminals each located within a first portion in the first region and a second portion in the second region,
wherein one of the plurality of long terminals is adjacent to the second data input/output terminal and the first data input/output terminal on at least one side of the one of the long terminals in the second direction.

7. The cartridge of claim 2, wherein at least part of the first data input/output terminal is aligned in the first direction with at least part of the second data input/output terminal.

8. The cartridge of claim 2, wherein the first data input/output terminal is configured to connect to a first terminal of the game apparatus when the cartridge is inserted into the cartridge insertion slot, and the second data input/output terminal is configured to connect to a second terminal of the game apparatus when the cartridge is inserted into the cartridge insertion slot, and
wherein the first data input/output terminal is placed such that inserting the cartridge into the cartridge insertion slot causes the second terminal of the game apparatus to contact the first data input/output terminal.

9. The cartridge of claim 2, further comprising a plurality of long terminals each located within a first portion in the first region and a second portion in the second region.

10. The cartridge of claim 9, wherein one of the plurality of long terminals is adjacent to the strobe terminal and the clock terminal on at least one side of the one of the long terminals in the second direction.

11. The cartridge of claim 10, wherein the long terminal adjacent to the strobe terminal and the clock terminal is a ground-and-detection terminal.

12. The cartridge of claim 9, wherein the plurality of long terminals includes a power supply terminal and a ground terminal.

13. The cartridge of claim 12, wherein the plurality of long terminals include a chip-enable terminal, and
wherein one of the ground terminal, the power supply terminal, and the chip-enable terminal is adjacent to the first data input/output terminal and the second data input/output terminal on at least one side in the second direction.

14. The cartridge of claim 12, wherein the ground terminal is adjacent to the clock terminal and the strobe terminal on at least one side in the second direction.

15. The cartridge of claim 12, wherein the plurality of long terminals include a reset terminal, and
wherein the reset terminal is at one end of the terminal placement region in the second direction.

16. The cartridge of claim 9, wherein the long terminals and sets of two terminals in the second region and the first region and arranged in the first direction are placed alternately in the second direction in the terminal placement region.

17. The cartridge of claim 9, wherein the plurality of long terminals include a detection terminal configured to allow the game apparatus to detect the cartridge, and wherein a front end of the detection terminal is located furthest from the front end of the cartridge compared to front ends of the terminals in the first region and front ends of the plurality of long terminals.

18. The cartridge of claim 1, further comprising at least one separator located between the plurality of terminals.

19. In a cartridge for use with a game apparatus cartridge insertion slot providing first and second electrical terminals therein, the cartridge having a cartridge front end and a cartridge rear end and configured to be insertable front end first into the game apparatus cartridge insertion slot, a direction in which the cartridge is inserted into the game apparatus cartridge insertion slot being an insertion direction, the cartridge comprising:

a first terminal placement region, and
a second terminal placement region,
the first terminal placement region and the second terminal placement region being adjacent to each other in the insertion direction,
the first terminal placement region being closer than the second terminal placement region to the cartridge front end,
the first terminal placement region comprising a clock terminal configured to connect with the first electrical terminal, and
the second terminal placement region comprising a strobe terminal configured to connect with the second electrical terminal.

20. In a game cartridge having a cartridge insertion end configured to be insertable in an insertion direction into a game cartridge insertion slot providing first and second electrical terminals therein, structure comprising:

a first terminal placement region, and
a second terminal placement region disposed adjacent to the first terminal placement region in the insertion direction,
the first terminal placement region being closer than the second terminal placement region to the cartridge insertion end and comprising a clock terminal configured and positioned to electrically conduct clock signals,
the second terminal placement region comprising a strobe terminal configured and positioned to electrically conduct strobe signals.

21. In the cartridge of claim 19, wherein the strobe terminal and the clock terminal are sequentially arranged in the insertion direction.

22. In the game cartridge of claim 20, wherein the first and second terminal placement regions are configured so that the clock terminal and the strobe terminal are sequentially arranged in the insertion direction and simultaneously electrically connect with the first and second electrical terminals, respectively, upon insertion of the game cartridge into the game cartridge insertion slot.

23. The cartridge of claim 12, wherein the power supply terminal is a power supply terminal for a memory control section or a power supply terminal for data input and output.

24. A cartridge having a front end and a rear end and configured to connect to a game apparatus by inserting the cartridge, the front end first, into a cartridge insertion slot of the game apparatus, a direction in which the cartridge is inserted into or removed from the cartridge insertion slot is a first direction, the cartridge comprising:

a terminal placement region that includes:
a plurality of first terminals located in a first region and configured to electrically connect to corresponding terminals of the game apparatus in the cartridge insertion slot;
a plurality of second terminals located in a second region and configured to electrically connect to corresponding terminals of the game apparatus in the cartridge insertion slot; and
a plurality of long terminals configured to electrically connect to corresponding terminals of the game apparatus in the cartridge insertion slot, each of the long terminals being located in the first region and the second region,
wherein the first region is closer in the terminal placement region to the front end of the cartridge than the second region is.

* * * * *